United States Patent
Hayashi et al.

(10) Patent No.: US 9,345,962 B2
(45) Date of Patent: May 24, 2016

(54) STORAGE MEDIUM HAVING STORED THEREON INFORMATION PROCESSING PROGRAM, INFORMATION PROCESSING APPARATUS, INFORMATION PROCESSING SYSTEM, AND INFORMATION PROCESSING METHOD

(75) Inventors: Yugo Hayashi, Kyoto (JP); Keiichi Minato, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 616 days.

(21) Appl. No.: 13/343,913

(22) Filed: Jan. 5, 2012

(65) Prior Publication Data

US 2012/0229512 A1 Sep. 13, 2012

(30) Foreign Application Priority Data

| Mar. 8, 2011 | (JP) | 2011-050039 |
| Apr. 5, 2011 | (JP) | 2011-083453 |
| Apr. 5, 2011 | (JP) | 2011-083454 |
| Apr. 5, 2011 | (JP) | 2011-083455 |
| Apr. 5, 2011 | (JP) | 2011-083456 |
| May 24, 2011 | (JP) | 2011-115402 |
| May 24, 2011 | (JP) | 2011-115403 |
| May 24, 2011 | (JP) | 2011-115404 |
| May 27, 2011 | (JP) | 2011-118901 |
| May 27, 2011 | (JP) | 2011-118902 |
| Jun. 1, 2011 | (JP) | 2011-123644 |
| Jun. 1, 2011 | (JP) | 2011-123645 |
| Jun. 1, 2011 | (JP) | 2011-123646 |
| Oct. 13, 2011 | (JP) | 2011-225538 |

(51) Int. Cl.
*G06F 3/01* (2006.01)
*A63F 13/20* (2014.01)
(Continued)

(52) U.S. Cl.
CPC ............... *A63F 13/06* (2013.01); *A63F 13/211* (2014.09); *A63F 13/26* (2014.09); *A63F 13/428* (2014.09);
(Continued)

(58) Field of Classification Search
CPC .................. A63F 2300/204; A63F 2300/1075; A63F 2300/105; A63F 2300/6661
USPC ................................................... 345/158, 173
See application file for complete search history.

(56) References Cited

U.S. PATENT DOCUMENTS 5,838,909 A 11/1998 Roy et al.
5,853,324 A 12/1998 Kami et al.
(Continued)

FOREIGN PATENT DOCUMENTS

EP 1 726 342 A2 11/2006
EP 2 218 485 8/2010
(Continued)

OTHER PUBLICATIONS

Wei, Chen, Gary Marsden, and James Gain. "Novel interface for first person shooting games on pdas." Proceedings of the 20th Australasian Conference on Computer-Human Interaction: Designing for Habitus and Habitat. ACM, 2008.*

(Continued)

*Primary Examiner* — Zhengxi Liu
*Assistant Examiner* — Ryan M Gray
(74) *Attorney, Agent, or Firm* — Nixon & Vanderhye P.C.

(57) ABSTRACT

An image is displayed on a portable display apparatus that outputs at least body state data based on an attitude and/or a motion of the portable display apparatus body and touch position data based on a touch position on a touch panel provided in the portable display apparatus. On the basis of the body state data and the touch position data, an attitude and/or a position of a first virtual camera for generating an image of a virtual world is controlled. A first image representing the virtual world viewed from the first virtual camera is displayed on the portable display apparatus.

30 Claims, 23 Drawing Sheets

(51) Int. Cl.
 *A63F 13/428* (2014.01)
 *A63F 13/26* (2014.01)
 *A63F 13/211* (2014.01)
 *A63F 13/5255* (2014.01)
 *G06F 3/0481* (2013.01)

(52) U.S. Cl.
 CPC ............ *A63F 13/5255* (2014.09); *G06F 3/011* (2013.01); *A63F 2300/105* (2013.01); *A63F 2300/1068* (2013.01); *A63F 2300/301* (2013.01); *A63F 2300/403* (2013.01); *A63F 2300/6045* (2013.01); *A63F 2300/6676* (2013.01); *A63F 2300/6684* (2013.01); *A63F 2300/8005* (2013.01); *G06F 3/04815* (2013.01)

(56) References Cited

U.S. PATENT DOCUMENTS

| | | | |
|---|---|---|---|
| 6,201,554 B1 | 3/2001 | Lands | |
| 6,225,977 B1 | 5/2001 | Li | |
| 6,290,600 B1 | 9/2001 | Glasson | |
| 6,416,410 B1 | 7/2002 | Abou-Samra et al. | |
| 6,450,886 B1 | 9/2002 | Oishi et al. | |
| 6,483,540 B1 | 11/2002 | Akasawa et al. | |
| 6,500,070 B1 | 12/2002 | Tomizawa et al. | |
| 6,540,614 B1 | 4/2003 | Nishino et al. | |
| 6,712,703 B2 | 3/2004 | Miyamoto et al. | |
| 6,762,746 B2 | 7/2004 | Fukuda | |
| 6,908,388 B2 | 6/2005 | Shimizu et al. | |
| 6,966,837 B1 | 11/2005 | Best | |
| 7,326,117 B1 | 2/2008 | Best | |
| 7,588,498 B2* | 9/2009 | Iizuka et al. | 463/44 |
| 2002/0006431 A1 | 1/2002 | Ogata et al. | |
| 2002/0022518 A1 | 2/2002 | Okuda et al. | |
| 2002/0140666 A1* | 10/2002 | Bradski | 345/156 |
| 2002/0165028 A1 | 11/2002 | Miyamoto et al. | |
| 2003/0134665 A1 | 7/2003 | Kato et al. | |
| 2003/0216176 A1 | 11/2003 | Shimizu et al. | |
| 2003/0220142 A1 | 11/2003 | Siegel | |
| 2004/0046736 A1 | 3/2004 | Pryor et al. | |
| 2004/0092309 A1* | 5/2004 | Suzuki | 463/32 |
| 2004/0219801 A1 | 11/2004 | Bassett et al. | |
| 2004/0229687 A1 | 11/2004 | Miyamoto et al. | |
| 2005/0014543 A1 | 1/2005 | Itoi et al. | |
| 2005/0119053 A1 | 6/2005 | Suzuki et al. | |
| 2005/0130738 A1 | 6/2005 | Miyamoto et al. | |
| 2005/0187015 A1 | 8/2005 | Suzuki et al. | |
| 2005/0255900 A1 | 11/2005 | Takahashi et al. | |
| 2006/0017692 A1* | 1/2006 | Wehrenberg et al. | 345/156 |
| 2006/0040740 A1 | 2/2006 | DiDato | |
| 2006/0046848 A1 | 3/2006 | Abe et al. | |
| 2006/0262120 A1 | 11/2006 | Rosenberg | |
| 2006/0262210 A1 | 11/2006 | Smith et al. | |
| 2006/0266200 A1 | 11/2006 | Goodwin | |
| 2007/0007143 A1 | 1/2007 | Hayashi et al. | |
| 2007/0008298 A1 | 1/2007 | Ohta | |
| 2007/0015577 A1 | 1/2007 | Hsu | |
| 2007/0072662 A1 | 3/2007 | Templeman | |
| 2007/0073196 A1 | 3/2007 | Tanaka et al. | |
| 2007/0208528 A1 | 9/2007 | Seo et al. | |
| 2007/0265085 A1 | 11/2007 | Miyamoto et al. | |
| 2008/0009332 A1 | 1/2008 | Kake | |
| 2008/0042973 A1 | 2/2008 | Zhao et al. | |
| 2008/0062198 A1 | 3/2008 | Takahashi et al. | |
| 2008/0070686 A1 | 3/2008 | Satsukawa et al. | |
| 2008/0096654 A1 | 4/2008 | Mondesir et al. | |
| 2008/0096657 A1 | 4/2008 | Benoist | |
| 2008/0102951 A1 | 5/2008 | Eto et al. | |
| 2008/0216974 A1 | 9/2008 | Pitcher et al. | |
| 2008/0254821 A1 | 10/2008 | Kusuda et al. | |
| 2008/0261696 A1 | 10/2008 | Yamazaki et al. | |
| 2008/0268956 A1 | 10/2008 | Suzuki | |
| 2008/0274813 A1 | 11/2008 | Sato | |
| 2008/0318681 A1 | 12/2008 | Rofougaran et al. | |
| 2009/0002391 A1 | 1/2009 | Williamson et al. | |
| 2009/0069096 A1 | 3/2009 | Nishimoto | |
| 2009/0070093 A1 | 3/2009 | Nakanishi et al. | |
| 2009/0093305 A1 | 4/2009 | Okamoto et al. | |
| 2009/0156308 A1 | 6/2009 | Hsu | |
| 2009/0187371 A1 | 7/2009 | Ohta | |
| 2009/0244064 A1 | 10/2009 | Inokuchi et al. | |
| 2009/0298585 A1 | 12/2009 | Cannon et al. | |
| 2009/0303204 A1 | 12/2009 | Nasiri et al. | |
| 2010/0045666 A1 | 2/2010 | Kornmann et al. | |
| 2010/0045667 A1* | 2/2010 | Kornmann et al. | 345/419 |
| 2010/0048357 A1 | 2/2010 | Nakagawa et al. | |
| 2010/0053322 A1 | 3/2010 | Marti et al. | |
| 2010/0058254 A1 | 3/2010 | Narita | |
| 2010/0081505 A1 | 4/2010 | Alten et al. | |
| 2010/0087248 A1 | 4/2010 | Takahashi | |
| 2010/0137063 A1 | 6/2010 | Shirakawa et al. | |
| 2010/0169110 A1 | 7/2010 | Sawano et al. | |
| 2010/0178988 A1 | 7/2010 | Izuno et al. | |
| 2010/0188937 A1 | 7/2010 | Watanabe | |
| 2010/0214216 A1 | 8/2010 | Nasiri et al. | |
| 2010/0245236 A1 | 9/2010 | Takayama | |
| 2010/0245685 A1 | 9/2010 | Onodera et al. | |
| 2010/0279770 A1 | 11/2010 | Ikeda | |
| 2010/0283723 A1 | 11/2010 | Konishi | |
| 2010/0285882 A1 | 11/2010 | Hsu | |
| 2010/0292006 A1 | 11/2010 | Terrell et al. | |
| 2010/0302238 A1 | 12/2010 | Yonemori et al. | |
| 2010/0304857 A1 | 12/2010 | Suzuki et al. | |
| 2011/0039618 A1 | 2/2011 | Ichiyanagi et al. | |
| 2011/0054359 A1 | 3/2011 | Sazonov et al. | |
| 2011/0070953 A1 | 3/2011 | Konishi | |
| 2011/0077088 A1 | 3/2011 | Hayashi et al. | |
| 2011/0092289 A1* | 4/2011 | Dagman et al. | 463/37 |
| 2011/0159960 A1 | 6/2011 | Ueshima et al. | |
| 2011/0169928 A1* | 7/2011 | Gassel et al. | 348/53 |
| 2011/0172013 A1 | 7/2011 | Shirasaka et al. | |
| 2011/0244956 A1 | 10/2011 | Sakakibara et al. | |
| 2011/0244957 A1 | 10/2011 | Nishimura et al. | |
| 2011/0250964 A1 | 10/2011 | Kulas | |
| 2011/0250965 A1 | 10/2011 | Kulas et al. | |
| 2011/0281650 A1 | 11/2011 | Yamazaki et al. | |
| 2011/0300930 A1 | 12/2011 | Hsu | |
| 2011/0306425 A1 | 12/2011 | Rivard et al. | |
| 2012/0014558 A1 | 1/2012 | Stafford et al. | |
| 2012/0017236 A1 | 1/2012 | Stafford et al. | |
| 2012/0079080 A1 | 3/2012 | Pishevar | |
| 2012/0086630 A1 | 4/2012 | Zhu et al. | |
| 2012/0086631 A1 | 4/2012 | Osman et al. | |
| 2012/0115596 A1 | 5/2012 | Otani | |
| 2012/0115609 A1 | 5/2012 | Sugiyama et al. | |
| 2013/0017876 A1 | 1/2013 | Koumbourlis | |
| 2013/0038532 A1 | 2/2013 | Okura et al. | |

FOREIGN PATENT DOCUMENTS

| | | |
|---|---|---|
| EP | 2015854 | 11/2013 |
| GB | 2 442 259 | 4/2008 |
| GB | 2 442 259 A | 4/2008 |
| GB | 2 497 545 A2 | 9/2012 |
| GB | 2 497 545 A3 | 10/2012 |
| JP | H07-36612 A | 2/1995 |
| JP | H9-091110 | 4/1997 |
| JP | H 09-294260 | 11/1997 |
| JP | H11-90043 A | 4/1999 |
| JP | 2000-316143 | 11/2000 |
| JP | 2000-325653 | 11/2000 |
| JP | 2001-34247 A | 2/2001 |
| JP | 2002-298160 | 10/2002 |
| JP | 2002-325963 | 11/2002 |
| JP | 2003-61940 | 3/2003 |
| JP | 2003-512142 | 4/2003 |
| JP | 2003-325974 A | 11/2003 |
| JP | 2003-334379 | 11/2003 |
| JP | 2004-030408 | 1/2004 |
| JP | 2004-159781 | 6/2004 |
| JP | 2004-329744 | 11/2004 |
| JP | 2005-103154 | 4/2005 |
| JP | 2005-137921 | 6/2005 |
| JP | 2005-230263 | 9/2005 |

(56) References Cited

FOREIGN PATENT DOCUMENTS

| JP | 2006-31307 | 2/2006 |
|---|---|---|
| JP | 2006-39635 | 2/2006 |
| JP | 2007-301048 | 11/2007 |
| JP | 2008-15679 | 1/2008 |
| JP | 2008-264195 | 11/2008 |
| JP | 2008-264402 | 11/2008 |
| JP | 2009-172010 | 8/2009 |
| JP | 2009-237680 | 10/2009 |
| JP | 2009-536058 | 10/2009 |
| JP | 2010-055511 | 3/2010 |
| JP | 2010-233705 | 10/2010 |
| JP | 2010-259611 | 11/2010 |
| JP | 2010-273839 | 12/2010 |
| JP | 2011-015752 | 1/2011 |
| JP | 2011-19810 | 2/2011 |
| JP | 2011-019817 | 2/2011 |
| JP | 2011-53838 | 3/2011 |
| JP | 2011-056049 | 3/2011 |
| WO | 00/67864 | 11/2000 |
| WO | WO 01/30470 A1 | 5/2001 |
| WO | WO 2004/103244 | 2/2004 |
| WO | 2010/060211 | 6/2010 |
| WO | 2011/004629 | 1/2011 |

OTHER PUBLICATIONS

Final Office Action (36 pages) dated Jul. 2, 2014 issued in co-pending U.S. Appl. No. 13/283,032.
Apr. 10, 2013 Office Action from U.S. Appl. No. 13/277,561, 43 pages.
U.S. Office Action dated Jun. 27, 2014 issued in co-pending U.S. Appl. No. 13/283,072.
Jul. 18, 2013 Office Action in U.S. Appl. No. 13/362,255, 20 pages.
Aug. 29, 2013 Office Action in U.S. Appl. No. 13/362,289, 71 pages.
Aug. 29, 2013 Office Action in U.S. Appl. No. 13/400,944, 58 pages.
Aug. 29, 2013 Office Action in U.S. Appl. No. 13/402,026, 87 pages.
Aug. 30, 2013 Office Action in U.S. Appl. No. 13/401,054, 71 pages.
Oct. 17, 2013 Office Action in U.S. Appl. No. 13/287,320, 65 pages.
Dec. 5, 2013 Office Action in U.S. Appl. No. 13/283,032, 35 pages.
Feb. 20, 2014 Office Action in U.S. Appl. No. 13/333,045, 24 pages.
Office Action in co-pending U.S. Appl. No. 13/271,510 dated Sep. 18, 2014.
Office Action in co-pending U.S. Appl. No. 13/287,320 dated Oct. 3, 2014.
Office Action in co-pending U.S. Appl. No. 13/283,072 dated Oct. 10, 2014.
European Search Report EP Application No. 12 15 0272.8 dated Oct. 28, 2014.
European Search Report EP Application No. 12 15 3067.9 dated Oct. 29, 2014.
Office Action dated Dec. 10, 2014 in corresponding U.S. Appl. No. 13/283,032.
Japanese Notice of Reasons for Refusal dated Mar. 16, 2015 in corresponding JP Application No. 2011-118902.
Office Action in corresponding U.S. Appl. No. 13/287,320 dated Feb. 27, 2015.
Office Action in corresponding Japanese Patent Application No. 2011-225538 mailed May 21, 2015.
Office Action in corresponding U.S. Appl. No. 13/352,091 dated May 1, 2015.
Office Action dated Jun. 30, 2015 in corresponding U.S. Appl. No. 13/287,320.
Decision of Refusal in corresponding Japanese Appln. No. 2011-123645 dated Aug. 6, 2015.
"Minna no Ennichi," Shukan Famitsu, vol. 27, No. 10, Enterbrain Inc., Feb. 23, 2012, pp. 32-33.
"Close-up!," Mobile Software Palm OS, Mobile Press, vol. 5, No. 1, Japan—Gijutsu-Hyohron Co., Ltd., Feb. 24, 2005, p. 213.
"iPhone 3G Perfect Guide," Mac People, vol. 14, No. 9, Japan, ASCII Media Works, Inc., Sep. 1, 2008, pp. 122-127.
"The Legend of Zelda: Ocarina of Time 3D," Famitsu DS+Wii, Enterbrain Inc., Apr. 21, 2011, vol. 13, No. 6.
Samurai Slash, [online], Aug. 27, 2015, the date of publication: Jun. 18, 2009 URL:http://raku-job.jp/blog/2009/06/iponeipod-touch.html.
Office Action dated Aug. 28, 2015 issued in corresponding JP Patent Application No. 2011-123644.
Office Action dated Sep. 1, 2015 issued in corresponding JP Patent Application No. 2011-118901 and English Translation.
Office Action dated Sep. 1, 2015 issued in corresponding JP Patent Application No. 2011-115402 and English Translation.
Office Action dated Sep. 1, 2015 issued in corresponding JP Patent Application No. 2011-115404 and English Translation.
Nov. 21, 2012 Office Action from U.S. Appl. No. 13/271,510, 22 pages.
Sep. 4, 2012 European Search Report for EP 11184519.4, 6 pages.
Sep. 4, 2012 European Search Report for EP 11185811.4, 7 pages.
Sep. 4, 2012 European Search Report for EP 11186930.1, 7 pages.
Oct. 2, 2012 European Search Report for EP 11186933.5, 7 pages.
Sep. 4, 2012 European Search Report for EP 11187473.1, 7 pages.
Sep. 7, 2012 European Search Report for EP 12156629.3, 7 pages.
Oct. 1, 2013 Search Report in EP 12156630.1, 9 pages.
Office Action issued Japanese Patent Appln. No. 2011-083454 dated Jan. 22, 2015 (with translation).
Office Action issued Japanese Patent Appln. Nos. 2011-123645 and 2011-123646 dated Feb. 20, 2015.
The Legend of Zelda: Ocarina of Time, Nintendo Dream, Kabushiki Kaisha Anbitto, Mar. 1, 2011, vol. 203 p. 11.
European Search Report for EP11194630.7 dated Feb. 16, 2015.
Office Action in related U.S. Appl. No. 13/283,032 dated Dec. 30, 2015.
U.S. Appl. No. 13/277,561, filed Oct. 20 2011, Computer-Readable Storage Medium, Information Processing System, and Information Processing Method.
U.S. Appl. No. 13/271,510, filed Oct. 12, 2011, Information Processing System, Computer-Readable Storage Medium, and Information Processing Method.
U.S. Appl. No. 13/277,561, filed Oct. 20, 2011, Computer-Readable Storage Medium, Information Processing System, and Information Processing Method.
U.S. Appl. No. 13/283,032, filed Oct. 27, 2011, Computer-Readable Storage Medium, Information Processing System, and Information Processing Method.
U.S. Appl. No. 13/287,320, filed Nov. 2, 2011, Computer-Readable Storage Medium, Information Processing System, and Information Processing Method.
U.S. Appl. No. 13/352,091, filed Jan. 17, 2012, Storage Medium Having Stored Thereon Information Processing Program, Information Processing Apparatus, Information Processing System, and Information Processing Method.
U.S. Appl. No. 13/343,913, filed Jan. 5, 2012, Storage Medium Having Stored Thereon Information Processing Program, Information Processing Apparatus, Information Processing System, and Information Processing Method.
U.S. Appl. No. 13/362,255, filed Jan. 31, 2012, Storage Medium Having Stored Thereon Game Program, Game Apparatus, Game System, and Game Processing Method.
U.S. Appl. No. 13/362,289, filed Jan. 31, 2012, Storage Medium Having Stored Thereon Information Processing Program, Information Processing Apparatus, Information Processing System, and Information Processing Method.
U.S. Appl. No. 13/400,944, filed Feb. 21, 2012, Storage Medium Having Stored Thereon Information Processing Program, Information Processing Apparatus, Information Processing System, and Information Processing Method.
U.S. Appl. No. 13/402,026, filed Feb. 22, 2012, Storage Medium Having Stored Thereon Information Processing Program, Information Processing Apparatus, Information Processing System, and Information Processing Method.
U.S. Appl. No. 13/401,054, filed Feb. 21, 2012, Storage Medium Having Stored Thereon Information Processing Program, Information Processing Apparatus, Information Processing System, and Information Processing Method.

(56) References Cited

OTHER PUBLICATIONS

U.S. Appl. No. 13/283,072, filed Oct. 27, 2011, Computer-Readable Storage Mediu, Inforamtion Processing System, and Information Processing Method.

Notice of Allowance issued in corresponding U.S. Appl. No. 13/352,091 dated Feb. 18, 2016.

Office Action dated Jan. 20, 2016, issued in corresponding U.S. Appl. No. 13/287,320, filed Nov. 2, 2011.

"Virtual Camera System." Wikipedia. Wikimedia Foundation, Feb. 25, 2011. Web. Jan. 7, 2016. <https://en.wikipedia.org/w/index.php?title=Virtual_camera_system&oldid=415917860>.

European Search Report in corresponding European Application No. 14166174.4 dated Jan. 14, 2016.

* cited by examiner

F I G. 1
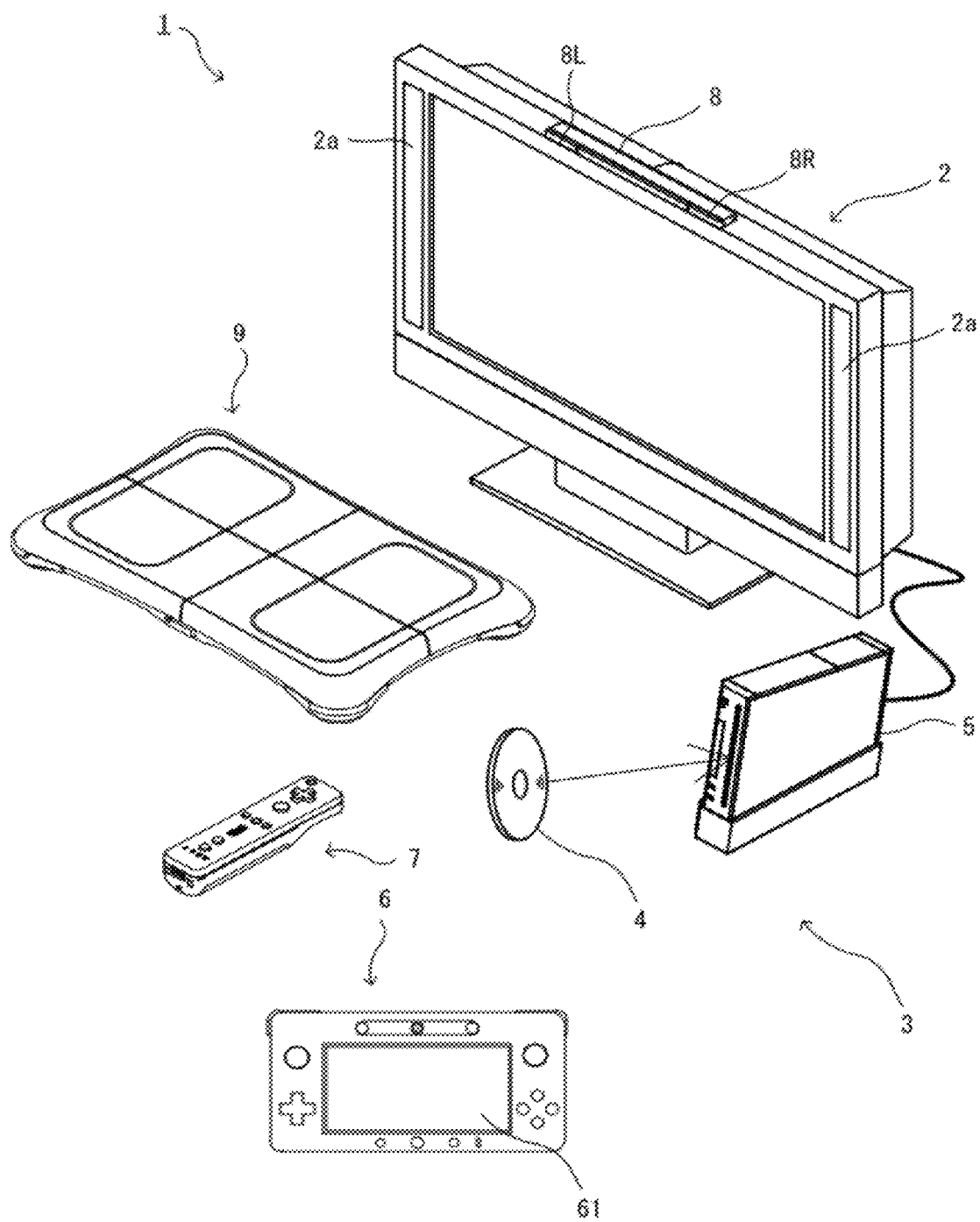

F I G. 3
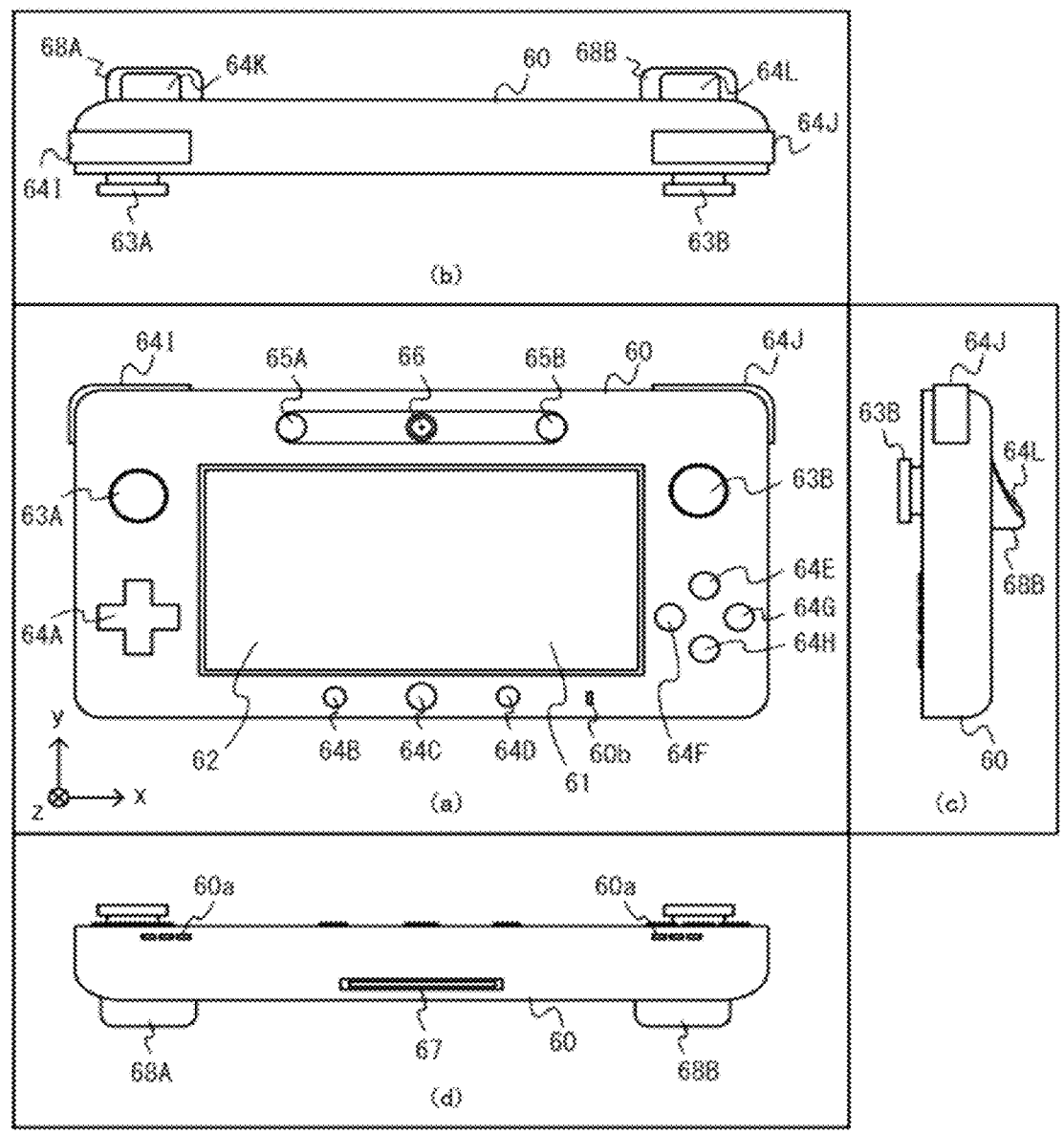

F I G. 9
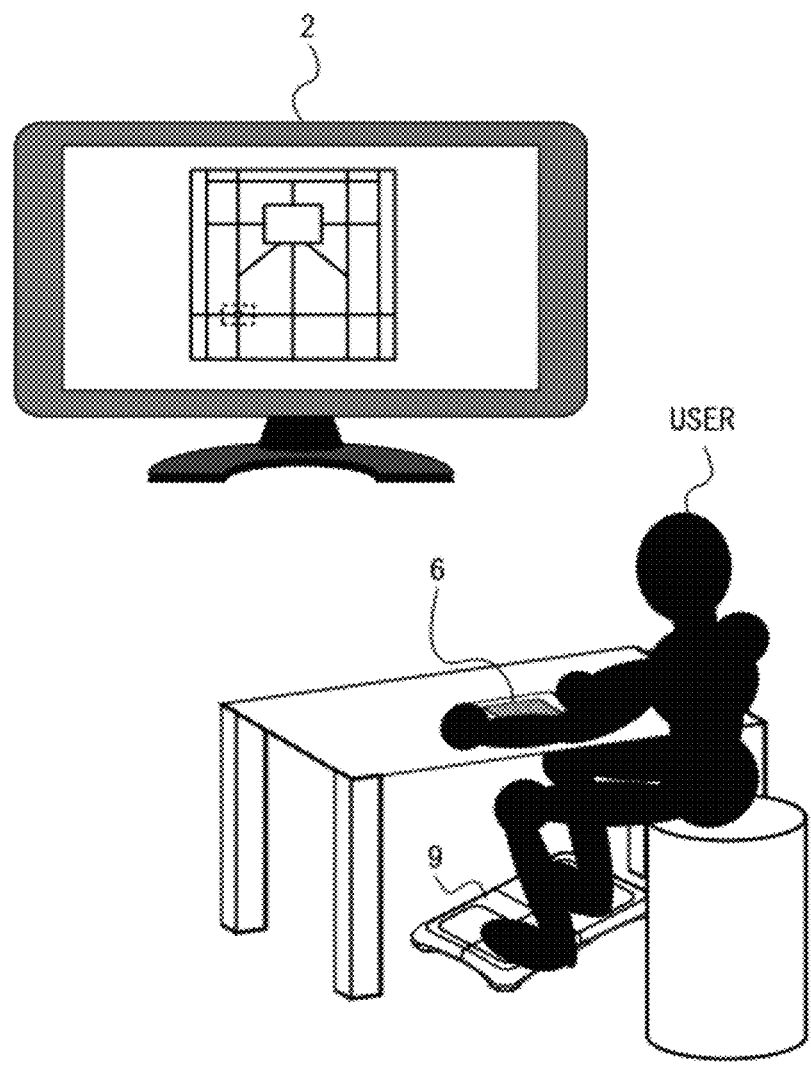

F I G. 1 2 A
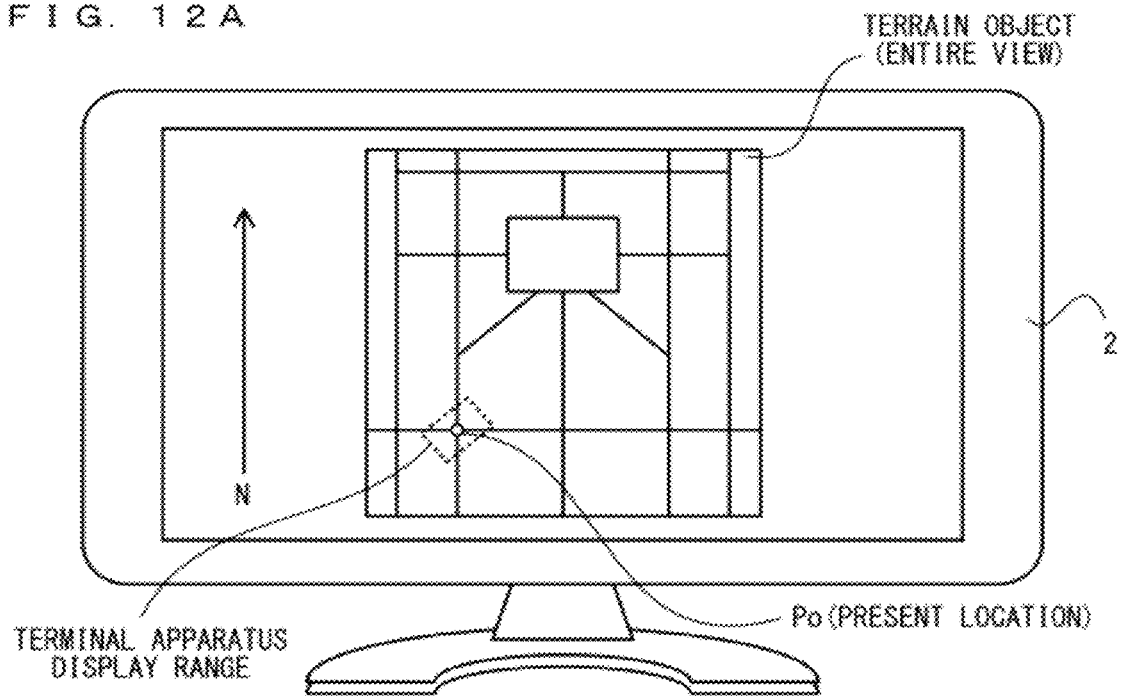
F I G. 1 2 B
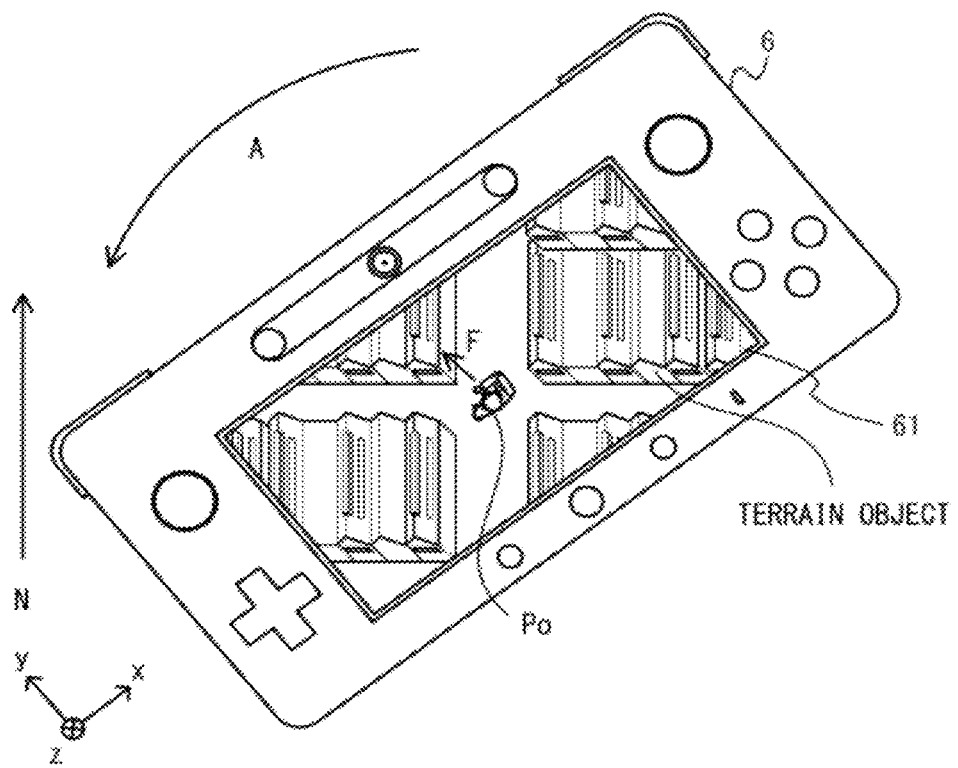

FIG. 14
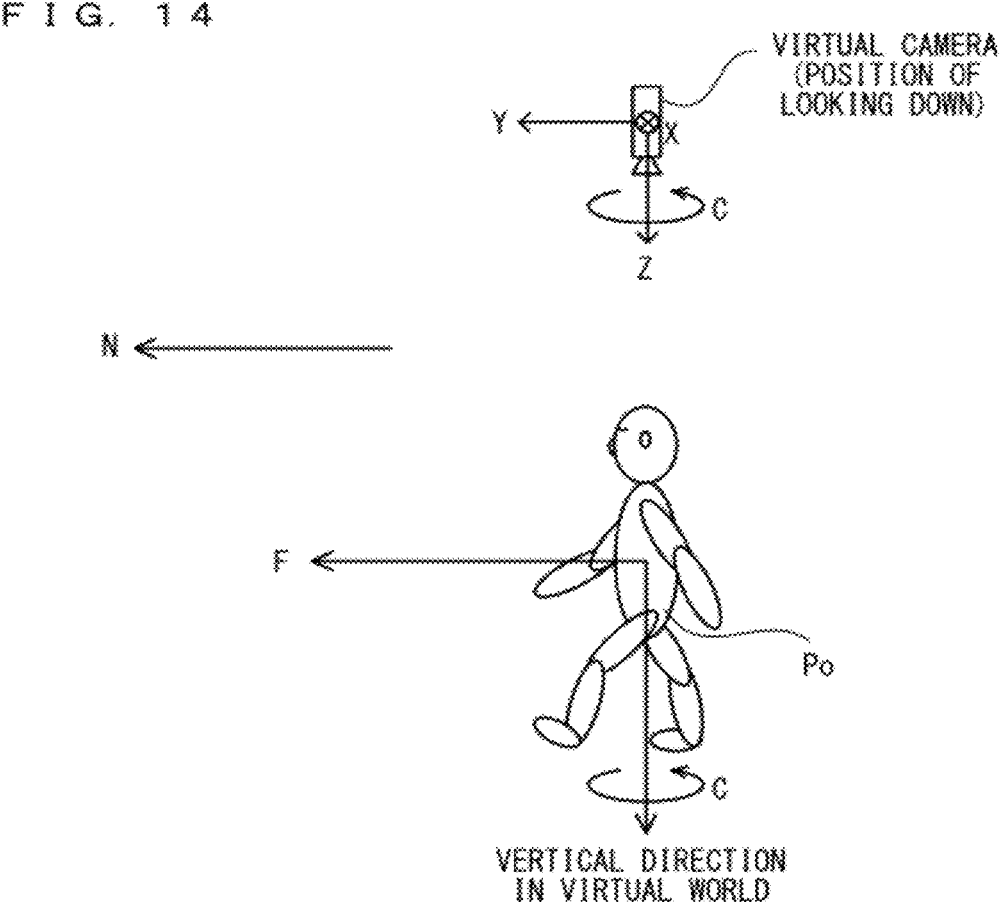
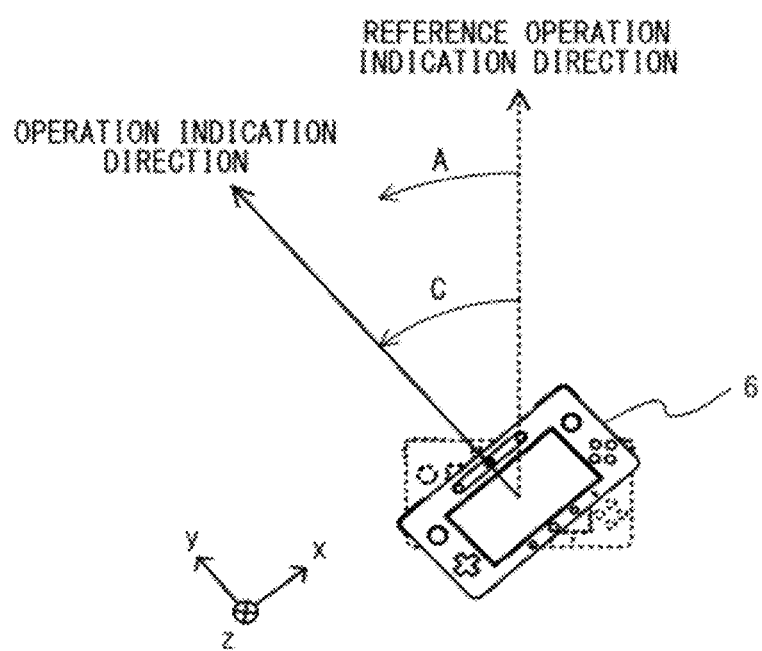

FIG. 17
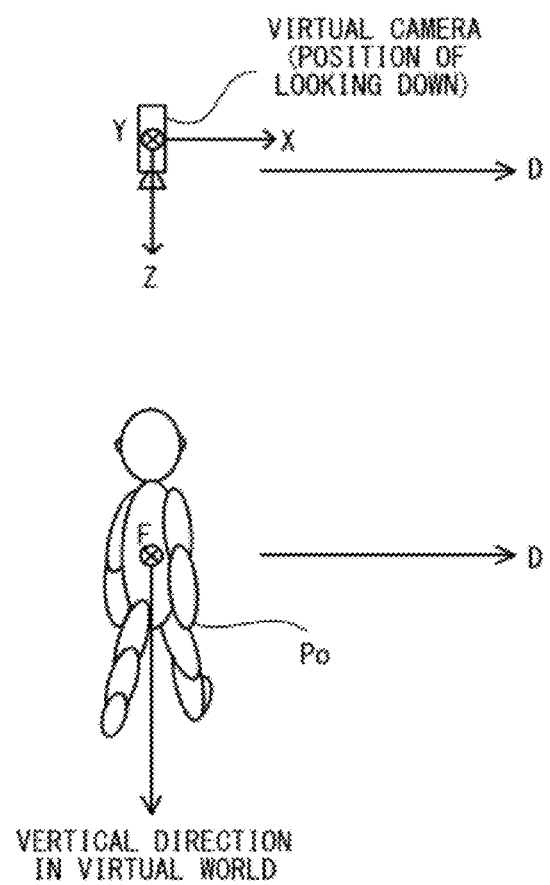
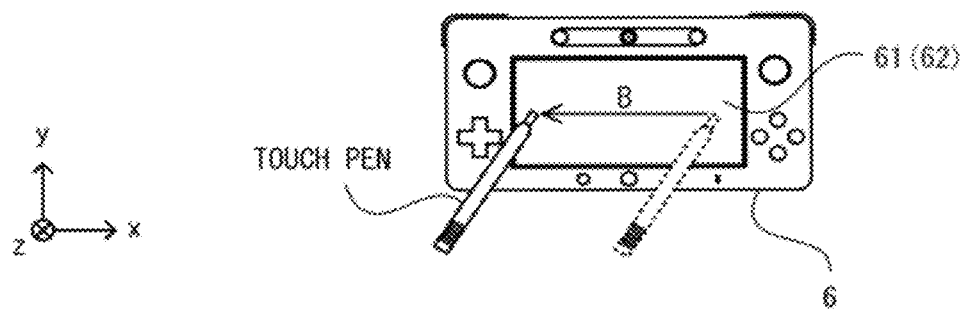

FIG. 18
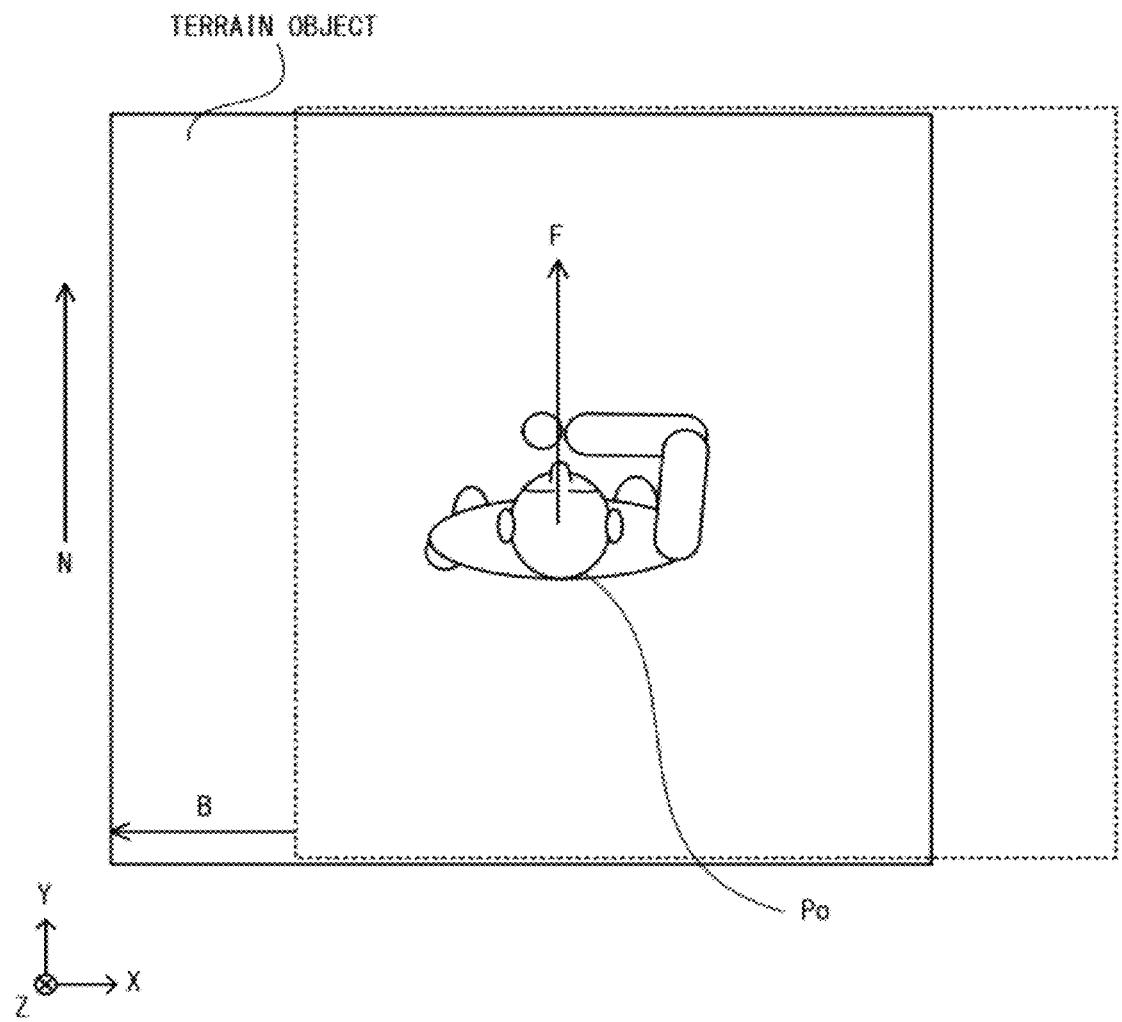
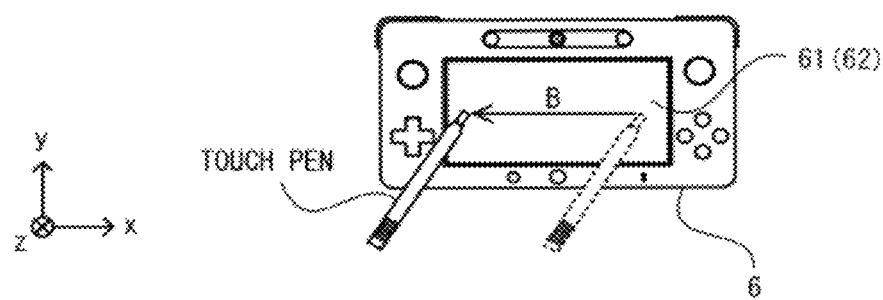

STORAGE MEDIUM HAVING STORED THEREON INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosures of Japanese Patent Application No. 2011-050039, filed on Mar. 8, 2011, Japanese Patent Application No. 2011-083453, Japanese Patent Application No. 2011-083454, Japanese Patent Application No. 2011-083455, and Japanese Patent Application No. 2011-083456, filed on Apr. 5, 2011, Japanese Patent Application No. 2011-115402, Japanese Patent Application No. 2011-115403, and Japanese Patent Application No. 2011-115404, filed on May 24, 2011, Japanese Patent Application No. 2011-118901 and Japanese Patent Application No. 2011-118902, filed on May 27, 2011, Japanese Patent Application No. 2011-123644, Japanese Patent Application No. 2011-123645, and Japanese Patent Application No. 2011-123646, filed on Jun. 1, 2011, and Japanese Patent Application No. 2011-225538, filed on Oct. 13, 2011, are incorporated herein by reference.

FIELD

The technique shown here relates to a storage medium having stored thereon an information processing program, an information processing apparatus, an information processing system, and an information processing method, and in particular, relates to a storage medium having stored thereon an information processing program that, for example, displays a virtual world, and an information processing apparatus, an information processing system, and an information processing method that, for example, display a virtual world.

BACKGROUND AND SUMMARY

Conventionally, there is a game where a user operates a mobile hand-held terminal (hand-held game apparatus) while holding it, and an event is executed in accordance with the attitude and the position of the mobile hand-held terminal in real space. The mobile hand-held terminal includes a sensor that detects the position and the attitude of the mobile hand-held terminal in real space, and the user of the terminal advances the game by moving the mobile hand-held terminal and changing the attitude of the mobile hand-held terminal. For example, in accordance with the attitude of the mobile hand-held terminal in real space, the mobile hand-held terminal scrolls an image displayed on a display screen of the mobile hand-held terminal. Then, a scope is displayed at the center of the display screen of the mobile hand-held terminal, so that when a predetermined button of the mobile hand-held terminal has been pressed in the state where a virtual object (e.g., an insect object) is included in the scope, it is considered that the virtual object has been caught in the scope.

To change the point of view toward an image of a virtual world displayed on the display screen, however, the mobile hand-held terminal needs to scroll the image on the basis of the attitude of the mobile hand-held terminal. Accordingly, to shift the point of view toward the virtual world, the mobile hand-held terminal needs to be moved. This may make it difficult for the user to operate the mobile hand-held terminal. For example, to significantly shift the point of view toward the virtual world, the mobile hand-held terminal also needs to be moved significantly. This requires the user to make a large motion, and additionally, if the real space where the mobile hand-held terminal can be moved is limited, it may not be possible to shift the point of view to the position desired by the user.

Therefore, it is an object of the exemplary embodiment to provide a storage medium having stored thereon an information processing program capable of, when the point of view toward an image displayed on an apparatus changes on the basis of the motion and the attitude of the apparatus body, further facilitating the operation of changing the point of view, and an information processing apparatus, an information processing system, and an information processing method that are capable of, when the point of view toward an image displayed on an apparatus changes on the basis of the motion and the attitude of the apparatus body, further facilitating the operation of changing the point of view.

To achieve the above object, the exemplary embodiment may employ, for example, the following configurations. It is understood that when the description of the scope of the appended claims is interpreted, the scope should be interpreted only by the description of the scope of the appended claims. If the description of the scope of the appended claims contradicts the description of these columns, the description of the scope of the appended claims has priority.

In an exemplary configuration of a computer-readable storage medium having stored thereon an information processing program according to the exemplary embodiment, the information processing program is executed by a computer of an information processing apparatus capable of displaying an image on a portable display apparatus that outputs at least body state data based on an attitude and/or a motion of the portable display apparatus body and touch position data based on a touch position on a touch panel provided in the portable display apparatus. The information processing program causes the computer to execute: controlling, on the basis of the body state data and the touch position data, an attitude and/or a position of a first virtual camera for generating an image of a virtual world; and displaying on the portable display apparatus a first image representing the virtual world viewed from the first virtual camera.

It should be noted that the information processing apparatus may be an apparatus that performs game processing and generates an image based on the game processing, or may be a versatile apparatus such as a general personal computer. The portable display apparatus may have a size small enough to be carried by a user. Typically, the portable display apparatus may be a display apparatus that allows the user to view an image displayed thereon by holding it with both hands. Further, as in a terminal apparatus according to the embodiment described later, the portable display apparatus may or may not include components other than: means for outputting at least data based on the attitude and/or the motion of the portable display apparatus body; means for outputting touch position data based on a touch position on a touch panel provided on a surface of a display screen of the portable display apparatus; and a display screen that displays the first image.

Based on the above, when the point of view toward an image displayed on the portable display apparatus changes on the basis of the motion and the attitude of the portable display apparatus body, the point of view can be changed also by a touch operation. This further facilitates the operation of a user changing the point of view. For example, even when it is desired to significantly shift the point of view in the virtual world, it is possible to significantly shift the point of view by the touch operation. This eliminates the need for the operation of significantly moving the portable display apparatus body to shift the point of view.

In addition, the information processing program may further cause the computer to execute calculating the attitude and/or the motion of the portable display apparatus on the basis of the body state data. In this case, the attitude and/or the position of the first virtual camera may be controlled on the basis of the calculated attitude and/or motion of the portable display apparatus and the touch position indicated by the touch position data.

Based on the above, it is possible to calculate the attitude and/or the motion of the portable display apparatus using the body state data output from the portable display apparatus, and control the attitude and/or the position of the first virtual camera on the basis of the attitude and/or the motion of the portable display apparatus.

In addition, the attitude of the first virtual camera may be controlled on the basis of the attitude and/or the motion of the portable display apparatus such that the first virtual camera rotates relative to the virtual world, and the position of the first virtual camera may be controlled, on the basis of the touch position indicated by the touch position data, such that the first virtual camera moves relative to the virtual world.

Based on the above, the user can perform various operations such as: causing the first virtual camera to rotate relative to the virtual world, by performing the operation based on the attitude and/or the motion of the portable display apparatus body; and causing the first virtual camera to move relative to the virtual world, by performing the touch operation on the touch panel provided on a display screen of the portable display apparatus.

In addition, the attitude of the first virtual camera may be controlled on the basis of the attitude and/or the motion of the portable display apparatus such that the first virtual camera rotates relative to an object placed in the virtual world, and the position of the first virtual camera may be controlled, on the basis of the touch position indicated by the touch position data, such that the first virtual camera moves relative to the object.

Based on the above, when the point of view toward the object displayed on the portable display apparatus changes on the basis of the motion and the attitude of the portable display apparatus body, the point of view can be changed also by the touch operation. This makes it possible to further facilitate the operation of changing the point of view from which the user views the object. For example, even when it is desired to significantly move the range in which the object is displayed on the display screen, it is possible to significantly move the display range by the touch operation. This eliminates the need for the operation of significantly moving the portable display apparatus body to move the display range.

In addition, the information processing program may further cause the computer to execute controlling, on the basis of the calculated attitude and/or motion of the portable display apparatus and the touch position indicated by the touch position data, an action of a player object placed in the virtual world. In this case, the first virtual camera may be placed at a position of generating an image of the virtual world, the image including at least the player object.

Based on the above, it is possible to perform the operation of changing the attitude and/or the position of the first virtual camera, and simultaneously perform the operation of controlling the action of the player object.

In addition, the first virtual camera may be placed at a position of looking down from directly above the player object in the virtual world.

Based on the above, it is possible to display on the portable display apparatus an image obtained by looking down upon the player object placed in the virtual world.

In addition, an attitude of the player object may be controlled on the basis of the attitude and/or the motion of the portable display apparatus such that the player object rotates relative to the virtual world about a vertical direction in the virtual world, in the same direction of rotation and by the same angle of rotation as a direction of rotation and an angle of rotation of the first virtual camera. A position of the player object may be controlled, on the basis of the touch position indicated by the touch position data, such that the player object moves relative to the virtual world in the same moving direction and at the same moving distance as a moving direction and a moving distance of the first virtual camera.

Based on the above, the attitude and/or the position of the player object change in a similar manner to changes in the attitude and/or the position of the first virtual camera. This makes it possible to generate an image in which the player object is displayed always in the same state on the display screen of the portable display apparatus. Further, the display of the player object always in the same state on the display screen enables an intuitive and easy operation of controlling the action of the player object on the basis of the attitude and/or the motion of the portable display apparatus body, and also on the basis of the touch position.

In addition, the information processing program may further cause the computer to execute calculating, on the basis of the touch position data, a displacement of the touch position input to the touch panel. In this case, the first virtual camera may be controlled on the basis of the displacement of the touch position so as to move relative to the virtual world.

Based on the above, it is possible to cause the first virtual camera to move relative to the virtual world, by performing the operation of changing the touch position on the touch panel, such as a drag operation performed on the touch panel.

In addition, a moving direction in which the first virtual camera is to be caused to move may be calculated on the basis of a direction of the displacement of the touch position, and the first virtual camera may be controlled so as to move relative to the virtual world in the moving direction.

Based on the above, the moving direction of the first virtual camera is set on the basis of the direction in which the touch position on the touch panel is changed. This makes it possible to cause the first virtual camera to move relatively in the direction desired by the user.

In addition, a direction opposite to the direction of the displacement of the touch position may be calculated as the moving direction.

In addition, a direction opposite to a direction that corresponds to the direction of the displacement and is included in the virtual world displayed so as to overlap the displacement of the touch position may be calculated as the moving direction.

Based on the above, the first virtual camera moves in the direction opposite to the direction in which the touch position on the touch panel is changed, and the virtual world displayed on the display screen is scrolled so as to follow the moving direction of the touch position on the touch panel. This makes it possible to perform the operation of shifting the point of view in an intuitive manner.

In addition, a moving distance at which the first virtual camera is to be caused to move may be calculated on the basis of an amount of the displacement of the touch position, and the first virtual camera may be controlled so as to move relative to the virtual world at the moving distance.

Based on the above, the moving distance of the first virtual camera is set on the basis of the amount of change in the touch position on the touch panel. This makes it possible to cause the first virtual camera to move relatively at the distance desired by the user.

In addition, a distance corresponding to the amount of the displacement and included in the virtual world displayed so as to overlap the displacement of the touch position may be calculated as the moving distance.

Based on the above, it is possible to cause the first virtual camera to move relatively at the same distance as the amount of change in the touch position on the touch panel. This makes it possible to perform the operation of shifting the point of view in an intuitive manner.

In addition, at least an attitude and/or a motion of the portable display apparatus that are obtained by rotating the portable display apparatus about a perspective direction of, and perpendicular to, a display screen of the portable display apparatus may be calculated. The attitude of the first virtual camera may be controlled in accordance with the attitude and/or the motion of the portable display apparatus that are obtained by rotating the portable display apparatus about the perspective direction.

Based on the above, it is possible to change the attitude of the first virtual camera by moving the portable display apparatus so as to rotate (roll) about the perspective direction of the display screen of the portable display apparatus.

In addition, the attitude of the first virtual camera may be controlled such that in accordance with a direction of rotation in which the portable display apparatus rotates about the perspective direction, the first virtual camera rotates relative to the virtual world about a direction of a line of sight of the first virtual camera and in the direction of rotation.

Based on the above, when the portable display apparatus has been moved so as to rotate (roll) about the perspective direction of the display screen of the portable display apparatus, the first virtual camera rotates relatively about the direction of the line of sight in the same direction as the direction of rotation of the display screen. This makes it possible to display an image as if peeping at the virtual world through the display screen of the portable display apparatus.

In addition, the attitude of the first virtual camera may be controlled such that the first virtual camera rotates relative to the virtual world, in accordance with an angle by which a facing direction of the portable display apparatus body changes about the perspective direction.

Based on the above, the user can control the attitude of the first virtual camera by changing the direction of the portable display apparatus.

In addition, the attitude of the first virtual camera may be controlled such that the first virtual camera rotates relative to the virtual world by the same angle as the angle by which the facing direction of the portable display apparatus body changes.

Based on the above, it is possible to cause the first virtual camera to rotate relatively by the same angle as the angle by which the attitude and/or the position of the portable display apparatus is changed.

In addition, the attitude of the first virtual camera may be controlled such that in accordance with a direction of rotation and an angle of rotation in and by which the portable display apparatus rotates about the perspective direction, the first virtual camera rotates relative to the virtual world about a direction of a line of sight of the first virtual camera in the direction of rotation and by the angle of rotation; and when the touch position data indicates an operation of dragging the touch panel, the position of the first virtual camera may be controlled such that in accordance with a moving direction and a moving distance of the touch position in the virtual world displayed on the display screen so as to overlap the touch position indicated by the touch position data, the first virtual camera moves relative to the virtual world along a plane perpendicular to the direction of the line of sight in a direction opposite to the moving direction and at the moving distance.

Based on the above, when the portable display apparatus has been moved so as to rotate (roll) about the perspective direction of the display screen of the portable display apparatus, the first virtual camera rotates relatively about the direction of the line of sight in the same direction and by the same angle as the direction of rotation and the angle of rotation of the display screen. This makes it possible that even when the display screen of the portable display apparatus has rotated, the virtual world displayed on the display screen is always displayed in the same direction in real space. Further, when a drag operation has been performed on the touch panel of the portable display apparatus, it is possible to display the virtual world, displayed on the display screen, by causing the virtual world to move so as to follow the drag operation.

In addition, the information processing program may further cause the computer to execute acquiring data based on a load applied to a load detection device. In this case, a position of the player object may be controlled on the basis of the acquired data such that the player object moves relative to the virtual world.

It should be noted that the load detection device may be, as an example, a device that detects a load applied to the load detection device with at least a part of the user's body placed thereon, and is turned on/off in accordance with the load. Such a device may be: one operated by the user mounted thereon with both soles in surface contact with the top surface of the device; one operated by the user with only one foot placed on the top surface of the device; one operated by the user with another part of the body (e.g., a hand) placed on the device; or the like.

Based on the above, it is also possible to cause the player object to move by the operation performed by the user using the load detection device. This enables the user to perform the operation of causing the player object to move using the load detection device, while adjusting the point of view by moving the portable display apparatus while viewing the first image on the portable display apparatus, and by operating the touch panel. This enables the user to perform an operation in an unprecedented operation environment.

In addition, the portable display apparatus may include at least one of a gyro sensor and an acceleration sensor. The attitude and/or the motion of the portable display apparatus may be calculated on the basis of data output from the at least one of the gyro sensor and the acceleration sensor.

Based on the above, using the data that is output from the gyro sensor and indicates the angular velocity generated in the portable display apparatus and/or the data that is output from the acceleration sensor and indicates the acceleration generated in the portable display apparatus, it is possible to accurately calculate the attitude and the motion of the portable display apparatus.

In addition, image data indicating the first image may be output to the portable display apparatus. The portable display apparatus may include an image data acquisition unit that acquires the image data output from the information processing apparatus. A display screen of the portable display apparatus may display the first image indicated by the image data acquired by the image data acquisition unit.

Based on the above, the portable display apparatus can function as a so-called thin-client terminal, which does not perform information processing such as game processing.

In addition, the information processing program may further cause the computer to execute generating compression image data by compressing the image data indicating the first image. In this case, the generated compression image data may be output to the portable display apparatus. The image data acquisition unit may acquire the compression image data output from the information processing apparatus. The portable display apparatus may further include a display image decompression unit that decompresses the compression image data to obtain the image data indicating the first image. The display screen of the portable display apparatus may display the first image indicated by the image data that has been acquired by the image data acquisition unit and has been decompressed by the display image decompression unit.

Based on the above, the first image is decompressed before being output from the information processing apparatus to the portable display apparatus. This makes it possible to output the first image at a high speed, and reduce delay caused between the generation of the first image and the display of the first image on the portable display apparatus.

In addition, besides the first image, a second image representing the virtual world viewed from a second virtual camera may be further displayed on another display apparatus connected to the information processing apparatus.

It should be noted that said another display apparatus described above is a display apparatus connected to the information processing apparatus, like a monitor 2 according to the embodiment described later. Said another display apparatus may be a component separate from the portable display apparatus, and may be any apparatus so long as it is capable of displaying the second image generated by the information processing apparatus. For example, said another display apparatus described above may be integrated with the information processing apparatus (in a single housing).

Based on the above, when processing based on the operation of moving the portable display apparatus and the touch operation is performed, it is possible to display the results of the processing not only on the portable display apparatus but also on said another display apparatus connected to the information processing apparatus. This enables the user to use, in accordance with the state of the operation or the user's preference, either one of images displayed on, for example, two apparatuses, and also view an image suitable for an operation of the user. Further, it is possible to use an image displayed on said another display apparatus connected to the information processing apparatus, as, for example, an image to be viewed by another person different from the user. This makes it possible to provide a viewing environment suitable also for the case where a plurality of people view the results of the processing.

In addition, the information processing program may further cause the computer to execute generating compression image data by compressing the image data indicating the first image. In this case, the generated compression image data may be output to the portable display apparatus, and, besides the compression image data, image data indicating the second image may be output to said another display apparatus without being compressed. The portable display apparatus may include: an image data acquisition unit that acquires the compression image data output from the information processing apparatus; and a display image decompression unit that decompresses the compression image data to obtain the image data indicating the first image. A display screen of the portable display apparatus may display the first image indicated by the image data that has been acquired by the image data acquisition unit and has been decompressed by the display image decompression unit.

Based on the above, the first image is decompressed and then output from the information processing apparatus to the portable display apparatus. This makes it possible to output the first image at a high speed, and reduce delay caused between the generation of the first image and the display of the first image on the portable display apparatus.

In addition, the information processing program may further cause the computer to execute setting the second virtual camera at a position different from the position of the first virtual camera, and controlling an attitude and/or a position of the second virtual camera.

Based on the above, the same virtual world is displayed not only on the portable display apparatus but also on said another display apparatus, and images of the virtual world that are different in the point of view are displayed thereon. This enables the user to use, in accordance with the state of the operation or the user's preference, either one of the images displayed on the two apparatuses when performing an operation.

In addition, a direction of a line of sight of the second virtual camera may be set to be parallel to a direction of a line of sight of the first virtual camera, and the second virtual camera may be set behind the first virtual camera. A range wider than a range of the virtual world represented by the first image may be displayed as the second image on said another display apparatus.

Based on the above, an image of the virtual world in a display range wider than that of an image of the virtual world displayed on the portable display apparatus is displayed on said another display apparatus connected to the information processing apparatus. This makes it possible to display on each display apparatus, for example, an image suitable for an operation of the user when the state of the virtual world is presented to the user.

In addition, a direction of a line of sight of the first virtual camera may be set to a vertical direction in the virtual world. A direction of a line of sight of the second virtual camera may be set to the vertical direction in the virtual world.

Based on the above, the same virtual world is displayed not only on the portable display apparatus but also on said another display apparatus, and images of the virtual world obtained by viewing it from a bird's-eye view are displayed on the portable display apparatus and said another display apparatus. This makes it possible to display on each display apparatus, for example, an image suitable for an operation of the user when the state of the virtual world is presented to the user.

In addition, the exemplary embodiment may be carried out in the forms of an information processing apparatus and an information processing system, each including units that perform the above processes, and an information processing method including the above operations.

The exemplary embodiment makes it possible to, when the point of view toward an image displayed on a portable display apparatus changes on the basis of the motion and the attitude of the portable display apparatus body, further facilitate the operation of changing the point of view.

These and other objects, features, aspects and advantages of the exemplary embodiment will become more apparent from the following detailed description when taken in conjunction with the accompanying drawings.

BRIEF DESCRIPTION OF THE DRAWINGS

FIG. 1 is an external view showing a non-limiting example of a game system 1;

FIG. 3 is a diagram showing a non-limiting example of the external configuration of a terminal apparatus 6 of FIG. 1;

FIG. 9 is a diagram showing a non-limiting example of the state of a user performing an operation using the terminal apparatus 6 and the board-type controller 9;

FIG. 12A is a diagram showing a non-limiting example of an image displayed on the monitor 2 in the case where the terminal apparatus 6 has been roll-rotated counterclockwise on a table from the state shown in FIG. 11B;

FIG. 12B is a diagram showing a non-limiting example of an image displayed on the LCD 61 of the terminal apparatus 6 in the case where the terminal apparatus 6 has been roll-rotated counterclockwise on the table from the state shown in FIG. 11B;

FIG. 14 is a diagram illustrating non-limiting rotational movements of a player object and a virtual camera as an example corresponding to a change in an operation indication direction that is obtained from the attitude of the terminal apparatus 6;

FIG. 17 is a diagram illustrating non-limiting shifting movements of the player object and the virtual camera as an example corresponding to the touch operation performed on the touch panel 62 of the terminal apparatus 6;

FIG. 18 is a diagram illustrating a non-limiting shifting movement of the terrain object as another example corresponding to the touch operation performed on the touch panel 62 of the terminal apparatus 6;

DETAILED DESCRIPTION OF NON-LIMITING EXAMPLE EMBODIMENTS

Figure 2:
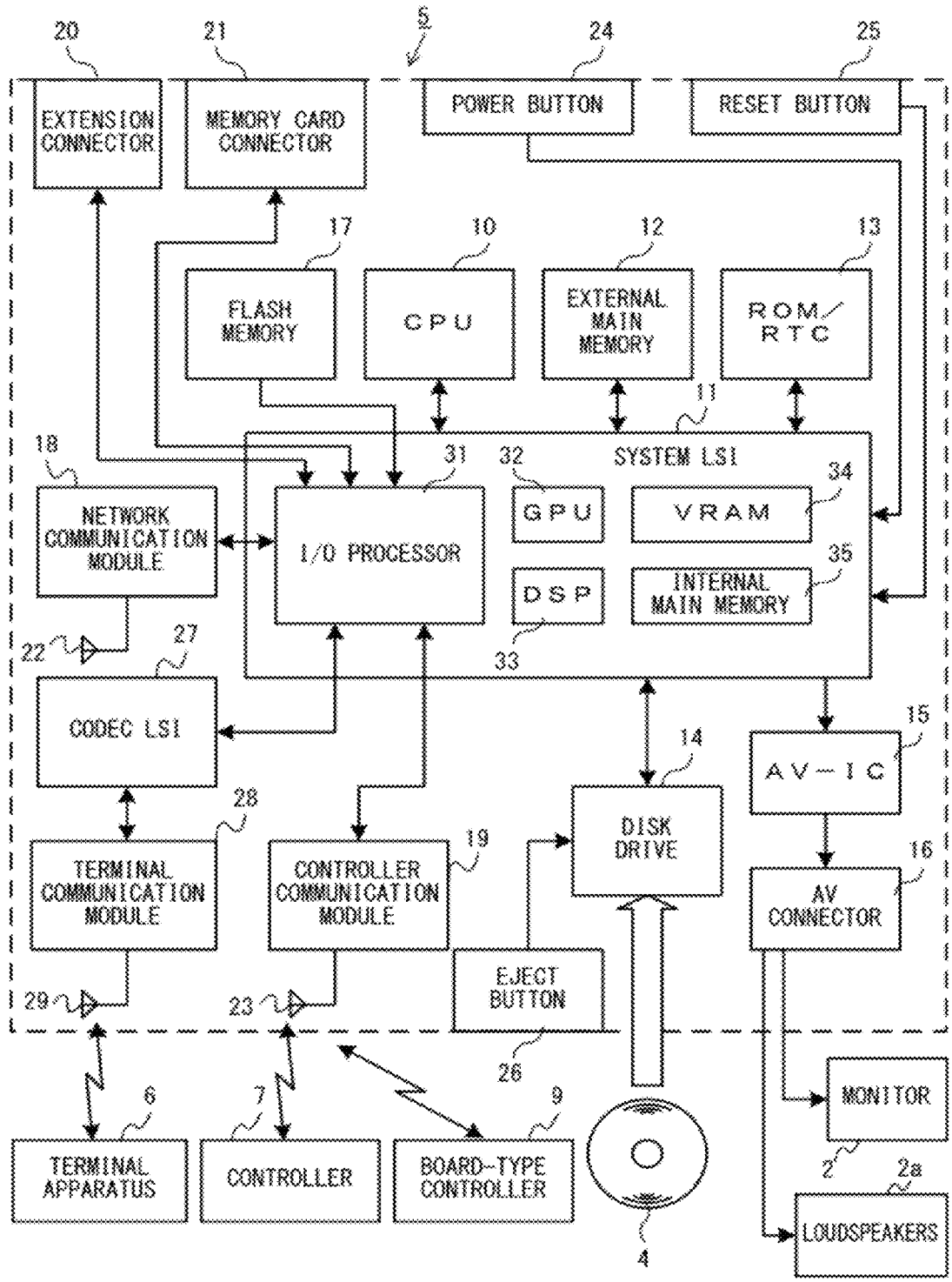
FIG. 2 is a functional block diagram showing a non-limiting example of a game apparatus body 5 of FIG. 1.

With reference to FIG. 1, an information processing apparatus for executing an information processing program according to an exemplary embodiment and an information processing system including the information processing apparatus is described. Hereinafter, in order to provide a specific description, a stationary game apparatus body 5 is used as an example of the information processing apparatus, and a game system including the game apparatus body 5 is described. FIG. 1 is an external view showing an example of the game system 1 including the stationary game apparatus body 5. FIG. 2 is a block diagram showing an example of the game apparatus body 5. Hereinafter, the game system 1 is described.

As shown in FIG. 1, the game system 1 includes a household television receiver (hereinafter referred to as a "monitor") 2 which is an example of display means, and the stationary game apparatus 3 connected to the monitor 2 via a connection cord. The monitor 2 includes loudspeakers 2a for outputting, in the form of sound, a sound signal outputted from the game apparatus 3. Further, the game apparatus 3 includes: an optical disk 4 having stored therein a program (e.g., a game program), which is an example of the information processing program according to the exemplary embodiment; the game apparatus body 5 having a computer for executing the program stored in the optical disk 4 to display a game screen on the monitor 2; a terminal apparatus 6; a controller 7 for providing the game apparatus body 5 with operation information used to operate, for example, objects displayed on the display screen; and a board-type controller 9. The game system 1 performs game processing on the game apparatus body 5 in accordance with a game operation using at least one of the terminal apparatus 6, the controller 7, and the board-type controller 9, and displays a game image obtained by the game processing on the monitor 2 and/or the terminal apparatus 6. The game apparatus body 5 is wirelessly connected to the terminal apparatus 6, the controller 7, and the board-type controller 9 so as to enable wireless communication therebetween. For example, the wireless communication is performed according to the Bluetooth (registered trademark) standard or the IEEE 802.11n standard. The wireless communication, however, may be performed in accordance with other standards such as standards for infrared communication.

The optical disk 4, typifying an information storage medium used for the game apparatus body 5 in an exchangeable manner, is detachably inserted in the game apparatus body 5. The optical disk 4 has stored therein the information processing program (typically, a game program) to be performed by the game apparatus body 5. The game apparatus body 5 has, on a front surface thereof, an insertion opening for the optical disk 4. The game apparatus body 5 reads and executes the information processing program stored in the optical disk 4 inserted into the insertion opening to perform the game processing.

The monitor 2 is connected to the game apparatus body 5 via a connection cord. The monitor 2 displays a game image obtained by the game processing performed by the game apparatus body 5. The monitor 2 includes the loudspeakers 2a. The loudspeakers 2a each output a game sound obtained as a result of the game processing. In another embodiment, the game apparatus body 5 and a stationary display apparatus may be integrated with each other. The communication between the game apparatus body 5 and the monitor 2 may be wireless communication.

The game apparatus body 5 has mounted thereto a flash memory 17 (see FIG. 2) which functions as a backup memory for fixedly storing data such as saved data. The game apparatus body 5 executes the game program or the like stored in the optical disk 4, and displays a result thereof as a game image on the monitor 2 and/or the terminal apparatus 6. The game program or the like to be executed may be stored in advance in the flash memory 17 as well as in the optical disk 4. Further, the game apparatus body 5 may reproduce a state of a game played in the past, using the saved data stored in the flash memory 17, and display an image of the game state on the monitor 2 and/or the terminal apparatus 6. A user of the game apparatus 3 can enjoy the game progress by operating at least one of the terminal apparatus 6, the controller 7, and the board-type controller 9 while viewing the game image displayed on the monitor 2 and/or the terminal apparatus 6.

The controller 7 and the board-type controller 9 each wirelessly transmit transmission data such as operation information, using, for example, the Bluetooth technology, to the game apparatus body 5 having a controller communication module 19. The controller 7 is operation means for performing, for example, selection of options displayed on the display screen of the monitor 2. The controller 7 includes a housing which is small enough to be held by one hand, and a plurality of operation buttons (including a cross key and the like) which are exposed at the surface of the housing. In addition, as is described later, the controller 7 includes an imaging information calculation section for taking an image viewed from the controller 7. As exemplary imaging targets of the imaging information calculation section, two LED modules (hereinafter referred to as "markers") 8L and 8R are provided in the vicinity of the display screen of the monitor 2 (above the screen in FIG. 1). Although details will be described later, a user (player) is allowed to perform a game operation while moving the controller 7, and the game apparatus body 5 uses a marker 8 to calculate the movement, position, attitude and the like of the controller 7. The marker 8 has two markers 8L and 8R at both ends thereof. Specifically, the marker 8L (as well as the marker 8R) includes one or more infrared LEDs (Light Emitting Diodes), and emits infrared light forward from the monitor 2. The marker 8 is connected to the game apparatus body 5, so that the game apparatus body 5 can control the infrared LEDs included in the marker 8 to be lit on or off. The marker 8 is a portable unit, so that the user is allowed to place the marker 8 in a given position. Although FIG. 1 shows a case where the marker 8 is placed on the monitor 2, the location and direction of the marker 8 may be appropriately selected. Further, the controller 7 is capable of receiving, at a communication section, transmission data wirelessly transmitted from the controller communication module 19 of the game apparatus body 5, to generate a sound or vibration based on the transmission data.

In another embodiment, the controller 7 and/or the board-type controller 9 may be wire-connected to the game apparatus body 5. Further, in the exemplary embodiment, the game system 1 includes a controller 7 and a board-type controller 9. The game apparatus body 5, however, is capable of communicating with a plurality of controllers 7 and a plurality of board-type controllers 9. Therefore, a plurality of players can play a game using a predetermined number of controllers 7 and board-type controller 9 simultaneously.

The controller 7 includes a housing which is formed by, for example, plastic molding, and has a plurality of operation sections (operation buttons) in the housing 71. Then, the controller 7 transmits, to the game apparatus body 5, operation data indicating the states of inputs provided to the operation sections (indicating whether or not each operation button has been pressed).

In addition, the controller 7 has the imaging information calculation section that analyzes image data of an image captured by capturing means and determines an area having a high brightness, and thereby calculates the position of the center of gravity, the size, and the like of the area. For example, the imaging information calculation section has capturing means fixed in the housing of the controller 7, and uses as an imaging target a marker that outputs infrared light, such as a marker section 65 of the terminal apparatus 6 and/or the marker 8. The imaging information calculation section calculates the position of the imaging target in a captured image captured by the capturing means, and transmits, to the game apparatus body 5, marker coordinate data indicating the calculated position. The marker coordinate data varies depending on the direction (the angle of tilt) or the position of the controller 7, and therefore, the game apparatus body 5 can calculate the direction and the position of the controller 7 using the marker coordinate data.

In addition, the controller 7 includes therein an acceleration sensor and/or a gyro sensor. The acceleration sensor detects the acceleration generated in the controller 7 (including the gravitational acceleration), and transmits, to the game apparatus body 5, data indicating the detected acceleration. The acceleration detected by the acceleration sensor varies depending on the direction (the angle of tilt) or the movement of the controller 7, and therefore, the game apparatus body 5 can calculate the direction and the movement of the controller 7 using the acquired acceleration data. The gyro sensor detects the angular velocities generated about three axes set in the controller 7, and transmits, to the game apparatus body 5, angular velocity data indicating the detected angular velocities. The acceleration detected by the gyro sensor varies depending on the direction (the angle of tilt) or the movement of the controller 7, and therefore, the game apparatus body 5 can calculate the direction and the movement of the controller 7 using the acquired acceleration data. As described above, the user is allowed to perform a game operation by pressing any of the operation sections 72 provided on the controller 7, and moving the controller 7 so as to change the position and the attitude (tilt) thereof.

The controller 7 has a loudspeaker and a vibrator. The controller 7 processes sound data transmitted from the game apparatus body 5, and outputs sound corresponding to the sound data from the loudspeaker. Further, the controller 7 processes vibration data transmitted from the game apparatus body 5, and generates vibration by actuating the vibrator in accordance with the vibration data. It should be noted that in the exemplary embodiment described later, it is possible to play a game without using the controller 7. A detailed configuration of the board-type controller 9 will be described later.

The terminal apparatus 6 is a portable apparatus that is small enough to be held by the user, and the user is allowed to move the terminal apparatus 6 with hands, or place the terminal apparatus 6 at any location. Although a detailed configuration of the terminal apparatus 6 will be described later, the terminal apparatus 6 includes an LCD (Liquid Crystal Display) 61 as display means, and input means (a touch panel 62, a gyro sensor 604, and the like described later). The terminal apparatus 6 and the game apparatus body 5 (a terminal communication module 28 (see FIG. 2)) are capable of communicating with each other wirelessly or wired. The terminal apparatus 6 receives, from the game apparatus body 5, data of an image (e.g., a game image) generated in the game apparatus body 5, and displays the image represented by the data on an LCD 61. Although the LCD 61 is used as a display apparatus in the exemplary embodiment, the terminal apparatus 6 may include a given other display apparatus, such as a display apparatus utilizing EL (Electro Luminescence), for example. Further, the terminal apparatus 6 transmits, to the game apparatus body 5 having the terminal communication module 28, operation data representing the content of an operation performed on the terminal apparatus 6.

Next, with reference to FIG. 2, the internal configuration of the game apparatus body 5 is described. FIG. 2 is a block diagram showing an example of the internal configuration of the game apparatus body 5. The game apparatus body 5 includes a CPU (Central Processing Unit) 10, a system LSI (Large Scale Integration) 11, an external main memory 12, a ROM/RTC (Read Only Memory/Real Time Clock) 13, a disk drive 14, an AV-IC (Audio Video-Integrated Circuit) 15 and the like.

The CPU 10, serving as a game processor, executes a program stored in the optical disk 4 to perform a process. The CPU 10 is connected to the system LSI 11. In addition to the CPU 10, the external main memory 12, the ROM/RTC 13, the disk drive 14, and the AV-IC 15 are connected to the system LSI 11. The system LSI 11 performs processes such as control of data transmission between the respective components connected thereto, generation of an image to be displayed, and acquisition of data from an external apparatus. The internal configuration of the system LSI 11 will be described later. The external main memory 12, which is a volatile memory, stores programs loaded from the optical disk 4 or the flash memory 17, and stores various data. The external main memory 12 is used as a work area and a buffer area for the CPU 10. The ROM/RTC 13 includes a ROM (so-called boot ROM) incorporating a program for booting the game apparatus body 5, and a clock circuit (RTC) for counting time. The disk drive 14 reads, from the optical disk 4, program data, texture data and the like, and writes the read data into an internal main memory 35 described below or the external main memory 12.

The system LSI 11 includes an input/output processor (I/O processor) 31, a GPU (Graphics Processor Unit) 32, a DSP (Digital Signal Processor) 33, a VRAM (Video RAM) 34, and the internal main memory 35. These components 31 to 35 are connected to each other via an internal bus (not shown).

The GPU 32, which is a part of rendering means, generates an image in accordance with a graphics command (draw command) supplied from the CPU 10. The VRAM 34 stores data (such as polygon data and texture data) used by the GPU 32 to execute the graphics command. When an image is generated, the GPU 32 generates image data using the data stored in the VRAM 3. In the exemplary embodiment, the game apparatus body 5 may generate both a game image to be displayed on the monitor 2 and a game image to be displayed on the terminal apparatus 6. Hereinafter, the game image to be displayed on the monitor 2 may be referred to as a "monitor game image", and the game image to be displayed on the terminal apparatus 6 may be referred to as a "terminal game image".

The DSP 33, serving as an audio processor, generates sound data using sound data and sound waveform (tone quality) data stored in the internal main memory 35 and the external main memory 12. In the exemplary embodiment, similarly to the game images, both a game sound to be output from the loudspeakers 2a of the monitor 2 and a game sound to be output from the loudspeakers of the terminal apparatus 6 may be generated. Hereinafter, the game sound to be output from the monitor 2 may be referred to as a "monitor game sound", and the game sound to be output from the terminal apparatus 6 may be referred to as a "terminal game sound".

Among the image data and sound data generated by the game apparatus body 5, the image data and sound data to be output to the monitor 2 are read by the AV-IC 15. The AV-IC 15 outputs the read image data to the monitor 2 via an AV connector 16, and outputs the read sound data to the loudspeakers 2a included in the monitor 2. Thereby, an image is displayed on the monitor 2, and a sound is output from the loudspeakers 2a.

Further, among the image data and sound data generated by the game apparatus body 5, the image data and sound data to be output to the terminal apparatus 6 are transmitted to the terminal apparatus 6 by the I/O processor 31 or the like. Data transmission to the terminal apparatus 6 by the I/O processor 31 or the like will be described later.

The I/O processor 31 performs data reception and transmission with the components connected thereto, and download of data from an external apparatus. The I/O processor 31 is connected to the flash memory 17, the network communication module 18, the controller communication module 19, an extension connector 20, a memory card connector 21, and a codec LSI 27. An antenna 23 is connected to the controller communication module 19. The codec LSI 27 is connected to the terminal communication module 28, and an antenna 29 is connected to the terminal communication module 28.

The game apparatus body 5 is connected to a network such as the Internet so as to communicate with external information processing apparatuses (for example, other game apparatuses or various servers). That is, the I/O processor 31 is connected to a network via the network communication module 18 and the antenna 22 so as to communicate with external information processing apparatuses connected to the network. The I/O processor 31 accesses the flash memory 17 at regular intervals so as to detect for data to be transmitted to the network. When data to be transmitted is detected, the data is transmitted to the network via the network communication module 18 and the antenna 22. Further, the I/O processor 31 receives, via the network, the antenna 22 and the network communication module 18, data transmitted from the external information processing apparatuses or data downloaded from a download server, and stores the received data in the flash memory 17. The CPU 10 executes a program, and reads the data stored in the flash memory 17 to use the data for execution of the program. The flash memory 17 may store not only the data transmitted and received between the game apparatus body 5 and the external information processing apparatuses, but also saved data (result data or progress data of the process) of the game played with the game apparatus body 5. Further, the flash memory 17 may store programs such as a game program.

The game apparatus body 5 can receive operation data from the controller 7 and/or the board-type controller 9. That is, the I/O processor 31 receives, via the antenna 23 and the controller communication module 19, operation data or the like transmitted from the controller 7 and/or the board-type controller 9, and stores (temporarily) the data in a buffer region of the internal main memory 35 or the external main memory 12. Similarly to the external main memory 12, the internal main memory 35 may store a program loaded from the optical disk 4 or a program loaded from the flash memory 17, and various data. The internal main memory 35 may be used as a work region or buffer region of the CPU 10.

The game apparatus body 5 is capable of transmitting/receiving image data, sound data and the like to/from the terminal apparatus 6. When transmitting a game image (terminal game image) to the terminal apparatus 6, the I/O processor 31 outputs data of a game image generated by the GPU 32 to the codec LSI 27. The codec LSI 27 performs a predetermined compression process on the image data supplied from the I/O processor 31. The terminal communication module 28 performs wireless communication with the terminal apparatus 6. Accordingly, the image data compressed by the codec LSI 27 is transmitted by the terminal communication module 28 to the terminal apparatus 6 via the antenna 29. In the exemplary embodiment, the codec LSI 27 compresses the image data using a highly efficient compression technique, for example, the H.264 standard. The codec LSI 27 may adopt other compression techniques. When the communication rate is sufficiently high, uncompressed image data may be transmitted. The terminal communication module 28 is, for example, a Wi-Fi certified communication module. The terminal communication module 28 may perform wireless communication with the terminal apparatus 6 at a high speed using, for example, the technique of MIMO (Multiple Input Multiple Output) adopted in the IEEE 802.11n standard, or may use other communication techniques.

The game apparatus body 5 transmits, to the terminal apparatus 6, sound data as well as the image data. That is, the I/O processor 31 outputs sound data generated by the DSP 33 to the terminal communication module 28 via the codec LSI 27. The codec LSI 27 performs a compression process on the sound data in a similar manner to that for the image data. Any compression technique may be adopted for the sound data. In another embodiment, uncompressed sound data may be transmitted. The terminal communication module 28 transmits the compressed image data and sound data to the terminal apparatus 6 via the antenna 29.

The game apparatus body 5 transmits, in addition to the image data and sound data, various control data to the terminal apparatus 6, where necessary. The control data represent control instructions for the components included in the terminal apparatus 6, such as an instruction to control on/off of a marker section (a marker section 65 shown in FIG. 5), and an instruction to control image taking of a camera (a camera 66 shown in FIG. 10). The I/O processor 31 transmits the control data to the terminal apparatus 6 in response to an instruction from the CPU 5. In the exemplary embodiment, the codec LSI 27 does not perform a data compression process on the control data. Alternatively, in another embodiment, the codec LSI 27 may perform a compression process on the control data. The above data transmitted from the game apparatus body 5 to the terminal apparatus 6 may be encrypted where necessary, or may not be encrypted.

The game apparatus body 5 can receive various data from the terminal apparatus 6. Although details will be described later, in the exemplary embodiment, the terminal apparatus 6 transmits operation data, image data, and sound data. The respective data transmitted from the terminal apparatus 6 are received by the terminal communication module 28 via the antenna 29. The image data and sound data transmitted from the terminal apparatus 6 have been subjected to a similar compression process to that for the image data and sound data transmitted from the game apparatus body 5 to the terminal apparatus 6. Accordingly, these image data and sound data are transmitted from the terminal communication module 28 to the codec LSI 27, and subjected to a decompression process by the codec LSI 27. The decompressed data are output to the I/O processor 31. On the other hand, the operation data transmitted from the terminal apparatus 6 is smaller in amount than the image data and sound data, and therefore, the operation data does not need to be compressed. The operation data may be encrypted where necessary, or may not be encrypted. Accordingly, the operation data, which has been received by the terminal communication module 28, is output to the I/O processor 31 via the codec LSI 27. The I/O processor 31 stores (temporarily) the data received from the terminal apparatus 6 in the buffer region of the internal main memory 35 or the external main memory 12.

The game apparatus body 5 is connectable to other devices and external storage media. That is, an extension connector 20 and a memory card connector 21 are connected to the I/O processor 31. The expansion connector 20 is an interface connector as typified by a USB and an SCSI, and is capable of performing communication with the network, instead of the network communication module 18, by connecting thereto a medium such as an external storage medium, a peripheral device such as another controller, or a wired communication connector. The memory card connector 21 is a connector for connecting thereto an external storage medium such as a memory card. For example, the I/O processor 31 accesses the external storage medium via the expansion connector 20 or the memory card connector 21 to save or read data.

The game apparatus body 5 includes (on the front main surface thereof, for example) a power button 24, a reset button 25, an insertion slot in which the optical disk 4 is inserted, an eject button 26 for ejecting the optical disk 4 from the insertion slot of the game apparatus body 5, and the like. The power button 24 and the reset button 25 are connected to the system LSI 11. When the power button 24 is turned on, the respective components of the game apparatus body 5 are supplied with power. When the reset button 25 is pressed, the system LSI 11 re-executes the boot program of the game apparatus body 5. The eject button 26 is connected to the disk drive 14. When the eject button 26 is pressed, the optical disk 4 is ejected from the disk drive 14.

In another embodiment, some of the components of the game apparatus body 5 may be constituted as an extension device separated from the game apparatus body 5. At this time, the extension device may be connected to the game apparatus body 5 via the extension connector 20. Specifically, the extension device may include, for example, the codec LSI 27, the terminal communication module 28, and the antenna 29, and may be detachably connected to the extension connector 20. Thus, by connecting the extension device to the game apparatus body which does not have the above components, the game apparatus body can be made capable of communicating with the terminal apparatus 6.

Figure 4:
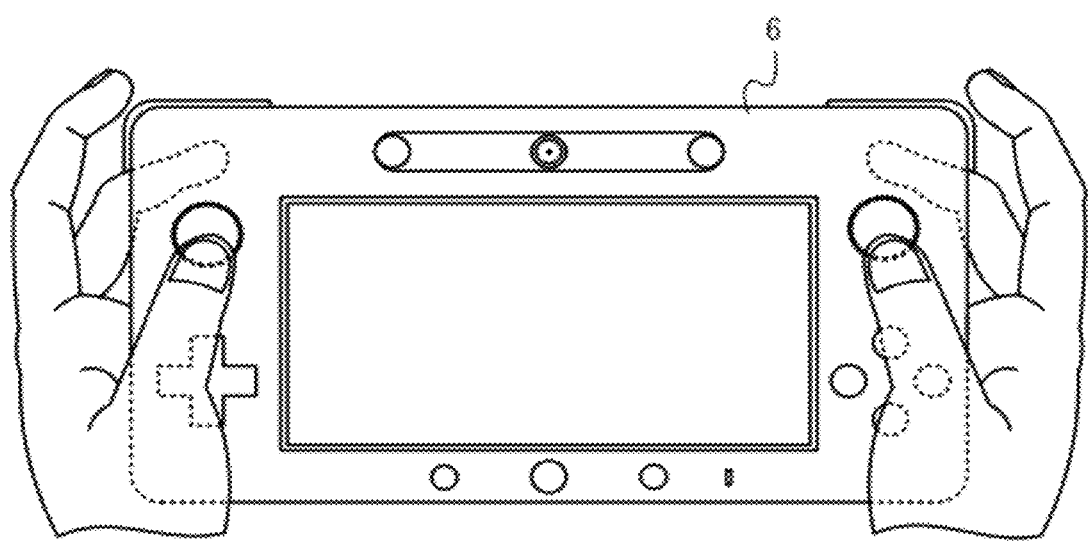
FIG. 4 is a diagram showing a non-limiting example of the state where a user holds the terminal apparatus 6.
Figure 5:
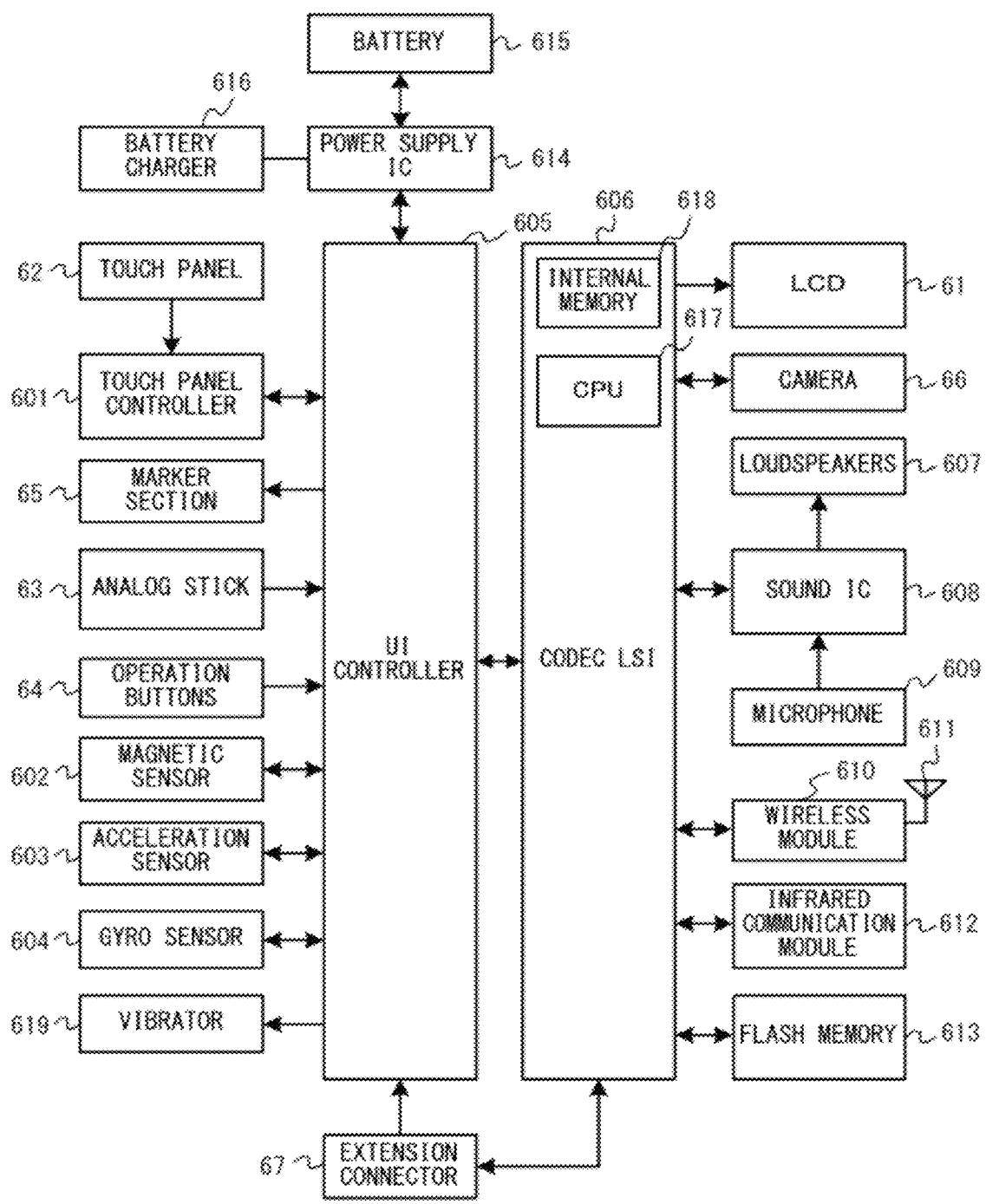
FIG. 5 is a block diagram showing a non-limiting example of the internal configuration of the terminal apparatus 6 of FIG. 3.

Next, with reference to FIGS. 3 through 5, the configuration of the terminal apparatus 6 is described. FIG. 3 is a diagram showing an example of the external configuration of the terminal apparatus 6. More specifically, (a) of FIG. 3 is a front view of the terminal apparatus 6, (b) of FIG. 3 is a top view, (c) of FIG. 3 is a right side view, and (d) of FIG. 3 is a bottom view. FIG. 4 shows an example of the state where a user holds the terminal apparatus 6 with both hands.

As shown in FIG. 3, the terminal apparatus 6 includes a housing 60 which generally has a horizontally long plate-like rectangular shape. The housing 60 is small enough to be held by the user. Therefore, the user is allowed to move the terminal apparatus 6 with hands, and change the location of the terminal apparatus 6.

The terminal apparatus 6 includes an LCD 61 on a front surface of the housing 60. The LCD 61 is provided near the center of the front surface of the housing 60. Therefore, as shown in FIG. 4, the user, holding the housing 60 at portions to the right and left of the LCD 61, is allowed to move the terminal apparatus 6 while viewing a screen of the LCD 61. FIG. 4 shows an example where the user holds the terminal apparatus 6 horizontally (i.e., with the longer sides of the terminal apparatus 6 being oriented horizontally) by holding the housing 60 at portions to the right and left of the LCD 61. The user, however, may hold the terminal apparatus 6 vertically (i.e., with the longer sides of the terminal apparatus 6 being oriented vertically).

As shown in (a) of FIG. 3, the terminal apparatus 6 includes, as operation means, a touch panel 62 on the screen of the LCD 61. In the exemplary embodiment, the touch panel 62 is, but is not limited to, a resistive film type touch panel. However, a touch panel of a given type, such as electrostatic capacitance type, may be used. The touch panel 62 may be of single touch type or multiple touch type. In the exemplary embodiment, the touch panel 62 has the same resolution (detection accuracy) as that of the LCD 61. The resolution of the touch panel 62 and the resolution of the LCD 61, however, do not need to be the same. Although an input to the touch panel 62 is usually performed using a touch pen, in addition to the touch pen, a finger of the user may be used to perform an input to the touch panel 62. The housing 60 may have an opening for accommodating the touch pen used to perform an operation to the touch panel 62. The terminal apparatus 6 has the touch panel 62, and therefore, the user is allowed to operate the touch panel 62 while moving the terminal apparatus 6. That is, the user is allowed to directly (using the touch panel 62) perform an input to the screen of the LCD 61 while moving the LCD 61.

As shown in FIG. 3, the terminal apparatus 6 has, as operation means, two analog sticks 63A and 63B, and a plurality of operation buttons 64A through 64L. The analog sticks 63A and 63B are each a device for designating a direction. The analog sticks 63A and 63B are each configured such that a stick part thereof to be operated by a finger of the user is slidable or tiltable in a given direction (at a given angle in a given direction such as the upward, the downward, the rightward, the leftward, or the diagonal direction) with respect to the front surface of the housing 60. The left analog stick 63A is provided to the left of the screen of the LCD 61, and the right analog stick 63B is provided to the right of the screen of the LCD 61. Therefore, the user is allowed to perform an input for designating a direction using the analog stick 63A or 63B with either the left or right hand. Further, as shown in FIG. 4, the analog sticks 63A and 63B are positioned so as to be operated by the user holding the right and left portions of the terminal apparatus 6. Therefore, the user is allowed to easily operate the analog sticks 63A and 63B when the user holds and moves the terminal apparatus 6.

The operation buttons 64A through 64L are each operation means for performing a predetermined input. As described below, the operation buttons 64A through 64L are positioned so as to be operated by the user holding the right and left portions of the terminal apparatus 6 (see FIG. 4). Accordingly, the user is allowed to easily operate the operation means when the user holds and moves the terminal apparatus 6.

As shown in (a) of FIG. 3, among the operation buttons 64A through 64L, the cross button (direction input button) 64A and the operation buttons 64B through 64H are provided on the front surface of the housing 60. The operation buttons 64A through 64H are positioned so as to be operated by a thumb of the user (see FIG. 4).

The cross button 64A is provided to the left of the LCD 61 and beneath the left analog stick 63A. That is, the cross button 64A is positioned so as to be operated by the left hand of the user. The cross button 64A is cross-shaped, and is capable of indicating an upward, a downward, a leftward, or a rightward direction. The operation buttons 64B through 64D are provided beneath the LCD 61. The three operation buttons 64B through 64D are positioned so as to be operated by the right and left hands of the user. The four operation buttons 64E through 64H are provided to the right of the LCD 61 and beneath the right analog stick 63B. That is, the four operation buttons 64E through 64H are positioned so as to be operated by the right hand of the user. Further, the four operation buttons 64E, 64H, 64F, and 64G are positioned upward, downward, leftward, and rightward, respectively, with respect to a center position of the four operation buttons. Accordingly, the terminal apparatus 6 may cause the four operation buttons 64E through 64H to function as buttons which allow the user to designate an upward, a downward, a leftward, or a rightward direction.

As shown in (a), (b), and (c) of FIG. 3, a first L button 64I and a first R button 64J are provided on diagonal upper portions (an upper left portion and an upper right portion) of the housing 60. Specifically, the first L button 64I is provided on the left end of the upper side surface of the plate-shaped housing 60 so as to protrude from the upper and left side surfaces. The first R button 64J is provided on the right end of the upper side surface of the housing 60 so as to protrude from the upper and right side surfaces. In this way, the first L button 64I is positioned so as to be operated by the index finger of the left hand of the user, and the first R button 64J is positioned so as to be operated by the index finger of the right hand of the user (see FIG. 4).

As shown in (b) and (c) of FIG. 3, leg parts 68A and 68B are provided so as to protrude from a rear surface (i.e., a surface reverse of the front surface on which the LCD 61 is provided) of the plate-shaped housing 60, and a second L button 64K and a second R button 64L are provided so as to protrude from the leg parts 68A and 68B, respectively. Specifically, the second L button 64K is provided at a slightly upper position on the left side (the left side as viewed from the front surface side) of the rear surface of the housing 60, and the second R button 64L is provided at a slightly upper position on the right side (the right side as viewed from the front-surface side) of the rear surface of the housing 60. In other words, the second L button 64K is provided at a position substantially opposite to the left analog stick 63A provided on the front surface, and the second R button 64L is provided at a position substantially opposite to the right analog stick 63B provided on the front surface. The second L button 64K is positioned so as to be operated by the middle finger of the left hand of the user, and the second R button 64L is positioned so as to be operated by the middle finger of the right hand of the user (see FIG. 4). Further, as shown in (c) of FIG. 3, the leg parts 68A and 68B each have a surface facing obliquely upward, and the second L button 64K and the second R button 64L are provided on the oblique surfaces of the leg parts 68A and 68B, respectively. Thus, the second L button 64K and the second R button 64L have button surfaces facing obliquely upward. It is supposed that the middle finger of the user moves vertically when the user holds the terminal apparatus 6, and therefore, the upward facing button surfaces allow the user to easily press the second L button 64K and the second R button 64L. Further, the leg parts 68A and 68B provided on the rear surface of the housing 60 allow the user to easily hold the housing 60. Moreover, the operation buttons provided on the leg parts 68A and 68B allow the user to easily perform operation while holding the housing 60.

In the terminal apparatus 6 shown in FIG. 3, the second L button 64K and the second R button 64L are provided on the rear surface of the housing 60. Therefore, if the terminal apparatus 6 is placed with the screen of the LCD 61 (the front surface of the housing 60) facing upward, the screen of the LCD 61 may not be perfectly horizontal. Accordingly, in another embodiment, three or more leg parts may be provided on the rear surface of the housing 60. In this case, if the terminal apparatus 6 is placed on a floor with the screen of the LCD 61 facing upward, the three or more leg parts contact the floor. Thus, the terminal apparatus 6 can be placed with the screen of the LCD 61 being horizontal. Such a horizontal placement of the terminal apparatus 6 may be achieved by providing detachable leg parts on the rear surface of the housing 60.

The respective operation buttons 64A through 64L are assigned functions, where necessary, in accordance with a game program. For example, the cross button 64A may be used for direction designation operation, selection operation, and the like, and the operation buttons 64E through 64H may be used for determination operation, cancellation operation, and the like.

The terminal apparatus 6 includes a power button (not shown) for turning on/off the power of the terminal apparatus 6. The terminal apparatus 6 may include an operation button for turning on/off screen display of the LCD 61, an operation button for performing connection setting (pairing) with the game apparatus body 5, and an operation button for adjusting the volume of loudspeakers (loudspeakers 607 shown in FIG. 5).

As shown in (a) of FIG. 3, the terminal apparatus 6 includes a marker section (a marker section 65 shown in FIG. 5) including a marker 65A and a marker 65B, on the front surface of the housing 60. For example, the marker section 65 is provided above the LCD 61. The markers 65A and 65B are each constituted by one or more infrared LEDs, like the markers 8L and 8R of the marker 8. The marker section 65 is used, like the marker 8, for causing the game apparatus body 5 to calculate a movement or the like of the controller 7 with respect to the marker section 65. The game apparatus body 5 is capable of controlling the infrared LEDs of the marker section 65 to be on or off.

The terminal apparatus 6 includes a camera 66 as imaging means. The camera 66 includes an image pickup element (e.g., a CCD image sensor or a CMOS image sensor) having a predetermined resolution, and a lens. For example, the camera 66 is provided on the front surface of the housing 60. Accordingly, the camera 66 is capable of taking an image of the face of the user holding the terminal apparatus 6. For example, the camera 66 is capable of taking an image of the user playing a game while viewing the LCD 61.

The terminal apparatus 6 has a microphone (a microphone 609 shown in FIG. 5) as sound input means. A microphone hole 60b is provided in the front surface of the housing 60. The microphone 609 is embedded in the housing 60 at a position inside the microphone hole 60b. The microphone 609 detects for a sound, such as user's voice, around the terminal apparatus 6.

The terminal apparatus 6 has loudspeakers (loudspeakers 607 shown in FIG. 5) as sound output means. As shown in (d) of FIG. 3, speaker holes 60a are provided in the lower side surface of the housing 60. A sound is output through the speaker holes 60a from the loudspeakers 607. In the exemplary embodiment, the terminal apparatus 6 has two loudspeakers, and the speaker holes 60a are provided at positions corresponding to a left loudspeaker and a right loudspeaker.

The terminal apparatus 6 includes an extension connector 67 for connecting another device to the terminal apparatus 6. In the exemplary embodiment, as shown in (d) of FIG. 3, the extension connector 67 is provided in the lower side surface of the housing 60. Any device may be connected to the extension connection 67. For example, a controller (a gun-shaped controller or the like) used for a specific game or an input device such as a keyboard may be connected to the extension connector 67. If another device does not need to be connected, the extension connector 67 does not need to be provided.

In the terminal apparatus 6 shown in FIG. 3, the shapes of the operation buttons and the housing 60, the number of the respective components, and the positions in which the components are provided are merely examples. The shapes, numbers, and positions may be different from those described above.

Next, with reference to FIG. 5, the internal configuration of the terminal apparatus 6 is described. FIG. 5 is a block diagram showing an example of the internal configuration of the terminal apparatus 6. As shown in FIG. 5, the terminal apparatus 6 includes, in addition to the components shown in FIG. 3, a touch panel controller 601, a magnetic sensor 602, a gyro sensor 604, a user interface controller (UI controller) 605, a codec LSI 606, loudspeakers 607, a sound IC 608, a microphone 609, a wireless module 610, an antenna 611, an infrared communication module 612, a flash memory 613, a power supply IC 614, a battery 615, and a vibrator 619. These electronic components are mounted on an electronic circuit board and accommodated in the housing 60.

The UI controller 605 is a circuit for controlling data input to various input/output sections and data output from various input/output sections. The UI controller 605 is connected to the touch panel controller 601, the analog stick 63 (the analog sticks 63A and 63B), the operation button 64 (the operation buttons 64A through 64L), the marker section 65, the magnetic sensor 602, the acceleration sensor 603, the gyro sensor 604, and the vibrator 619. Further, the UI controller 605 is connected to the codec LSI 606 and the extension connector 67. The power supply IC 614 is connected to the UI controller 605, so that power is supplied to the respective components through the UI controller 605. The internal battery 615 is connected to the power supply IC 614, so that power is supplied from the battery 615. Further, a battery charger 616 or a cable, which is supplied with power from an external power supply, may be connected to the power supply IC 614 via a connector or the like. In this case, the terminal apparatus 6 can be supplied with power and charged from the external power supply using the battery charger 616 or the cable. Charging of the terminal apparatus 6 may be performed by setting the terminal apparatus 6 on a cradle (not shown) having a charging function.

The touch panel controller 601 is a circuit which is connected to the touch panel 62 and controls the touch panel 62. The touch panel controller 601 generates a predetermined form of touch position data, on the basis of a signal from the touch panel 62, and outputs the touch position data to the UI controller 605. The touch position data represents coordinates of a position at which an input is performed on an input surface of the touch panel 62. The touch panel controller 601 reads a signal from the touch panel 62 and generates touch position data every predetermined period of time. Further, various control instructions on the touch panel 62 are output from the UI controller 605 to the touch panel controller 601.

The analog stick 63 outputs, to the UI controller 605, stick data representing a direction in which the stick part operated by a finger of the user slides (or tilts), and the amount of the sliding (tilting). The operation button 64 outputs, to the UI controller 605, operation button data representing an input state of each of the operation buttons 64A through 64L (whether or not the operation button is pressed).

The magnetic sensor 602 detects the magnitude and direction of a magnetic field to detect an orientation. Orientation data representing the detected orientation is output to the UI controller 605. The UI controller 605 outputs, to the magnetic sensor 602, a control instruction for the magnetic sensor 602. Examples of the magnetic sensor 602 include: an MI (Magnetic Impedance) sensor, a fluxgate sensor, a hall sensor, a GMR (Giant Magneto Resistance) sensor, a TMR (Tunneling Magneto Resistance) sensor, and an AMR (Anisotropic Magneto Resistance) sensor. Any sensor, however, may be adopted as long as the sensor can detect an orientation. Strictly speaking, the obtained orientation data does not represent an orientation in a place where a magnetic field is generated in addition to the geomagnetism. Even in such a case, it is possible to calculate a change in the attitude of the terminal apparatus 6 because the orientation data changes when the terminal apparatus 6 moves.

The acceleration sensor 603 is provided inside the housing 60. The acceleration sensor 603 detects the magnitudes of linear accelerations along three axial directions (the xyz axis directions shown in (a) of FIG. 3). Specifically, in the acceleration sensor 603, the long side direction of the housing 60 is defined as the x-axis direction (in the state where the marker section 65 is placed above the LCD 61, the right direction along the long side direction when facing the display screen of the LCD 61 is defined as an x-axis positive direction), the short side direction of the housing 60 is defined as the y-axis direction (in the state where the marker section 65 is placed above the LCD 61, the up direction along the short side direction when facing the display screen of the LCD 61 is a y-axis positive direction), and the direction orthogonal to the front surface of the housing 60 is defined as the z-axis direction (the perspective direction of the display screen of the LCD 61 is defined as a z-axis positive direction), thereby detecting the magnitudes of the linear accelerations in the respective axis directions. Acceleration data representing the detected accelerations is output to the UI controller 605. The UI controller 605 outputs, to the acceleration sensor 603, a control instruction for the acceleration sensor 603. In the exemplary embodiment, the acceleration sensor 603 is, for example, an electrostatic capacitance type MEMS acceleration sensor. In another embodiment, however, another type of acceleration sensor may be used. Further, the acceleration sensor 603 may be an acceleration sensor for detecting the magnitude of acceleration in one axial direction or two axial directions.

The gyro sensor 604 is provided inside the housing 60. The gyro sensor 604 detects the angular velocities about the three axes (the x, y, and z axes described above). Angular velocity data representing the detected angular velocities is output to the UI controller 605. The UI controller 605 outputs, to the gyro sensor 604, a control instruction for the gyro sensor 604. Any number and any combination of gyro sensors may be used as long as the angular velocities about three axes are detected. The gyro sensor 604 may be constituted by a two-axis gyro sensor and a one-axis gyro sensor. Alternatively, the gyro sensor 604 may be a gyro sensor for detecting the angular velocity about one axis or two axes.

The vibrator 619 is, for example, a vibration motor or a solenoid. The vibrator 619 is connected to the UI controller 605. The terminal apparatus 6 is vibrated by actuating the vibrator 619 in accordance with a control instruction outputted from the UI controller 605 to the vibrator 619. The vibration of the terminal apparatus 6 is transmitted to the user's hand holding the terminal apparatus 6. Thus, a so-called vibration-feedback game is achieved.

The UI controller 605 outputs, to the codec LSI 606, the operation data including the touch position data, the stick data, the operation button data, the orientation data, the acceleration data, and the angular velocity data, which have been received from the respective components. If another device is connected to the terminal apparatus 6 through the extension connector 67, data representing operation to said another device may be included in the operation data.

The codec LSI 606 is a circuit for performing a compression process on data to be transmitted to the game apparatus body 5, and a decompression process on data transmitted from the game apparatus body 5. The LCD 61, the camera 66, the sound IC 608, the wireless module 610, the flash memory 613, and the infrared communication module 612 are connected to the codec LSI 606. The codec LSI 606 includes a CPU 617 and an internal memory 618. Although the terminal apparatus 6 is configured not to perform game processing, the terminal apparatus 6 may execute a program for managing the terminal apparatus 6 or a program for communication. For example, a program stored in the flash memory 613 is loaded into the internal memory 618 and executed by the CPU 617 when the terminal apparatus 6 is powered on, thereby starting up the terminal apparatus 6. A part of the area of the internal memory 618 is used as a VRAM for the LCD 61.

The camera 66 takes an image in accordance with an instruction from the game apparatus body 5, and outputs data of the taken image to the codec LSI 606. The codec LSI 606 outputs, to the camera 66, a control instruction for the camera 66, such as an instruction to take an image. The camera 66 is also capable of taking a moving picture. That is, the camera 66 is capable of repeatedly performing image taking, and repeatedly outputting image data to the codec LSI 606.

The sound IC 608 is connected to the loudspeakers 607 and the microphone 609. The sound IC 608 is a circuit for controlling input of sound data from the microphone 609 to the codec LSI 606 and output of sound data from the codec LSI 606 to the loudspeakers 607. Specifically, when the sound IC 608 receives sound data from the codec LSI 606, the sound IC 608 performs D/A conversion on the sound data, and outputs a resultant sound signal to the loudspeakers 607 to cause the loudspeakers 607 to output a sound. The microphone 609 detects sound (such as user's voice) propagated to the terminal apparatus 6, and outputs a sound signal representing the sound to the sound IC 608. The sound IC 608 performs A/D conversion on the sound signal from the microphone 609, and outputs a predetermined form of sound data to the codec LSI 606.

The codec LSI 606 transmits the image data from the camera 66, the sound data from the microphone 609, and the operation data from the UI controller 605 (terminal operation data), to the game apparatus body 5 through the wireless module 610. In the exemplary embodiment, the codec LSI 606 subjects the image data and the sound data to a compression process similar to that performed by the codec LSI 27. The compressed image data and sound data, and the terminal operation data are output to the wireless module 610 as transmission data. The antenna 611 is connected to the wireless module 610, and the wireless module 610 transmits the transmission data to the game apparatus body 5 through the antenna 611. The wireless module 610 has the same function as the terminal communication module 28 of the game apparatus body 5. That is, the wireless module 610 has a function of connecting to a wireless LAN by a method based on, for example, the IEEE 802.11n standard. The data transmitted from the wireless module 610 may be encrypted where necessary, or may not be encrypted.

As described above, the transmission data transmitted from the terminal apparatus 6 to the game apparatus body 5 includes the operation data (terminal operation data), the image data, and the sound data. If another device is connected to the terminal apparatus 6 through the extension connector 67, data received from said another device may be included in the transmission data. The infrared communication module 612 performs, with another device, infrared communication based on, for example, the IRDA standard. The codec LSI 606 may include, in the transmission data, data received by the infrared communication, and transmit the transmission data to the game apparatus body 5, where necessary.

As described above, the compressed image data and sound data are transmitted from the game apparatus body 5 to the terminal apparatus 6. These data are received by the codec LSI 606 through the antenna 611 and the wireless module 610. The codec LSI 606 decompresses the received image data and sound data. The decompressed image data is output to the LCD 61, and an image according to the image data is displayed on the LCD 61. On the other hand, the decompressed sound data is output to the sound IC 608, and a sound based on the sound data is output from the loudspeakers 607.

When control data is included in the data received from the game apparatus body 5, the codec LSI 606 and the UI controller 605 make control instructions for the respective components, according to the control data. As described above, the control data represents control instructions for the respective components (in the exemplary embodiment, the camera 66, the touch panel controller 601, the marker section 65, the sensors 602 to 604, the vibrator 619, and the infrared communication module 612) included in the terminal apparatus 6. In the exemplary embodiment, the control instructions represented by the control data are considered to be instructions to start and halt (stop) the operations of the above components. That is, some components which are not used for a game may be halted to reduce power consumption. In this case, data from the halted components are not included in the transmission data transmitted from the terminal apparatus 6 to the game apparatus body 5. The marker section 65 is constituted by infrared LEDs, and therefore, the marker section 65 is controlled by simply turning on/off the supply of power thereto.

As described above, the terminal apparatus 6 includes the operation means such as the touch panel 62, the analog sticks 63, and the operation buttons 64. Alternatively, in another embodiment, the terminal apparatus 6 may include other operation means instead of or in addition to these operation means.

The terminal apparatus 6 includes the magnetic sensor 602, the acceleration sensor 603, and the gyro sensor 604 as sensors for calculating the movement (including the position and the attitude, or a change in the position or the attitude) of the terminal apparatus 6. Alternatively, in another embodiment, the terminal apparatus 6 may include one or two of these sensors. In still another embodiment, the terminal apparatus 6 may include other sensors instead of or in addition to these sensors.

The terminal apparatus 6 includes the camera 66 and the microphone 609. Alternatively, in another embodiment, the terminal apparatus 6 may not include the camera 66 and the microphone 609, or may include either of the cameral 66 and the microphone 609.

The terminal apparatus 6 includes the marker section 65 as a component for calculating the positional relation between the terminal apparatus 6 and the controller 7 (such as the position and/or the attitude of the terminal apparatus 6 as viewed from the controller 7). Alternatively, in another embodiment, the terminal apparatus 6 may not include the marker section 65. In still another embodiment, the terminal apparatus 6 may include other means as a component for calculating the above positional relation. For example, the controller 7 may include a marker section, and the terminal apparatus 6 may include an image pickup element. In this case, the marker 8 may include an image pickup element instead of an infrared LED.

Figure 6:
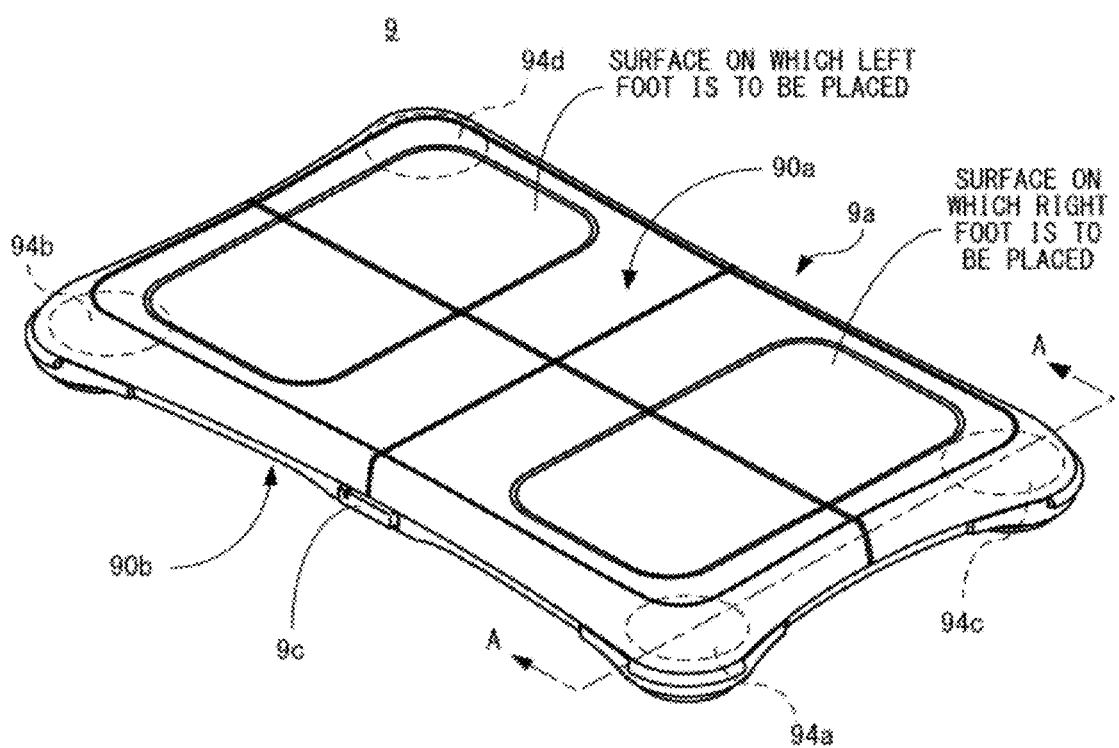
FIG. 6 is a perspective view showing a non-limiting example of the appearance of a board-type controller 9 of FIG. 1.
Figure 7:
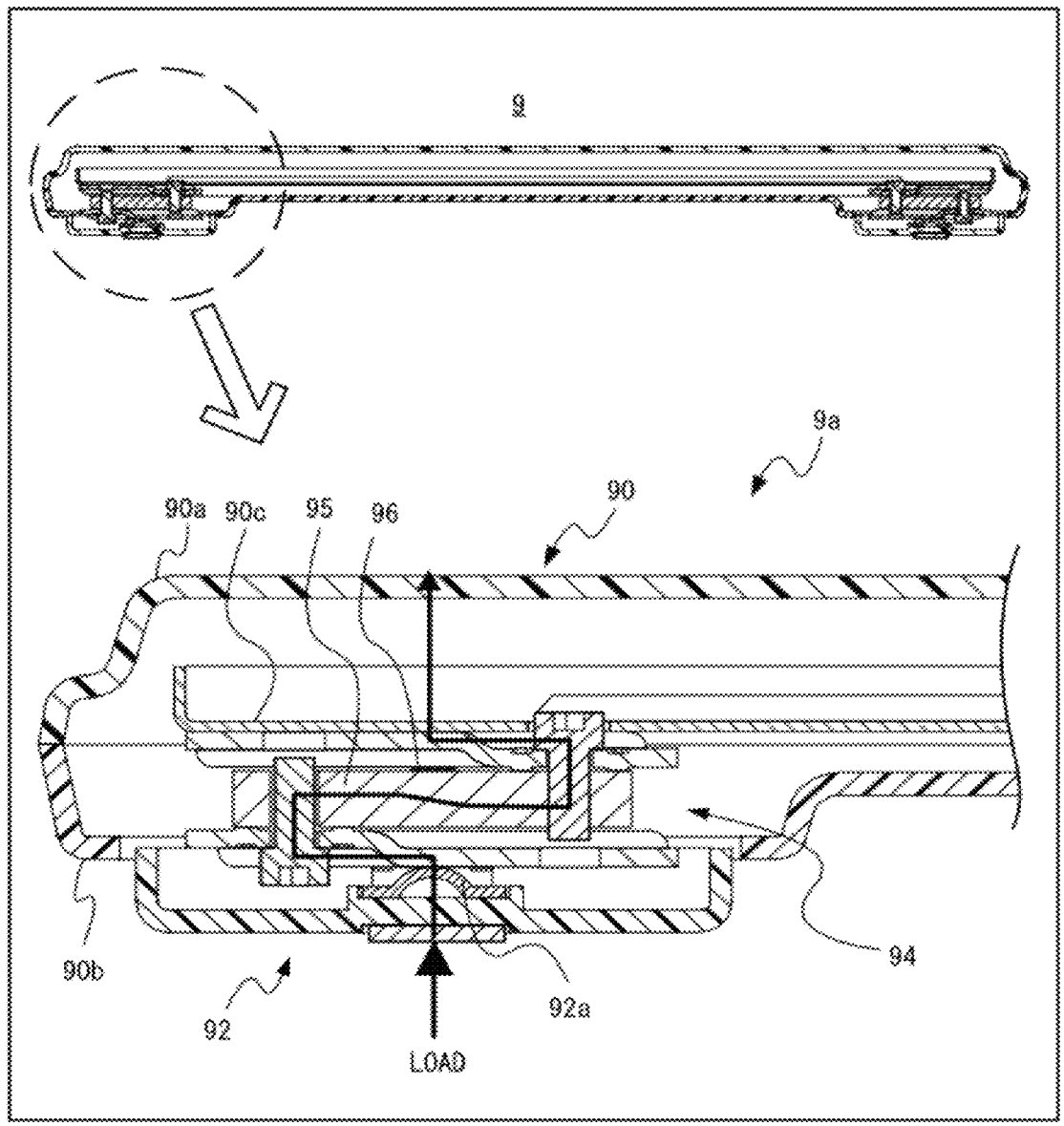
FIG. 7 is a diagram showing a non-limiting example of a cross-sectional view of the board-type controller 9 shown in FIG. 6 taken along line A-A, and a non-limiting example of an enlarged view of a corner portion where a load sensor 94 is arranged.
Figure 8:
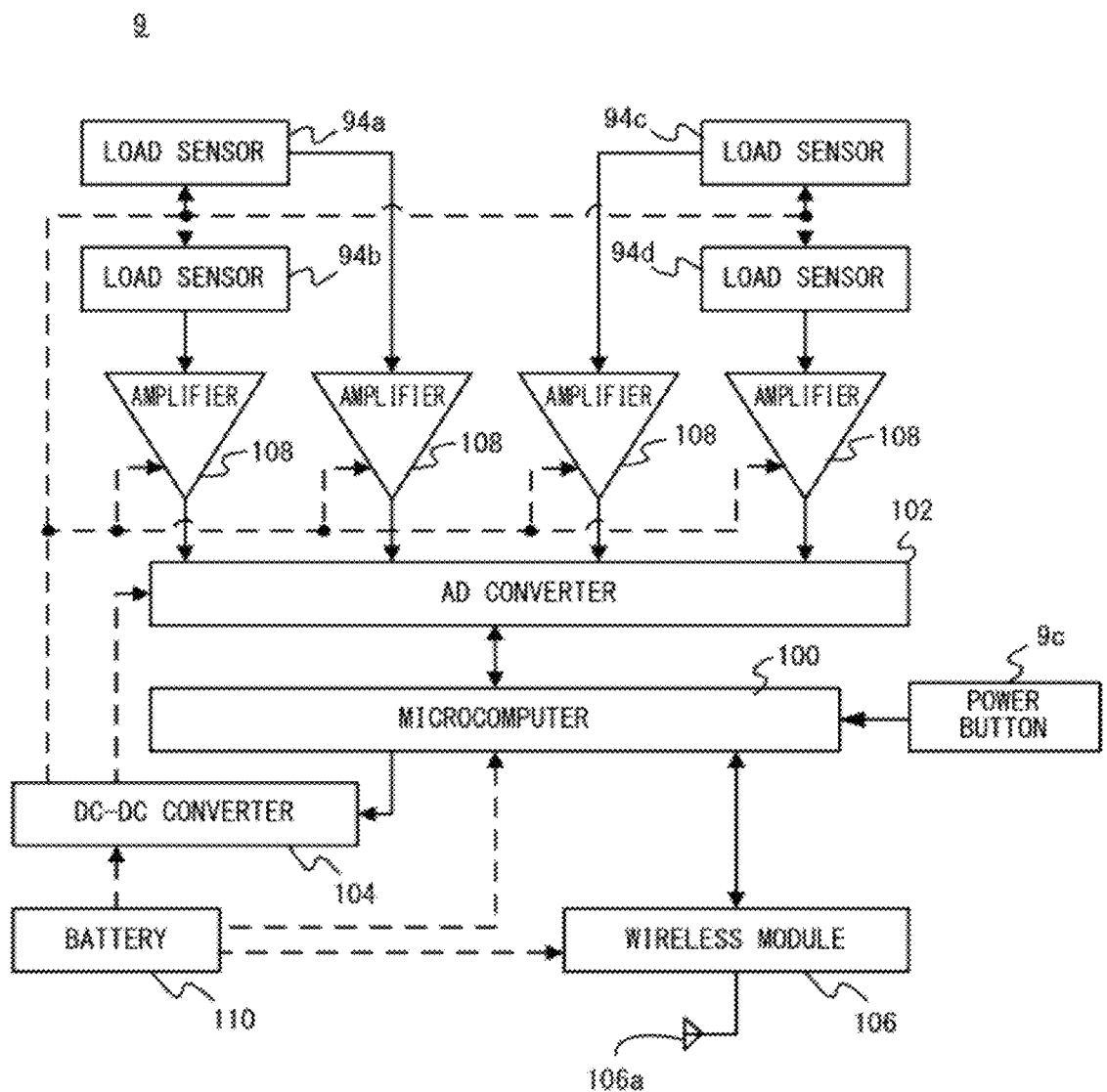
FIG. 8 is a block diagram showing a non-limiting example of the electrical configuration of the board-type controller 9 of FIG. 6.

Next, with reference to FIGS. 6 through 8, the configuration of the board-type controller 9 is described. FIG. 6 is a perspective view illustrating an example of the appearance of the board-type controller 9 shown in FIG. 1. As shown in FIG. 6, the board-type controller 9 includes a platform 9a on which a user stands (on which the user places their feet), and at least four load sensors 94a through 94d for detecting a load applied to the platform 9a. Each of the load sensors 94a through 94d is embedded in the platform 9a (see FIG. 7), and the positions where the load sensors 94a through 94d are provided are indicated by dotted lines in FIG. 6. In the following description, the four load sensors 94a through 94d may be collectively referred to as a load sensor 94.

The platform 9a is formed in the shape of substantially a rectangular parallelepiped, and is in the shape of substantially a rectangle as viewed from the top. For example, the short side of the rectangular shape of the platform 9a is approximately 30 cm, and the long side thereof is approximately 50 cm. The upper surface of the platform 9a is flat, and has a pair of planes on which the user stands with the bottoms of their feet contacting thereto. Specifically, the upper surface of the platform 9a has a plane (a back-left region enclosed with a double line in FIG. 6) on which the user's left foot is placed, and a plane (a front-right region enclosed with a double line in FIG. 6) on which the user's right foot is placed. The platform 9a has, at four corners thereof, side surfaces each partially projecting outward in a cylindrical shape.

In the platform 9a, the four load sensors 94a through 94d are arranged at predetermined intervals. In the exemplary embodiment, the four load sensors 94a through 94d are arranged on the periphery of the platform 9a, more specifically, at the four corners of the platform 9a. The intervals of the load sensors 94a through 94d are appropriately set such that the load sensors 94a through 94d can accurately detect the intention of a game operation which is expressed by a manner of applying a load to the platform 9a by the user.

FIG. 7 shows an example of a cross-sectional view of the board-type controller 9, taken along line A-A in FIG. 6, and an example of an enlarged view of a corner part where a load sensor 94 is arranged. In FIG. 7, the platform 9a includes a support plate 90 on which the user stands, and legs 92. The load sensors 94a through 94d are provided in positions where the legs 92 are provided. In the exemplary embodiment, the four legs 92 are provided at the four corners, and therefore, the four load sensors 94a through 94d are also provided at the corresponding four corners. Each leg 92 is formed by plastic molding in the shape of substantially a cylinder with a base. Each load sensor 94 is located on a spherical part 92a provided on the base of the corresponding leg 92. The support plate 90 is supported by the legs 92 via the load sensors 94.

The support plate 90 includes an upper plate 90a forming an upper surface and an upper side surface portion, a lower plate 90b forming a lower surface and a lower side surface portion, and an intermediate plate 90c provided between the upper plate 90a and the lower plate 90b. The upper plate 90a and the lower plate 90b are formed by, for example, plastic molding, and are integrated using an adhesive or the like. The intermediate plate 90c is, for example, formed of a single metal plate by press forming. The intermediate plate 90c is fixed onto the four load sensors 94a through 94d. The upper plate 90a has, on a lower surface thereof, a grid-patterned rib (not shown), and is supported by the intermediate plate 90c via the rib. Therefore, when the user stands on the platform 9a, the load is transferred to the four legs 92 via the support plate 90 and the load sensors 94a through 94d. As indicated by arrows in FIG. 7, a reaction from a floor, which is generated by the input load, is transferred from the legs 92 through the spherical parts 92a, the load sensors 94a through 94d and the intermediate plate 90c to the upper plate 90a.

Each load sensor 94 is, for example, a strain gauge (strain sensor) load cell, which is a load converter for converting an input load to an electrical signal. In the load sensor 94, a strain-generating body 95 is deformed according to an input load, resulting in a strain. The strain is converted into a change of electrical resistance and then converted into a change of voltage by a strain sensor 96 attached to the strain-generating body 95. Therefore, the load sensor 94 outputs, from an output terminal thereof, a voltage signal indicating the input load.

The load sensor 94 may be of other types, such as a tuning fork type, a string vibration type, an electrostatic capacitance type, a piezoelectric type, a magnetostrictive type, and a gyroscopic type.

Referring back to FIG. 6, the board-type controller 9 further includes a power button 9c. When the power button 9c is operated (e.g., when the power button 9c is pressed) in the state where the board-type controller 9 is not activated, power is supplied to each of circuit components (see FIG. 8) of the board-type controller 9. There are, however, cases in which the board-type controller 9 is powered on in accordance with an instruction from the game apparatus body 5 and thereby supply of power to the circuit components is started. The board-type controller 9 may be automatically powered off when a state where the user does not stand thereon continues for a predetermined period of time (e.g., 30 sec) or more. Further, when the power button 9c is again operated in the state where the board-type controller 9 is in the active state, the board-type controller 9 may be powered off to stop supply of power to the circuit components.

FIG. 8 is a block diagram showing an example of an electrical configuration of the board-type controller 9. In FIG. 8, flows of signals and data are indicated by solid arrows, and supply of power is indicated by dotted arrows.

As shown in FIG. 8, the board-type controller 9 includes a microcomputer 100 for controlling the operation thereof. The microcomputer 100 includes a CPU, a ROM, a RAM, and the like, which are not shown. The CPU controls the operation of the board-type controller 9 in accordance with a program stored in the ROM.

The power button 9c, an AD converter 102, a DC-DC converter 104, and a wireless module 106 are connected to the microcomputer 100. An antenna 106a is connected to the wireless module 106. The four load sensors 94a through 94d are connected to the AD converter 102 via amplifiers 108.

Further, the board-type controller 9 includes a battery 110 for supplying power to the circuit components. In another embodiment, an AC adapter may be connected to the board-type controller 9 instead of the battery 110 so that commercial power is supplied to the circuit components. In this case, instead of the DC-DC converter 104, a power circuit, which converts alternating current into direct current and lowers and rectifies a direct-current voltage, needs to be provided in the board-type controller 9. In the exemplary embodiment, power is supplied directly from the battery 110 to the microcomputer 100 and the wireless module 106. In other words, power is constantly supplied from the battery 110 to the wireless module 106 and some components (such as the CPU) in the microcomputer 100 to detect whether or not the power button 9c is turned on and whether or not a command that instructs power-on is transmitted from the game apparatus body 5. On the other hand, power is supplied from the battery 110 through the DC-DC converter 104 to the load sensors 94a through 94d, the AD converter 102, and the amplifiers 108. The DC-DC converter 104 converts a voltage value of direct current supplied from the battery 110 into a different voltage value, and supplies the resultant direct current to the load sensors 94a through 94d, the AD converter 102, and the amplifiers 108.

Supply of power to the load sensors 94a through 94d, the A/D converter 102 and the amplifiers 108 may be performed where necessary by the microcomputer 100 that controls the DC-DC converter 104. Specifically, when the microcomputer 100 determines that it is necessary to operate the load sensors 94a through 94d to detect a load, the microcomputer 100 may control the DC-DC converter 104 to supply power to the load sensors 94a through 94d, the A/D converter 102 and the amplifiers 108.

When power is supplied to the load sensors 94a through 94d, the load sensors 94a through 94d each output a signal indicating a load inputted thereto. These signals are amplified by the respective amplifiers 108, and converted from analog signals into digital data by the A/D converter 102. The digital data is input to the microcomputer 100. The detected values of the load sensors 94a through 94d are given identification information of the load sensors 94a through 94d, so that the load sensors 94a through 94d can be identified from the corresponding detected values. Thus, the microcomputer 100 can acquire the data indicating the detected load values of the four load sensors 94a through 94d at the same time.

On the other hand, when the microcomputer 100 determines that it is not necessary to operate the load sensors 94a through 94d, i.e., when it is not the time for load detection, the microcomputer 100 controls the DC-DC converter 104 to stop supply of power to the load sensors 94a through 94d, the A/D converter 102, and the amplifiers 108. Thus, the board-type controller 9 can operate the load sensors 94a through 94d to detect a load or a distance only when it is required, resulting in a reduction in power consumption for load detection.

Load detection is typically required when the game apparatus body 5 (FIG. 1) needs to acquire load data. For example, when game apparatus body 5 requires load information, the game apparatus body 5 transmits an information acquisition command to the board-type controller 9. When the microcomputer 100 receives the information acquisition command from the game apparatus body 5, the microcomputer 100 controls the DC-DC converter 104 to supply power to the load sensors 94*a* through 94*d* and the like, thereby detecting a load. On the other hand, when the microcomputer 100 does not receive a load acquisition command from the game apparatus body 5, the microcomputer 100 controls the DC-DC converter 104 to stop supply of power to the load sensors 94*a* through 94*d* and the like.

The microcomputer 100 may control the DC-DC converter 104 on the basis of a determination that the time of load detection arrives at predetermined intervals. When such periodic load detection is performed, information regarding the constant time period may be supplied and stored from the game apparatus body 5 to the microcomputer 100 of the board-type controller 9 when the game is started, or it may be preinstalled in the microcomputer 100.

The data indicating the detected values from the load sensors 94*a* through 94*d* are transmitted as board operation data (input data) for the board-type controller 9 from the microcomputer 100 via the radio module 106 and an antenna 106*b* to the game apparatus body 5. For example, when the microcomputer 100 has performed load detection according to a command from the game apparatus body 5, the microcomputer 100 transmits the detected value data of the load sensors 94*a* through 94*d* to the game apparatus body 5 on receipt of the detected value data from the A/D converter 102. The microcomputer 100 may transmit the detected value data to the game apparatus body 5 at predetermined intervals. If the interval of the data transmission is longer than the interval of the load detection, data containing load values which have been detected at a plurality of detection times up to the subsequent time of transmission may be transmitted.

The wireless module 106 is set so as to perform communication according to the same wireless standard (the Bluetooth, wireless LAN, and the like) as that for the controller communication module 19 of the game apparatus body 5. Accordingly, the CPU 10 of the game apparatus body 5 is allowed to transmit an information acquisition command to the board-type controller 9 through the controller communication module 19 and the like. Thus, the board-type controller 9 is allowed to receive the command from the game apparatus body 5 through the wireless module 106 and the antenna 106*a*. Further, the board-type controller 9 is allowed to transmit the board operation data including the load detection values (or load calculation values) of the load sensors 94*a* through 94*d* to the game apparatus body 5.

For example, in a game which is performed on the basis of a simple sum of four load values detected by the four load sensors 94*a* through 94*d*, the user is allowed to stand at a given position with respect to the four load sensors 94*a* through 94*d* of the board-type controller 9. That is, the user is allowed to stand on the platform 9*a* at a given position and in a given direction to play a game. In some kinds of games, however, the direction of a load value detected by each of the four load sensors 94 viewed from the user needs to be identified. That is, a positional relation between the four load sensors 94 of the board-type controller 9 and the user needs to be recognized. In this case, for example, the positional relation between the four load sensors 94 and the user may be defined in advance, and the user may be supposed to stand on the platform 9*a* in a manner which allows the predetermined positional relation. Typically, a positional relation in which two of the load sensors 94*a* through 94*d* are present in front of, behind, to the right of, and to the left of the user standing in the center of the platform 9*a*, i.e., a positional relation in which the user stands in the center of the platform 9*a* of the board-type controller 9, is defined. In this case, the platform 9*a* of the board-type controller 9 is rectangular in shape as viewed from the top, and the power button 9*c* is provided at one side (long side) of the rectangle. Therefore, it is ruled in advance that the user, using the power button 9*c* as a guide, stands on the platform 9*a* such that the long side at which the power button 9*c* is provided is located in a predetermined direction (front, rear, left or right). In this case, each of the load values detected by the load sensors 94*a* through 94*d* is a load value of a predetermined direction (front right, front left, rear right, or rear left) as viewed from the user. Therefore, the board-type controller 9 and the game apparatus body 5 can find out a direction to which each detected load value corresponds as viewed from the user, on the basis of the identification information of the load sensors 94 contained in the detected load value data, and arrangement data indicating the positions or the directions of the load sensors 94 with respect to the user that is set (stored) in advance. As a result, it is possible to understand the intention of a game operation performed by the user, such as an operating direction, for example, forward, backward, rightward, or leftward direction, or a user's foot being lifted.

Figure 10A:
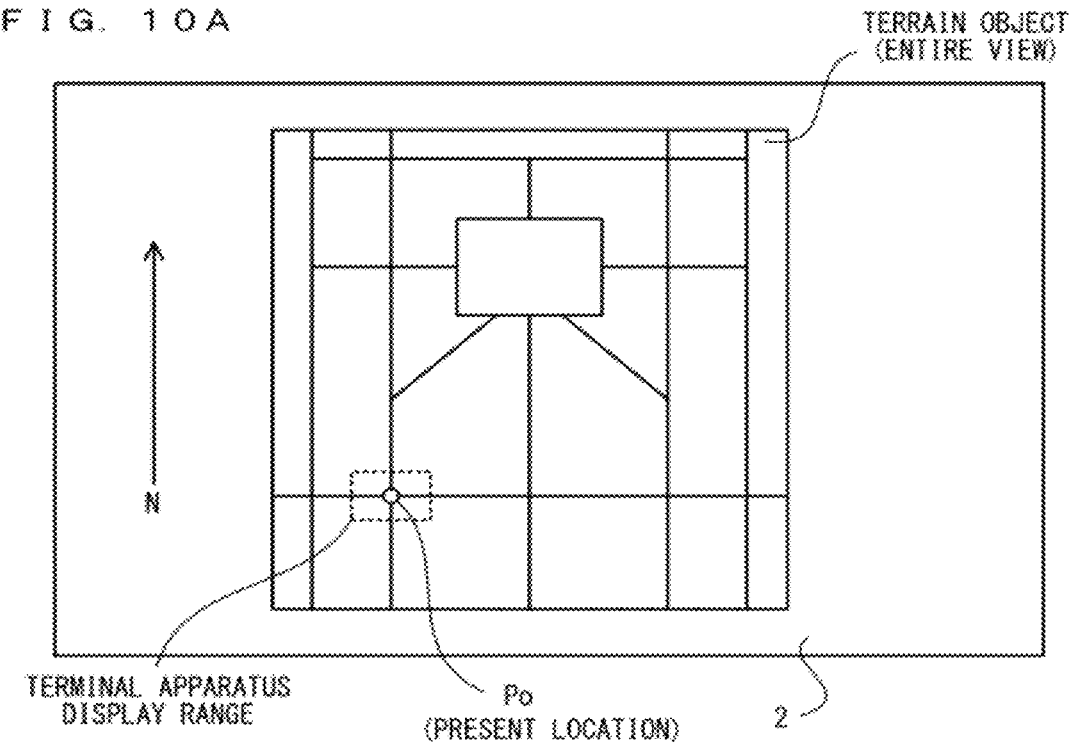
FIG. 10A is a diagram showing a non-limiting example of an image displayed on a monitor 2.
Figure 10B:
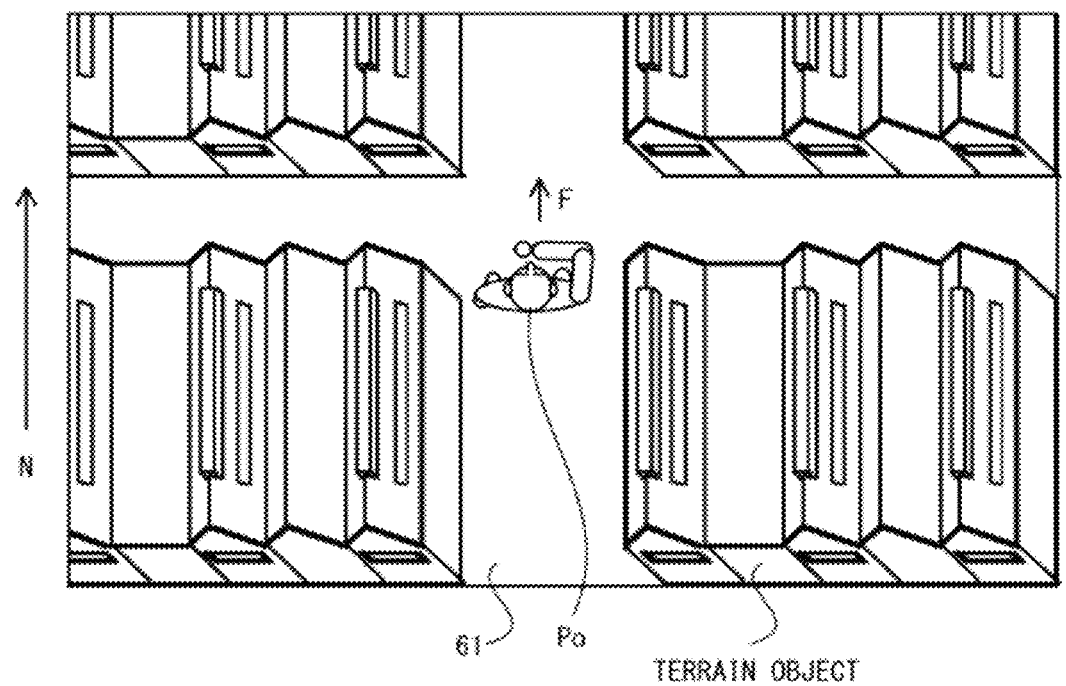
FIG. 10B is a diagram showing a non-limiting example of an image displayed on an LCD 61 of the terminal apparatus 6.
Figure 11A:
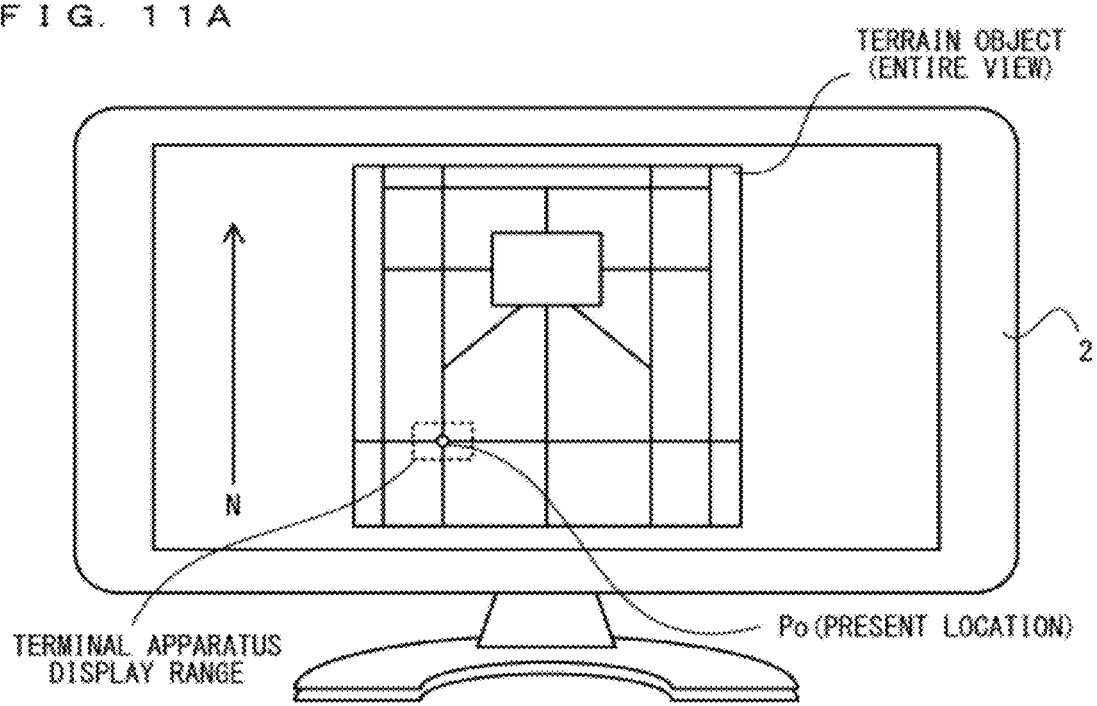
FIG. 11A is a diagram showing a non-limiting example of an image displayed on the monitor 2 in the case where an operation based on the attitude of the terminal apparatus 6 indicates a reference operation indication direction.
Figure 11B:
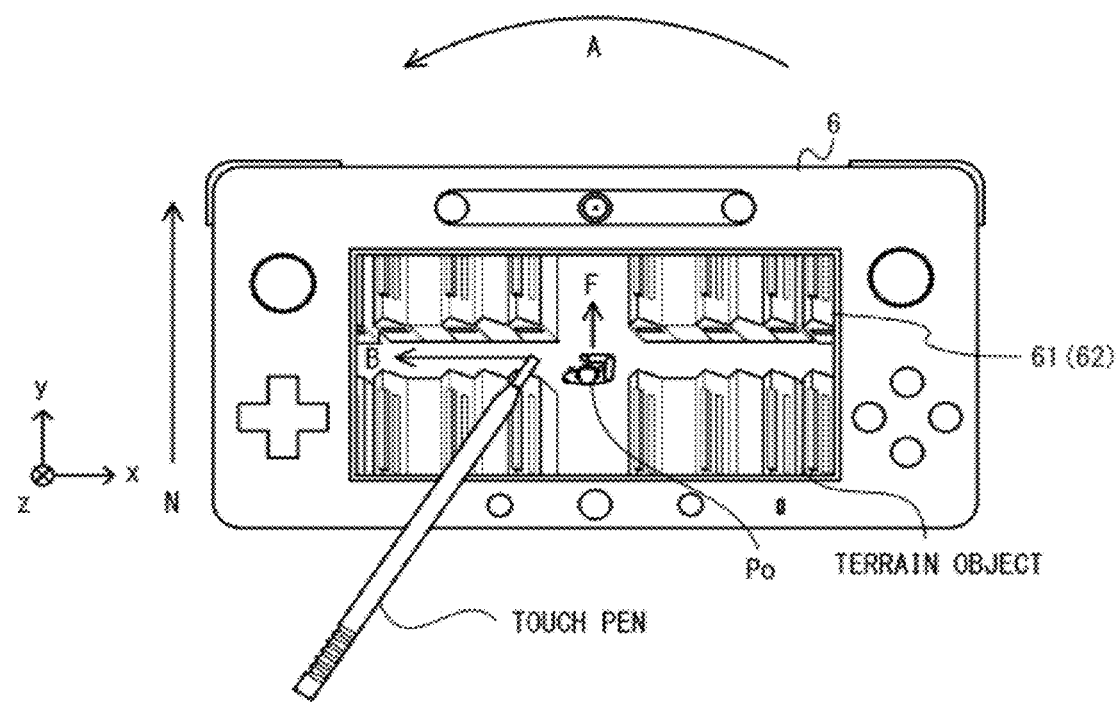
FIG. 11B is a diagram showing a non-limiting example of an image displayed on the LCD 61 of the terminal apparatus 6 in the state where the operation based on the attitude of the terminal apparatus 6 indicates the reference operation indication direction.
Figure 13A:
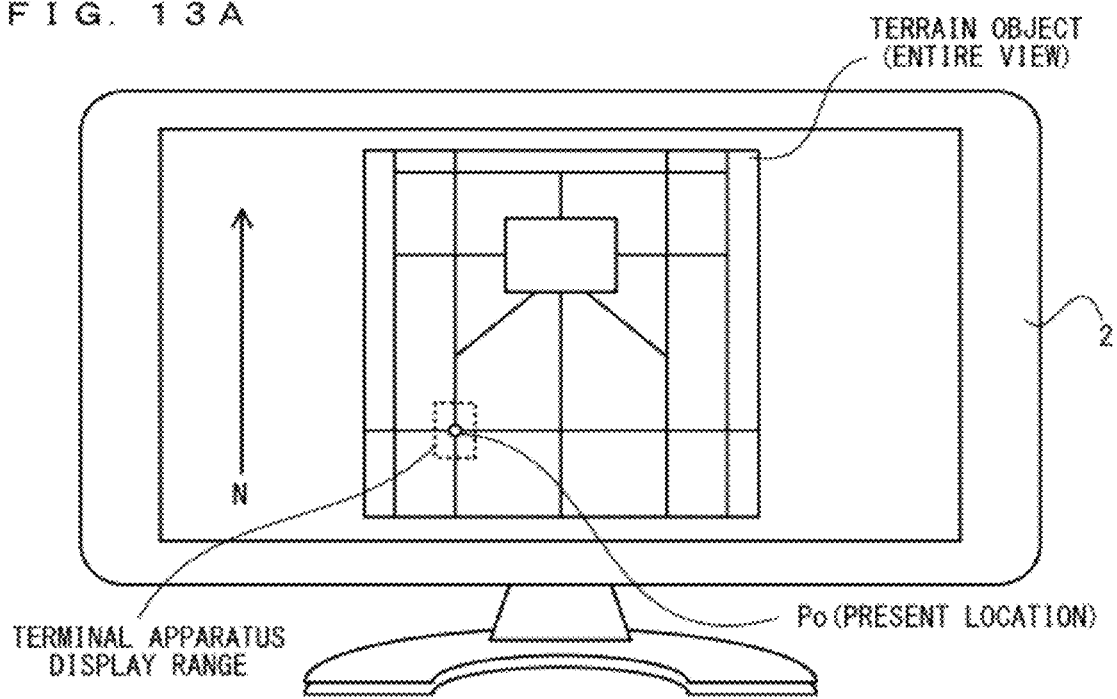
FIG. 13A is a diagram showing a non-limiting example of an image displayed on the monitor 2 in the case where the terminal apparatus 6 has been roll-rotated counterclockwise 90° on the table from the state shown in FIG. 11B.
Figure 13B:
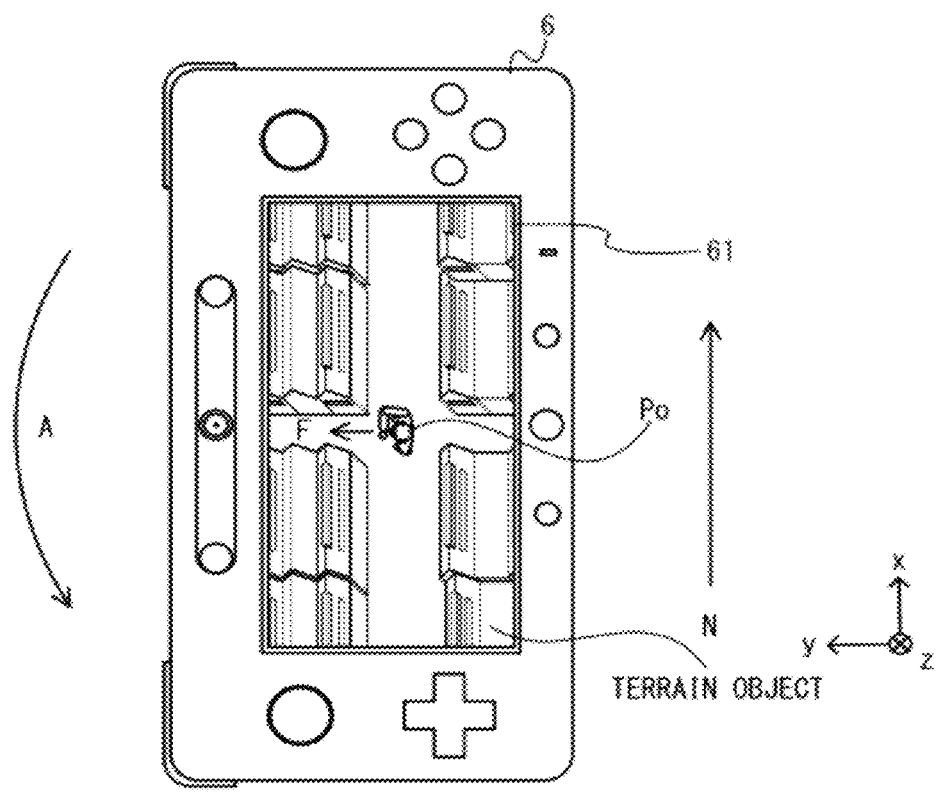
FIG. 13B is a diagram showing a non-limiting example of an image displayed on the LCD 61 of the terminal apparatus 6 in the case where the terminal apparatus 6 has been roll-rotated counterclockwise 90° on the table from the state shown in FIG. 11B.
Figure 15:
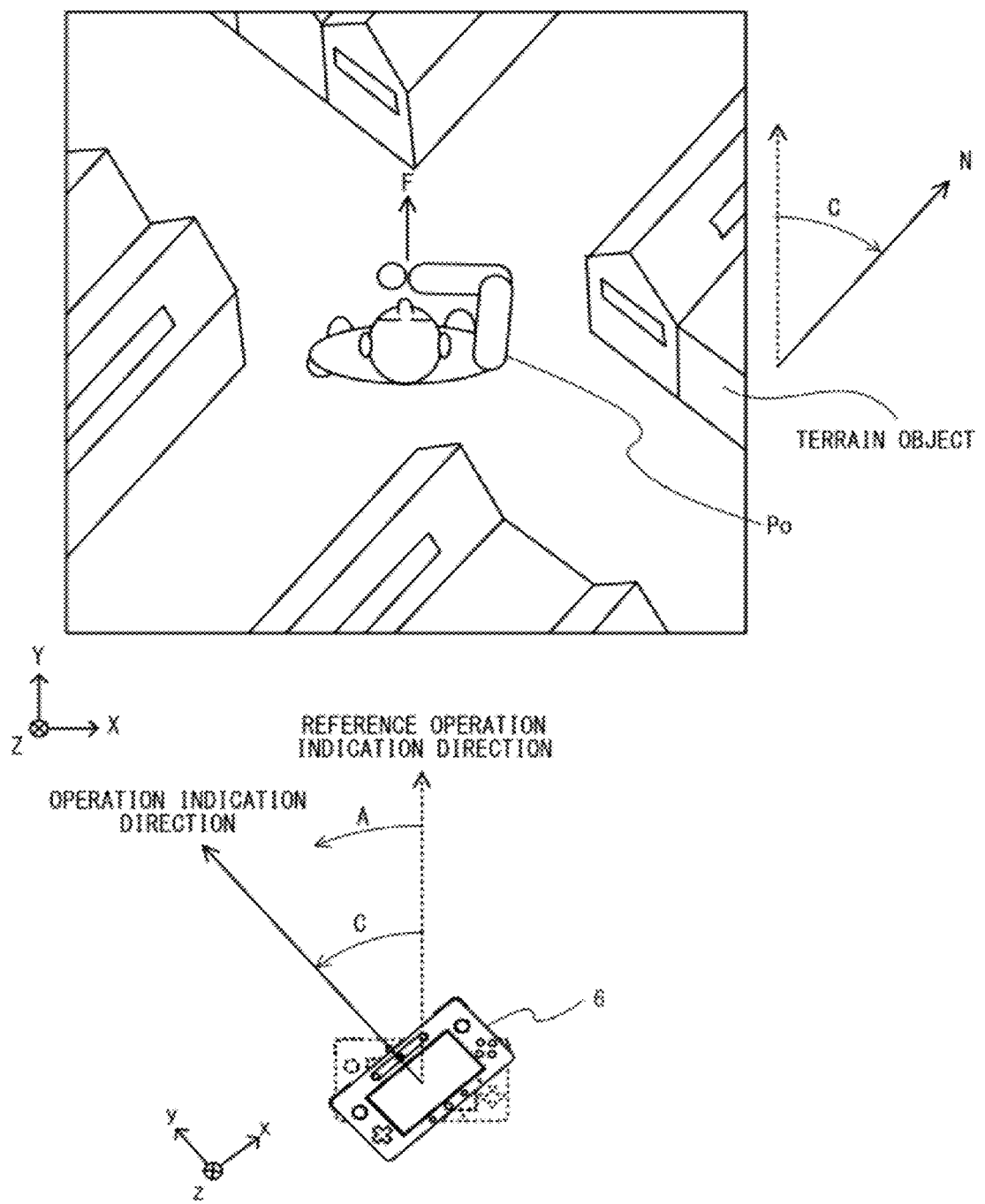
FIG. 15 is a diagram illustrating a non-limiting rotational movement of a terrain object as another example corresponding to a change in the operation indication direction that is obtained from the attitude of the terminal apparatus 6.
Figure 16A:
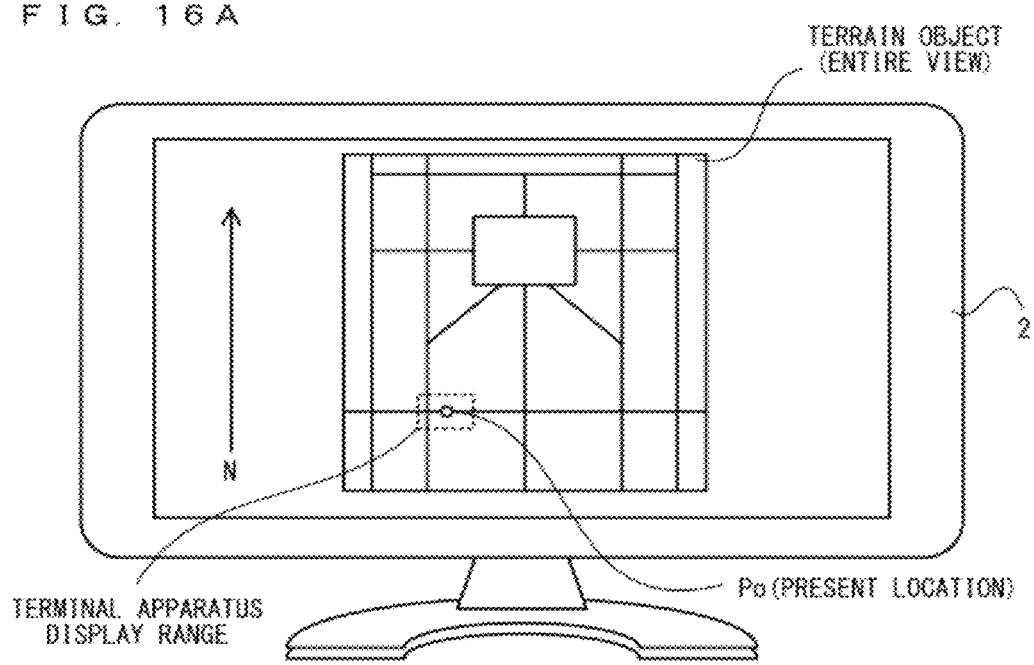
FIG. 16A is a diagram showing a non-limiting example of an image displayed on the monitor 2 in the case where a touch operation has been performed on a touch panel 62 of the terminal apparatus 6 in the state shown in FIG. 11B.
Figure 16B:
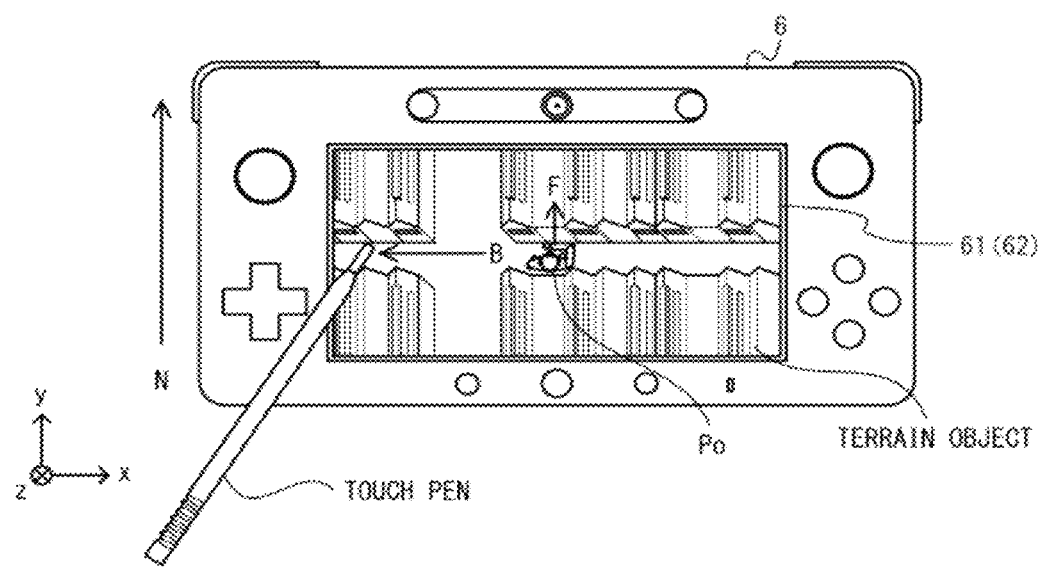
FIG. 16B is a diagram showing a non-limiting example of an image displayed on the LCD 61 of the terminal apparatus 6 in the case where the touch operation has been performed on the touch panel 62 of the terminal apparatus 6 in the state shown in FIG. 11B.

Next, with reference to the drawings, a description is given of an overview of the game processing performed by the game apparatus body 5, before descriptions are given of specific processes performed by the game apparatus body 5. It should be noted that FIG. 9 is a diagram showing an example of the state of a user performing an operation using the terminal apparatus 6 and the board-type controller 9. FIG. 10A is a diagram showing an example of an image displayed on the monitor 2. FIG. 10B is a diagram showing an example of an image displayed on the LCD 61 of the terminal apparatus 6. FIG. 11A is a diagram showing an example of an image displayed on the monitor 2 in the case where an operation based on the attitude of the terminal apparatus 6 indicates a reference operation indication direction. FIG. 11B is a diagram showing an example of an image displayed on the LCD 61 of the terminal apparatus 6 in the state where the operation based on the attitude of the terminal apparatus 6 indicates the reference operation indication direction. FIG. 12A is a diagram showing an example of an image displayed on the monitor 2 in the case where the terminal apparatus 6 has been roll-rotated counterclockwise on a table from the state shown in FIG. 11B. FIG. 12B is a diagram showing an example of an image displayed on the LCD 61 of the terminal apparatus 6 in the case where the terminal apparatus 6 has been roll-rotated counterclockwise on the table from the state shown in FIG. 11B. FIG. 13A is a diagram showing an example of an image displayed on the monitor 2 in the case where the terminal apparatus 6 has been roll-rotated counterclockwise 90° on the table from the state shown in FIG. 11B. FIG. 13B is a diagram showing an example of an image displayed on the LCD 61 of the terminal apparatus 6 in the case where the terminal apparatus 6 has been roll-rotated counterclockwise 90° on the table from the state shown in FIG. 11B. FIG. 14 is a diagram illustrating the rotational movements of a player object and a virtual camera as an example corresponding to a change in an operation indication direction that is obtained from the attitude of the terminal apparatus 6. FIG. 15 is a diagram illustrating the rotational movement of a terrain object as another example corresponding to a change in the operation indication direction that is obtained from the attitude of the terminal apparatus 6. FIG. 16A is a diagram showing an example of an image displayed on the monitor 2 in the case where a touch operation has been performed on the touch panel 62 of the terminal apparatus 6 in the state shown in FIG. 11B. FIG. 16B is a diagram showing an example of an image displayed on the LCD 61 of the terminal apparatus 6 in the case where the touch operation has been performed on the touch panel 62 of the terminal apparatus 6 in the state shown in FIG. 11B. FIG. 17 is a diagram illustrating the shifting movements of the player object and the virtual camera as an example corresponding to the touch operation performed on the touch panel 62 of the terminal apparatus 6. FIG. 18 is a diagram illustrating the shifting movement of the terrain object as another example corresponding to the touch operation performed on the touch panel 62 of the terminal apparatus 6.

As shown in FIG. 9, the user performs an operation using the terminal apparatus 6 and the board-type controller 9. The user performs the operation of changing the attitude and the direction of the terminal apparatus 6, the operation of touching the touch panel 62 of the terminal apparatus 6, and the operation of changing a load to be applied to the board-type controller 9. Specifically, the user holds the body of the terminal apparatus 6 in the state where the terminal apparatus 6 is mounted on a table, and places both feet on the board-type controller 9. Then, the user takes action on the board-type controller 9 while viewing an image displayed on the monitor 2 or an image displayed on the LCD 61 of the terminal apparatus 6 (e.g., performs the operation of repeatedly changing a load to be applied to the board-type controller 9 by moving both feet on the board-type controller 9 so as to step in a sitting position). Further, the user plays by performing the operation of moving the terminal apparatus 6 on the table, and performing a touch operation on the touch panel 62 of the terminal apparatus 6. Then, on the LCD 61 and the monitor 2 of the terminal apparatus 6, game images are represented such that a player object in a virtual world takes action (e.g., the action of changing its attitude and direction, and the action of moving) in accordance with the direction (attitude) of the terminal apparatus 6 on the table and the touch operation performed on the touch panel 62 of the terminal apparatus 6, and the attitude and the position of a virtual camera set in the virtual world are changed in accordance with the direction and the position of the player object. Furthermore, the player object takes action (e.g., moves) in the virtual world in accordance with the action taken by the user on the board-type controller 9. It should be noted that descriptions are given below using an exemplary game where: the player object and the virtual camera move as a result of the user operating the board-type controller 9 so as to step; the directions of the player object and the virtual camera change in the virtual world as a result of the user performing the operation of moving the terminal apparatus 6 on the table; and the player object and the virtual camera move in the virtual world also as a result of the user performing the touch operation on the touch panel 62 of the terminal apparatus 6.

As shown in FIG. 10A, on the monitor 2, as the state of the entirety of a terrain object set in a virtual world, an image of the virtual world is displayed that is obtained by looking down from a position directly above and far from the terrain object. In the example shown in FIG. 10A, the present location of a player object Po that moves on the terrain object, and a terminal apparatus display range that is displayed on the LCD 61 of the terminal apparatus 6 such that the present location is at the center, are drawn on the terrain object. Then, the entire terrain object is displayed on the monitor 2 such that the north direction of the terrain object (the direction N shown in the figures) is directed in a virtual world reference direction (e.g., the up direction of the virtual world displayed on the monitor 2). The state of the virtual world that is obtained by looking down upon the entire terrain object is thus displayed on the monitor 2, whereby the user can easily understand the state of the entire terrain object and the positional relationship between the terrain object and the present location of the player object Po (the terminal apparatus display range), and another person viewing the state of the user playing the game can also enjoy viewing the state of the player object Po moving on the terrain object.

In addition, as shown in FIG. 10B, on the LCD 61 of the terminal apparatus 6, as the state of the player object Po moving on the terrain object in the virtual world, an image of the virtual world is displayed that is obtained by looking down from a position directly above and close to the player object Po. It should be noted that the point of view toward the virtual world displayed on the LCD 61 is relatively close to the terrain object (the player object Po). Accordingly, it is set such that the distance from the point of view to the player object Po is short relative to the distance from the point of view toward the virtual world displayed on the monitor 2 to the terrain object (the player object Po). In the example shown in FIG. 10B, the terrain object and the player object Po that moves on the terrain object are displayed. Then, on the LCD 61, the part of the terrain object that is included within the terminal apparatus display range is displayed, and the player object Po is displayed at the position on the terrain object that is substantially the center of the LCD 61. Then, when an operation based on the attitude of the terminal apparatus 6 indicates a reference operation indication direction described later, a part of the terrain object is displayed such that the north direction of the terrain object is the up direction of the LCD 61 (the y-axis positive direction), and the player object Po is displayed at the central position of the LCD 61 so as to have such an attitude that the forward direction of the player object Po (the direction F shown in the figures) is the up direction of the LCD 61. The terrain object and the player object Po are thus displayed on the LCD 61 as viewed from a position directly above and close to the player object Po, whereby the user viewing the display on the LCD 61 while operating the terminal apparatus 6 on a table can play a game as if viewing the player object Po from directly above. This makes it possible to provide a sense of presence in the virtual world.

It should be noted that in the example shown in FIG. 10A, on the monitor 2, the state of the virtual world is displayed that is obtained by looking down from a position directly above and far from the terrain object. Alternatively, the virtual world viewed from another point of view may be displayed on the monitor 2. The same virtual world may be displayed not only on the terminal apparatus 6 but also on the monitor 2, and images of the virtual world that are different from each other in the point of view may be displayed, whereby, in accordance with the state of the operation or preference, the user can appropriately use either one of the images displayed on the two display apparatuses when performing an operation. The point of view toward the virtual world displayed on the monitor 2 may be, for example, a position obliquely above the terrain object instead of the position directly above the terrain object, so long as the range of the virtual world displayed on the monitor 2 is wider than the range of the virtual world displayed on the terminal apparatus 6.

As an example, when the user has taken action so as to step on the board-type controller 9, the player object Po moves on the terrain object in the forward direction of the player object Po (the direction F shown in the figures) at a velocity based on the step action. For example, the shorter the cycle of the user stepping on the board-type controller 9, the greater the moving velocity of the player object Po. By thus taking action on the board-type controller 9, the user can cause the player object Po to move, and change the moving velocity of the player object Po.

For example, as described above, the board-type controller 9 outputs detected load values based on the action taken by the user on the board-type controller 9. Then, the use of the detected load values makes it possible to calculate the total load applied to the board-type controller 9. Then, the use of the total load per se or a change in the total load makes it possible to estimate the type of action that is being taken by the user on the board-type controller 9. The movement/stopping and the moving velocity of the player object Po are set in accordance with the action of the user thus estimated on the board-type controller 9.

In addition, the relative direction between the player object Po with the virtual camera, and the terrain object, in the virtual world changes in accordance with the direction (attitude) of the terminal apparatus 6 on the table. For example, the relative direction between the player object Po with the virtual camera, and the terrain object, in the virtual world changes to the right and left in accordance with the user rotating (rolling) the terminal apparatus 6 about the perspective direction of the LCD 61 (a terminal apparatus perspective direction) in the state where the back surface of the terminal apparatus 6 is in surface contact with the table.

As shown in FIG. 11A, the entire terrain object is displayed on the monitor 2 such that the north direction of the terrain object (the direction N shown in the figures) is directed in the virtual world reference direction (e.g., the up direction of the virtual world displayed on the monitor 2). Further, as shown in FIG. 11B, when the operation based on the attitude of the terminal apparatus 6 indicates the reference operation indication direction, a part of the terrain object is displayed such that the north direction of the terrain object is the up direction of the LCD 61 (the y-axis positive direction), and the player object Po is displayed at the central position of the LCD 61 so as to have such an attitude that the forward direction of the player object Po (the direction F shown in the figures) is the up direction of the LCD 61. Here, the state where the operation based on the attitude of the terminal apparatus 6 indicates the reference operation indication direction means the state of the terminal apparatus 6 directed in the same direction as the direction in which the terminal apparatus 6 has been placed on the table when initially set. This means the state where the terminal apparatus 6 is mounted on the table such that, typically, the up direction of the terminal apparatus 6 (the y-axis positive direction) is directed in the forward direction of the user (i.e., such that the y-axis negative direction is the direction toward the user). That is, when the operation based on the attitude of the terminal apparatus 6 indicates the reference operation indication direction, the player object Po and the terrain object are displayed such that both the north direction of the terrain object and the forward direction of the player object Po are the up direction of the LCD 61 (the direction F shown in the figures).

Then, when the terminal apparatus 6 indicating the reference operation indication direction has been rotated counterclockwise about the perspective direction of the LCD 61 (the z-axis direction) on the table (i.e., rolled on the table in the direction A shown in FIG. 11B), the images as shown in FIGS. 12A and 12B are displayed on the monitor 2 and the LCD 61, respectively. As shown in FIG. 12B, when the terminal apparatus 6 has been roll-rotated counterclockwise from the state indicating the reference operation indication direction, the attitude of the virtual camera for generating the virtual world to be displayed on the LCD 61 is changed in accordance with the roll rotation. For example, the attitude of the virtual camera is controlled such that the virtual camera rotates about the direction of the line of sight of the virtual camera by the angle of rotation by which the terminal apparatus 6 has roll-rotated (e.g., the angle by which the y-axis has moved rotationally about the z-axis), and in the direction of the roll rotation (e.g., the direction in which the y-axis has moved rotationally about the z-axis). Further, when the terminal apparatus 6 has been roll-rotated counterclockwise from the state indicating the reference operation indication direction, the forward direction F changes such that the player object Po rotates about the vertical direction in the virtual world by the angle of rotation by which the terminal apparatus 6 has roll-rotated, and in the direction of the roll rotation.

As an example, as shown in FIG. 14, when the terminal apparatus 6 has roll-rotated in the direction A and by a roll angle C (i.e., the y-axis has moved rotationally about the z-axis in the direction A and by the angle C), the attitude of the player object Po is controlled such that the player object Po rotates in the virtual world about the vertical direction in the virtual world in the direction A and by the angle C, and the forward direction of the player object Po also rotates in a similar manner. Further, the virtual camera placed at the position of looking down from directly above the player object Po also rotates in the virtual world about the direction of the line of sight of the virtual camera (the Z-axis direction shown in the figures, i.e., the same direction as the vertical direction in the virtual world) in the direction A and by the angle C. As is clear by comparing FIGS. 11B and 12B, this causes the player object Po to rotate relative to the terrain object in the direction A and by the angle C, and also causes the virtual camera to rotate in a similar manner. This results in causing the player object Po to be displayed on the LCD 61 in the same state. Meanwhile, the terminal apparatus 6 rotates in the direction A and by the roll angle C, and the virtual camera also rotates in a similar manner. This causes the terrain object displayed on the LCD 61 to be displayed so as to rotate in the direction opposite to the direction A and by the same angle C. This results in causing the terrain object to be displayed in the same direction in real space. As is clear by comparing FIGS. 11B and 12B, such a display control based on the attitude of the terminal apparatus 6 places the player object Po at the same position relative to the virtual camera even when the terminal apparatus 6 has roll-rotated. The LCD 61 (the terminal apparatus 6), however, has rotated counterclockwise by the angle of rotation C. As a result, the player object Po seems to rotate in real space in the same direction as that of the terminal apparatus 6, and therefore seems to rotate in the direction A relative to the terrain object and real space. On the other hand, the terrain object rotates clockwise relative to the virtual camera by the angle of rotation C. The LCD 61 (the terminal apparatus 6), however, has rotated counterclockwise by the angle of rotation C. As a result, the terrain object seems to be displayed in the same direction in real space.

The above-described method of generating a virtual world image is, as an example, performed by causing the virtual camera, for generating an image of the virtual world to be displayed on the LCD 61, and the player object Po to rotate in the virtual world while fixing the terrain object in the virtual world. The virtual world image described above, however, can also be generated by another method by changing the relative direction between the player object Po with the virtual camera, and the terrain object, in the virtual world.

For example, when the image of the virtual world shown in FIG. 11B, where the terrain object and the player object Po are placed, is changed to the image as shown in FIG. 12B in accordance with the roll rotation of the terminal apparatus 6, the terrain object may be, as shown in FIG. 15, caused to rotate about the direction of the line of sight of the virtual camera (the vertical direction in the virtual world) in accordance with the roll rotation of the terminal apparatus 6. In this case, even when the terminal apparatus 6 has rotated counterclockwise by the angle of rotation C, the virtual camera and the player object Po are placed in a fixed manner in the virtual world. On the other hand, when the terminal apparatus 6 has rotated counterclockwise by the angle of rotation C, the terrain object is caused to rotate clockwise about the fixation point of the virtual camera (the position of the player object Po) by the angle of rotation C. Such a method of generating a virtual world image also makes it possible to display a similar image on the LCD 61. At least one of the player object Po with the virtual camera, and the terrain object, in the virtual world may thus be caused to rotate relatively in accordance with the roll rotation of the terminal apparatus 6, whereby it is possible to generate the virtual world images shown in FIGS. 11B and 12B. In the following, however, descriptions are given using the method of causing the virtual camera and the player object Po to rotate in the virtual world while fixing the terrain object in the virtual world.

On the other hand, as is clear by comparing FIGS. 11A and 12A, even when the terminal apparatus 6 has rotated counterclockwise by the angle of rotation C, the image of the entire terrain object displayed on the monitor 2 does not change. As described above, however, the direction of the range of the terrain object displayed on the LCD 61 of the terminal apparatus 6 changes, and therefore, the terminal apparatus display range is displayed so as to rotate in accordance with the change in the direction of the range. For example, when the terminal apparatus 6 has roll-rotated counterclockwise by the angle of rotation C, the terminal apparatus display range displayed on the monitor 2 is displayed so as to also rotate counterclockwise about the center of the range by the angle of rotation C.

When the terminal apparatus 6 has been roll-rotated counterclockwise 90° on the table from the state shown in FIG. 11B by roll-rotating the terminal apparatus 6 further in the direction A, the images as shown in FIGS. 13A and 13B are displayed on the monitor 2 and the LCD 61, respectively. As shown in FIG. 13B, when the terminal apparatus 6 has been roll-rotated counterclockwise 90° on the table from the state shown in FIG. 11B, the virtual camera is caused to rotate about the direction of the line of sight of the virtual camera by the angle of rotation by which the terminal apparatus 6 has further roll-rotated. Further, the player object Po is placed on the terrain object so as to have such an attitude that the forward direction of the player object Po (the direction F shown in the figures) rotates by the angle of rotation by which the terminal apparatus 6 has further roll-rotated, and in the direction of the roll rotation. This causes the player object Po to be displayed on the LCD 61 such that the forward direction of the player object Po is the up direction of the LCD 61 (the y-axis positive direction), and causes the terrain object to be displayed on the LCD 61 such that the north direction of the terrain object is the direction from the left to the right of the LCD 61 (the x-axis positive direction).

As is clear by comparing FIGS. 11B and 13B, this changes the direction of the player object Po in the direction A relative to the terrain object and by an angle of rotation of 90° relative to the terrain object, and also causes the virtual camera to rotate in a similar manner. This results in causing the player object Po to be displayed on the LCD 61 in the same state. Then, the LCD 61 (the terminal apparatus 6) has roll-rotated counterclockwise by an angle of rotation of 90°. As a result, the player object Po seems to rotate in real space in the same direction as that of the terminal apparatus 6, and therefore seems to rotate 90° in the direction A relative to the terrain object and real space. Further, the terminal apparatus 6 has roll-rotated by an angle of 90° and in the direction A, and the virtual camera has also rotated in a similar manner. This causes the terrain object displayed on the LCD 61 to be displayed so as to rotate by the same angle of 90° and in the direction opposite to the direction A. This results in causing the terrain object to be displayed in the same direction in real space. As is clear by comparing FIGS. 11B and 13B, this changes the direction of the player object Po in the direction A and by an angle of rotation of 90° relative to the terrain object, and also causes the virtual camera to rotate in a similar manner. This results in causing the player object Po to be displayed on the LCD 61 in the same state, and causing the terrain object to be displayed so as to rotate 90° in the direction opposite to the direction A.

Meanwhile, as shown in FIG. 13A, when the terminal apparatus 6 has been roll-rotated counterclockwise 90° on the table from the state shown in FIG. 11B, the terminal apparatus display range displayed on the monitor 2 is displayed so as to also rotate counterclockwise about the center of the range by an angle of rotation of 90°.

As a result of the user thus roll-rotating the terminal apparatus 6, it is possible to display the player object Po and the virtual camera on the LCD 61 so as to rotate relative to the terrain object. Then, the roll angle and the roll direction of the terminal apparatus 6 may be set to coincide with the angle of rotation and the direction of rotation by and in which the player object Po and the virtual camera are caused to rotate relative to the terrain object, whereby the user can perform a direction operation having verisimilitude as if the terminal apparatus 6 were the player object Po. Further, the user can experience a feeling as if peeping at the virtual world by looking down upon it, using the LCD 61 of the terminal apparatus 6 as a peep window.

For example, acceleration data or angular velocity data based on a change in the attitude of the terminal apparatus 6 is output from the terminal apparatus 6. Then, the direction of the gravitational acceleration applied to the terminal apparatus 6 can be calculated using the acceleration indicated by the acceleration data. This makes it possible to estimate the attitude of the terminal apparatus 6 with respect to the vertical direction in real space, that is, the x-axis, y-axis, and z-axis directions of the terminal apparatus 6 with respect to the vertical direction. Further, the use of the angular velocity and/or the dynamic acceleration applied to the terminal apparatus 6 using the angular velocity indicated by the angular velocity data and/or the acceleration indicated by the acceleration data, makes it possible to estimate a change in the attitude of the terminal apparatus from its initial attitude in real space (i.e., changes in the x-axis, y-axis, and z-axis directions about the x, y, and z axes) using the angular velocity and/or the dynamic acceleration. In accordance with the thus estimated change in the attitude of the terminal apparatus 6 (changes in the x-axis, y-axis, and z-axis directions), the relative direction, attitude, position, and the like between the player object Po with the virtual camera, and the terrain object are set.

In addition, it is possible to cause the player object Po and the virtual camera to move relative to the terrain object, by performing the touch operation on the touch panel 62 of the terminal apparatus 6. For example, when the user has performed the touch operation so as to drag the touch panel 62, which covers the surface of the LCD 61, in the left direction (the direction B shown in FIG. 11B), the images as shown in FIGS. 16A and 16B are displayed on the monitor 2 and the LCD 61, respectively. As shown in FIG. 11B, when the user has performed the touch operation so as to drag the touch panel 62 in the left direction, an image of the virtual world is displayed on the LCD 61 such that the terrain object moves relative to the player object Po and the virtual camera at the distance based on the length at which the drag operation has been performed, and in the direction in which the drag operation has been performed (the direction B shown in the figures) (i.e., the player object Po and the virtual camera move relative to the terrain object in the direction opposite to the direction in which the drag operation has been performed). Further, as shown in FIG. 16A, when the user has performed the touch operation so as to drag the touch panel 62 in the left direction, an image of the entire terrain object is displayed on the monitor 2 such that the terminal apparatus display range moves in accordance with the movement of the range of the terrain object displayed on the LCD 61 (i.e., at the distance based on the length at which the drag operation has been performed, and in the direction opposite to the direction in which the drag operation has been performed).

As an example, as shown in FIG. 17, when the user has performed the touch operation so as to drag the touch panel 62 in the left direction (the direction B shown in the figures), the player object Po and the virtual camera move in the virtual world at the same distance and in the direction opposite to the direction B in which the drag operation has been performed (the direction D shown in the figures, i.e., the right direction of the virtual camera (the X-axis positive direction)). Here, on the basis of a track on the virtual world (terrain object) that is displayed so as to overlap the track of the touch position during the drag operation, the moving directions of the player object Po and the virtual camera are set to the direction opposite to that of the track, and the moving distances of the player object Po and the virtual camera are set to the same length as that of the track. Consequently, it is set such that when the drag operation has been performed on the touch panel 62, the terrain object displayed on the LCD 61 follows the movement of the touch position during the drag operation performed on the touch panel 62, that is, the position of the terrain object that is displayed so as to overlap the touch position is displayed so as to always overlap the touch position during the drag operation. Then, even when the user has performed the drag operation on the touch panel 62, none of the direction, the attitude, and the position of the player object Po changes on the LCD 61. Consequently, as is clear by comparing FIGS. 11B and 16B, when the user has performed the touch operation so as to drag the touch panel 62 in the left direction, the terrain object is displayed on the LCD 61 so as to move at the distance based on the drag operation and in the direction based on the drag operation. As a result, the terrain object seems to move so as to follow the movement of the touch position in real space as well. On the other hand, when the touch operation has been performed on the touch panel 62, the player object Po moves relative to the terrain object at the distance based on the drag operation and in the direction opposite to the direction based on the drag operation, but is placed in a fixed manner relative to the LCD 61.

The above-described method of generating a virtual world image is, as an example, performed by causing the virtual camera, for generating an image of the virtual world to be displayed on the LCD 61, and the player object Po to move in the virtual world while fixing the terrain object in the virtual world. The virtual world image described above, however, can also be generated by another method by changing the relative position between the player object Po with the virtual camera, and the terrain object, in the virtual world.

For example, when the image of the virtual world shown in FIG. 11B, where the terrain object and the player object Po are placed, is changed to the image as shown in FIG. 16B in accordance with the touch operation performed on the touch panel 62, the terrain object may be, as shown in FIG. 18, caused to move in accordance with the touch operation. In this case, even when the drag operation has been performed using the touch panel 62, the player object Po and the virtual camera are placed in a fixed manner in the virtual world. On the other hand, when the drag operation has been performed using the touch panel 62, the terrain object is caused to move in the virtual world in the direction based on the drag operation (the direction B shown in the figures, i.e., the left direction of the virtual camera (the X-axis negative direction) in the case of the drag operation performed in the direction B shown in the figures, i.e., the left direction of the touch panel 62 (the x-axis negative direction)) and at the distance based on the drag operation. Such a method of generating a virtual world image also makes it possible to display a similar image on the LCD 61. At least one of the player object Po with the virtual camera, and the terrain object, in the virtual world may thus be caused to move relatively in accordance with the touch operation performed on the touch panel 62, whereby it is possible to generate the virtual world images shown in FIGS. 11B and 12B. In the following, however, descriptions are given using the method of causing the virtual camera and the player object Po to move in the virtual world while fixing the terrain object in the virtual world.

As a result of the user thus performing the touch operation on the touch panel 62 of the terminal apparatus 6, it is possible to display the player object Po and the virtual camera on the LCD 61 so as to move relative to the terrain object. Then, the relative moving direction and moving distance of the player object Po and the virtual camera may be set such that the movement of the display position of the terrain object follows the moving direction and the moving distance of the touch position on the touch panel 62, whereby it is possible to achieve a game having verisimilitude as if the user causes the terrain object to slide, by performing the touch operation.

The movement form of the player object Po relative to the terrain object may possibly be changed between the case where the user causes the player object Po to move, by performing the operation using the board-type controller 9, and the case where the user causes the player object Po to move, by performing the touch operation on the touch panel 62. For example, when the player object Po moves by the operation performed using the board-type controller 9, the player object Po can move in accordance with a movement-allowed path and a movement-allowed region that are represented by the terrain object. The player object Po can take action on the terrain object (e.g., the action of acquiring an item on the terrain object, or action taken together with another object on the terrain object). On the other hand, when the player object Po moves by the touch operation performed on the touch panel 62, the player object Po can move regardless of a movement-allowed path and a movement-allowed region that are represented by the terrain object (e.g., the player object Po can be controlled to move in the air on the terrain object), but cannot take action on the terrain object. This requires the user to use either one of the operation using the board-type controller 9 and the touch operation, depending on the purpose of the movement of the player object Po. This enables an operation using the advantage of each movement form.

In addition, as an example, an image is displayed on the monitor 2 such that the center of the entire terrain object is placed at the center of the screen. Alternatively, an image may be displayed on the monitor 2 such that the center of the entire terrain object is shifted from the center of the screen. For example, the present location of the player object Po placed on the terrain object may be set to the fixation point of a second virtual camera, and the terrain object may be placed such that the present location of the player object Po is always placed at the center of the screen of the monitor 2. Consequently, even when the player object Po moves, the present location of the player object Po is always placed at the center of the monitor 2, and therefore, the display position of the present location does not move significantly by the movement of the player object Po. This makes it possible to expect the effect of making the present location easily understandable for the user.

Figure 19:
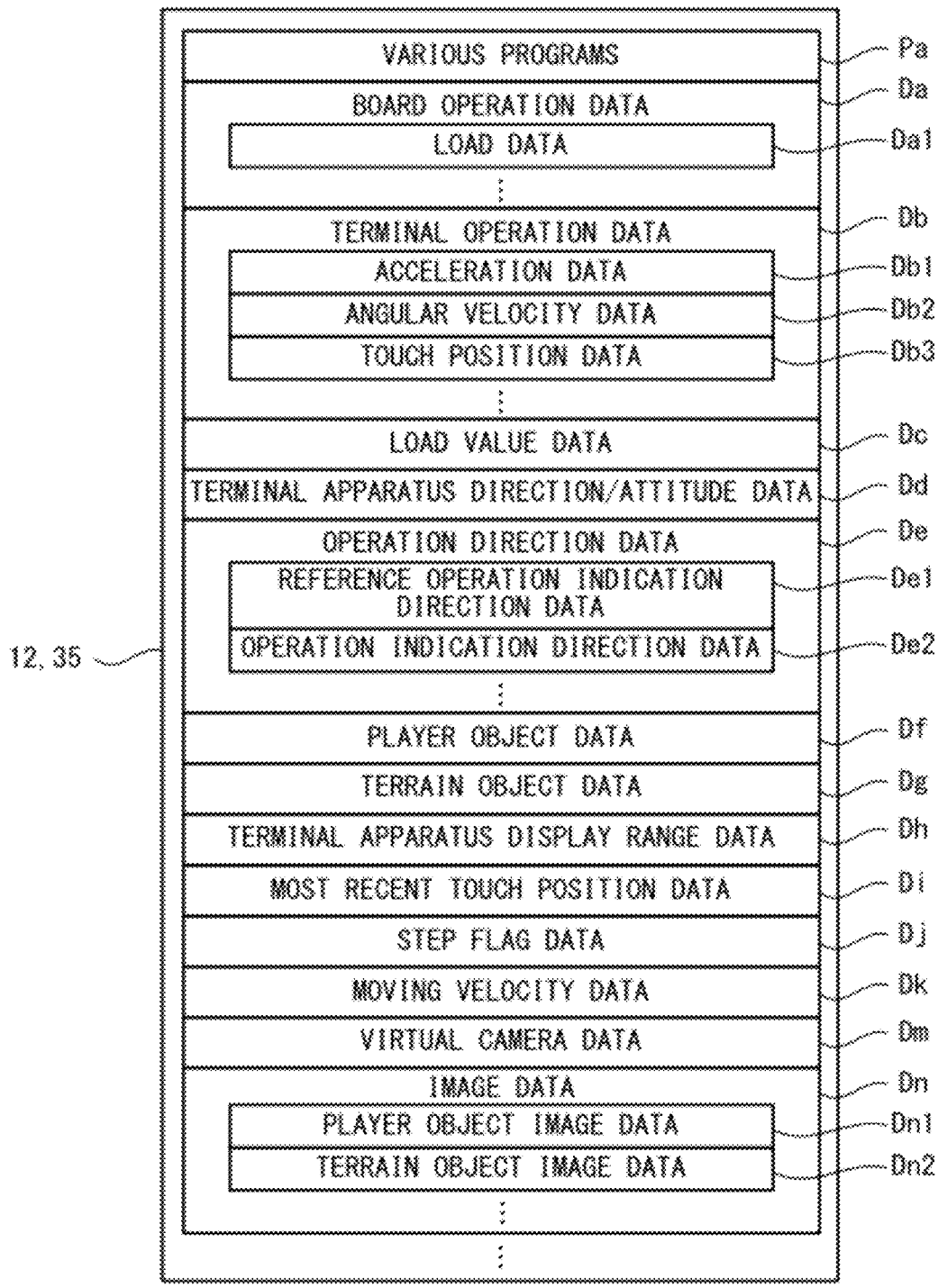
FIG. 19 is a diagram showing a non-limiting example of data and programs that are stored in a main memory of the game apparatus body 5 of FIG. 1.

Next, the processing performed by the game system 1 is described in detail. First, with reference to FIG. 19, main data used in the processing is described. FIG. 19 is a diagram showing an example of main data and programs that are stored in a main memory of the game apparatus body 5.

As shown in FIG. 19, in a data storage area of the main memory, the following are stored: board operation data Da; terminal operation data Db; load value data Dc; terminal apparatus direction/attitude data Dd; operation direction data De; player object data Df; terrain object data Dg; terminal apparatus display range data Dh; most recent touch position data Di; step flag data Dj; moving velocity data Dk; virtual camera data Dm; image data Dn; and the like. It should be noted that the main memory appropriately stores, as well as the data shown in FIG. 19, data used for the processing, such as image data of various objects displayed on the monitor 2 and the LCD 61, and sound data used for the processing. Further, in a program storage area of the main memory, various programs Pa included in the information processing program are stored.

As the board operation data Da, a series of operation information (board operation data) transmitted as transmission data from the board-type controller 9 is stored, and updated to the latest board operation data. For example, the board operation data Da includes load data Da1 and the like. The load data Da1 is data indicating load values detected by the load sensors 94*a* through 94*d* of the board-type controller 9.

As the terminal operation data Db, a series of operation information (terminal operation data) transmitted as transmission data from the terminal apparatus 6 is stored, and updated to the latest terminal operation data. For example, the terminal operation data Db includes acceleration data Db1, angular velocity data Db2, touch position data Db3, and the like. The acceleration data Db1 is data indicating an acceleration (an acceleration vector) detected by the acceleration sensor 603. For example, the acceleration data Db1 represents a three-dimensional acceleration vector whose components are accelerations in the three axial (x-axis, y-axis, and z-axis) directions shown in FIG. 3. In another embodiment, the acceleration data Db1 may represent accelerations in given one or more directions. The angular velocity data Db2 is data representing an angular velocity detected by the gyro sensor 604. For example, the angular velocity data Db2 represents angular velocities about the three axes (x-axis, y-axis, and z-axis) shown in FIG. 3. In another example, the angular velocity data Db2 may represent angular velocities about given one or more axes. The touch position data Db3 is data representing the coordinates of the position at which an input has been provided on the input surface of the touch panel 62.

It should be noted that the game apparatus body 5 sequentially receives the data (e.g., the data indicating the detected load values, the acceleration, and the angular velocity) included in the operation information transmitted from the controller 7, the board-type controller 9, and the terminal apparatus 6 at predetermined intervals (e.g., at intervals of ¹⁄₂₀₀ seconds). For example, the received data is sequentially stored in the main memory by the I/O processor 31. In a processing flow described later, the CPU 10 reads the latest board operation data and the latest terminal operation data from the main memory every frame period (e.g., ¹⁄₆₀ seconds), to thereby update the board operation data Da and the terminal operation data Db.

In addition, the operation information transmitted from the controller 7, the board-type controller 9, and the terminal apparatus 6 at the predetermined intervals may be temporarily stored in the buffer (not shown) included in the controller communication module 19 or the terminal communication module 28. In this case, the data stored in the buffer is read every frame period, and the board operation data Da (e.g., the load data Da1) or the terminal operation data Db (e.g., the acceleration data Db1, the angular velocity data Db2, and the touch position data Db3) in the main memory is updated for use. At this time, the cycle of receiving the operation information is different from the processing cycle, and therefore, a plurality of pieces of information received at a plurality of times are stored in the buffer. The processing is performed using only the latest operation information among the plurality of pieces of operation information received at the plurality of times.

The load value data Dc is an aggregate of data indicating the load values detected by the board-type controller 9. For example, the load value data Dc is an aggregate of data indicating the sum of the load values (the total load value) detected by the load sensors 94*a* through 94*d*. Specifically, the load value data Dc is an array of data indicating the total load values within a predetermined period that are chronologically calculated, and the data indicating the total load values is chronologically stored in the elements of the array.

The terminal apparatus direction/attitude data Dd is data indicating the current direction and attitude of the terminal apparatus 6 in real space. For example, the terminal apparatus direction/attitude data Dd is calculated on the basis of the acceleration data Db1 and the angular velocity data Db2 that are included in the terminal operation data Db.

The operation direction data De includes reference operation indication direction data De1, operation indication direction data De2, and the like. The reference operation indication direction data De1 is data indicating the direction that serves as a reference for an operation indication direction, and is set at initial settings. The operation indication direction data De2 is data indicating the operation indication direction currently indicated by the user. It should be noted that the method of calculating the reference operation indication direction and the operation indication direction will be described later.

The player object data Df is data concerning the player object Po in the virtual world. For example, the player object data Df is data indicating the position, the attitude, the direction, and the like of the player object Po in the virtual world.

The terrain object data Dg is data concerning the terrain object in the virtual world. For example, the terrain object data Dg is data indicating the position, the attitude, the direction, and the like of the terrain object in the virtual world.

The terminal apparatus display range data Dh is data indicating the terminal apparatus display range that is drawn on the terrain object. For example, the terminal apparatus display range data Dh is data indicating the drawing position, the line type, and the like of the terminal apparatus display range on the terrain object.

The most recent touch position data Di is data indicating the touch position at which the touch operation has been performed on the touch panel 62 in the most recent processing.

The step flag data Dj is data indicating a step flag that is set to on when a load equal to or greater than a threshold has been applied to the board-type controller 9, and is set to off when a load applied to the board-type controller 9 has become less than the threshold.

The moving velocity data Dk is the velocity of the player object Po moving in the virtual world in accordance with the operation performed on the board-type controller 9, and is data indicating the velocity of the player object Po moving relative to the terrain object.

The virtual camera data Dm is data concerning virtual cameras set in the virtual world. For example, the virtual camera data Dm includes data concerning a first virtual camera for generating a game image to be displayed on the LCD 61 of the terminal apparatus 6, and data concerning a second virtual camera for generating a game image to be displayed on the monitor 2.

The image data Dn includes player object Po image data Dn1, terrain object image data Dn2, and the like. The player object Po image data Dn1 is data for placing the player object Po in the virtual world to generate a game image. The terrain object image data Dn2 is data for placing the terrain object in the virtual world to generate a game image.

Figure 20:
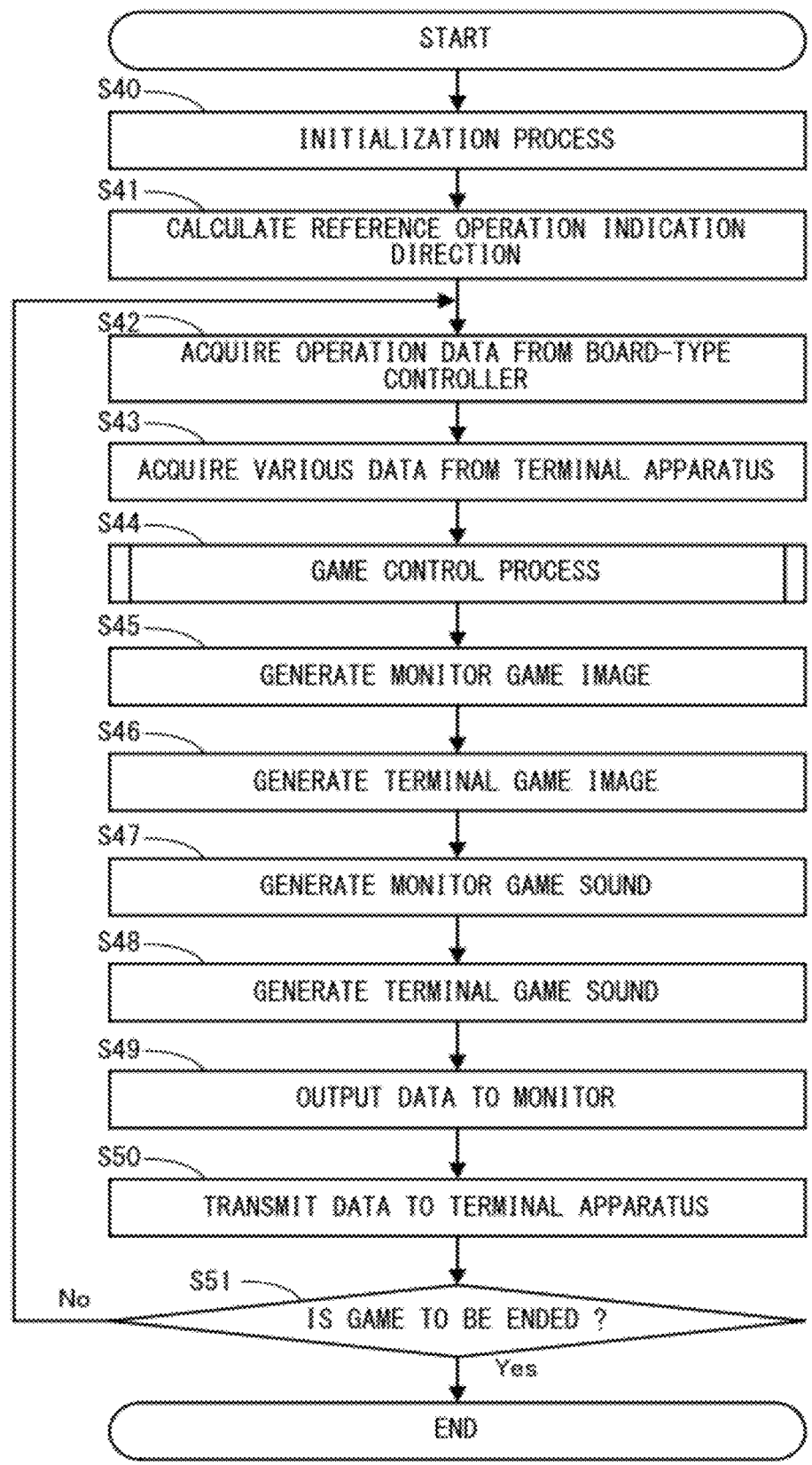
FIG. 20 is a flow chart showing a non-limiting example of game processing performed by the game apparatus body 5 of FIG. 1.
Figure 21:
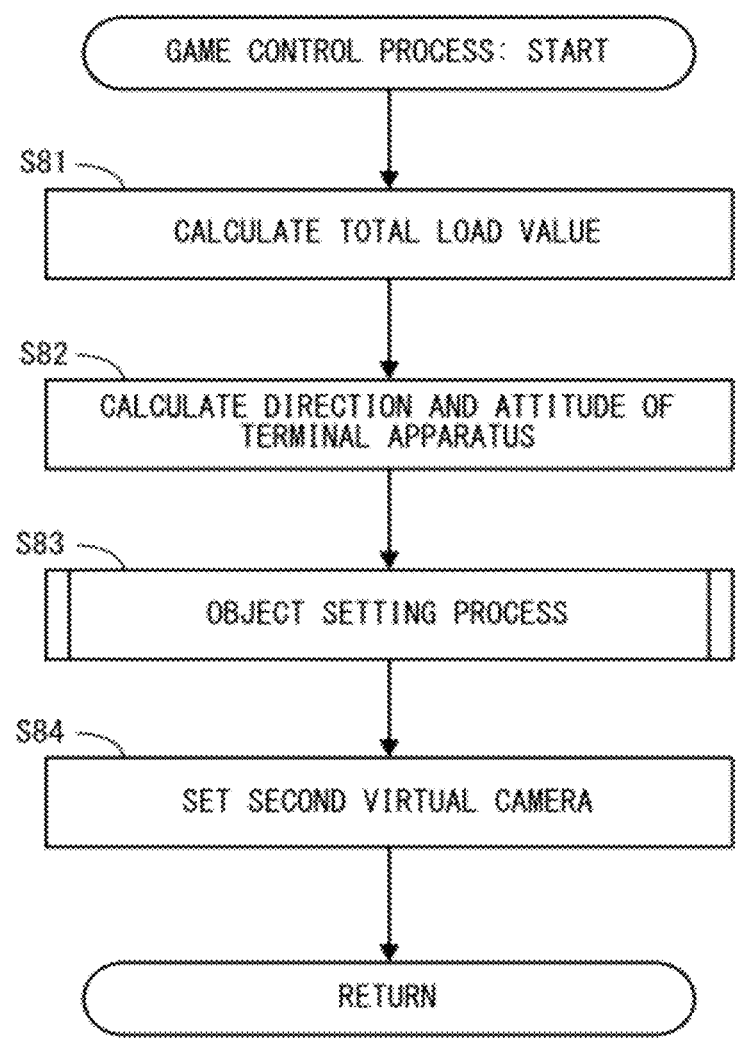
FIG. 21 is a subroutine flow chart showing a non-limiting example of a game control process in step 44 in FIG. 20.
Figure 22:
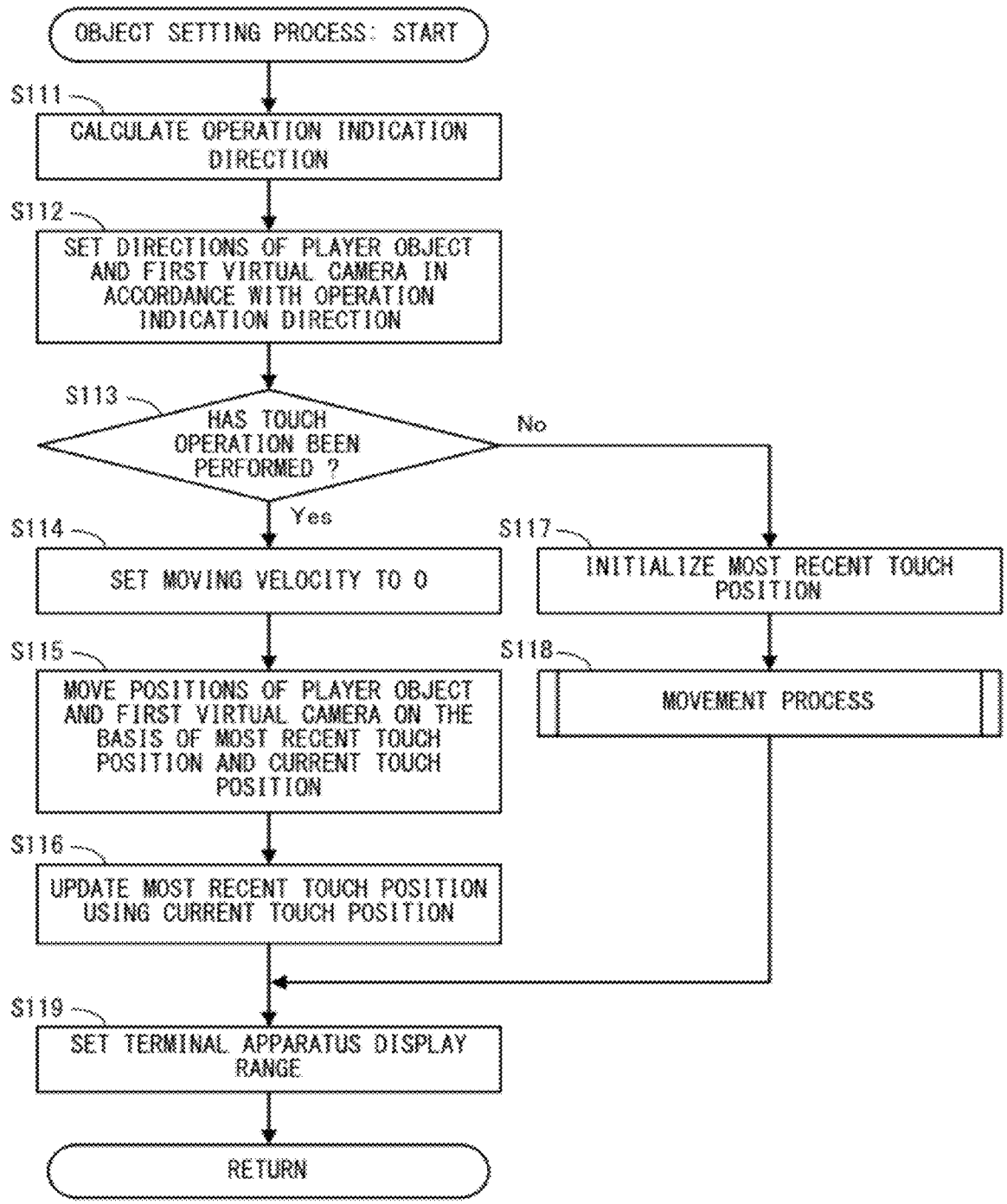
FIG. 22 is a subroutine flow chart showing a non-limiting example of an object setting process in step 83 in FIG. 21.
Figure 23:
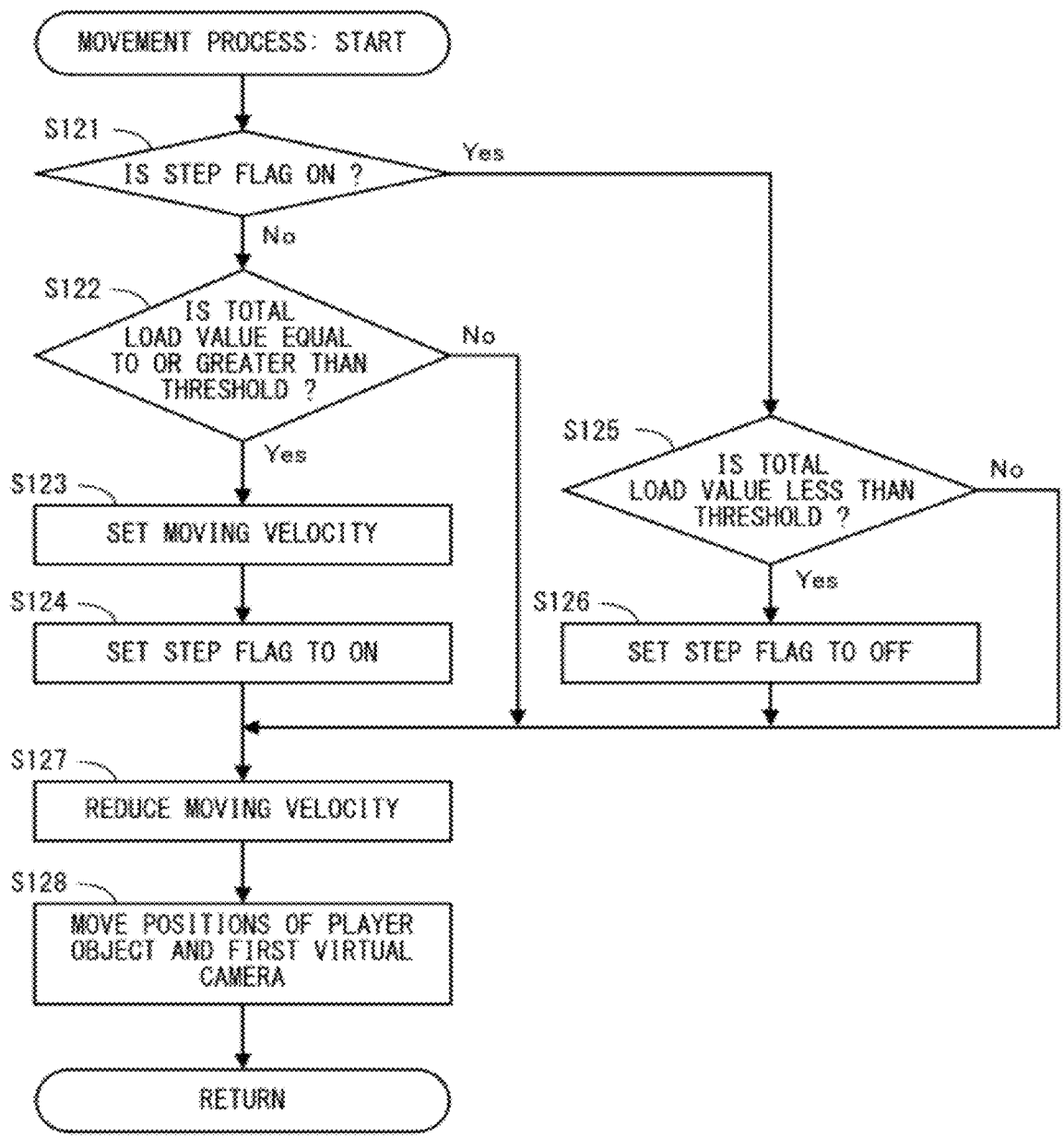
FIG. 23 is a subroutine flow chart showing a non-limiting example of a movement process in step 118 in FIG. 22.

Next, with reference to FIGS. 20 through 23, the game processing performed by the game apparatus body 5 is described in detail. It should be noted that FIG. 20 is a flow chart showing an example of the game processing performed by the game apparatus body 5. FIG. 21 is a subroutine flow chart showing an example of a game control process in step 44 in FIG. 17. FIG. 22 is a subroutine flow chart showing an example of an object setting process in step 83 in FIG. 21. FIG. 23 is a subroutine flow chart showing an example of a movement process in step 118 in FIG. 22. Here, in the flow charts shown in FIGS. 20 through 23, descriptions are given mainly of, among the processes of the game processing, a process where the player object Po and the virtual camera are displayed so as to move relative to the terrain object in accordance with the operation performed by the user using the terminal apparatus 6 and the board-type controller 9, while detailed descriptions of the other processes not directly related to the exemplary embodiment are omitted. Further, in FIGS. 20 through 23, each step performed by the CPU 10 is abbreviated as "S".

When the game apparatus body 5 has been powered on, the CPU 10 of the game apparatus body 5 executes a boot program stored in the ROM/RTC 13 to initialize each unit such as the main memory. Then, the game program stored in the optical disk 4 is loaded to the main memory, and the CPU 10 starts to execute the program. The flow charts shown in FIGS. 20 through 23 show processes to be performed after the above processes are completed.

Referring to FIG. 20, the CPU 10 performs an initialization process (step 40), and proceeds to the subsequent step. For example, in the initialization process in step 40, the CPU 10 constructs the virtual world, places the player object Po, the terrain object, and the virtual cameras (the first virtual camera and the second virtual camera) in the virtual world at predetermined positions, and sets the initial values of various parameters used for the game processing. It should be noted that the first virtual camera is initially placed at a position of looking down from directly above the player object Po, such that the forward direction of the player object Po is the up direction of the first virtual camera (the Y-axis positive direction).

Next, the CPU 10 calculates the reference operation indication direction on the basis of data transmitted from the terminal apparatus 6 (step 41), and proceeds to the subsequent step. A description is given below of an example where the CPU 10 calculates the reference operation indication direction.

The terminal apparatus 6 repeatedly transmits data as described above to the game apparatus body 5. In the game apparatus body 5, the terminal communication module 28 sequentially receives the data described above, and the I/O processor 31 sequentially stores terminal operation data, camera image data, and microphone sound data in the main memory. In step 41 described above, the CPU 10 reads the most recent terminal operation data from the main memory, to thereby update the acceleration data Db1, the angular velocity data Db2, and the touch position data Db3.

Next, the CPU 10 calculates the direction and the attitude of the terminal apparatus 6 in real space. For example, the CPU 10 calculates data indicating the current direction and attitude of the terminal apparatus 6 (e.g., data indicating the x-axis, y-axis, and z-axis directions of the terminal apparatus 6), on the basis of the acceleration indicated by the acceleration data Db1 and the angular velocity indicated by the angular velocity data Db2, to thereby update the terminal apparatus direction/attitude data Dd using data indicating the calculated direction and attitude of the terminal apparatus 6. For example, the CPU 10 can calculate the amount of rotation (the amount of change in direction) of the terminal apparatus 6 in real space per unit time, using the angular velocity indicated by the angular velocity data Db2. Further, in the state where the terminal apparatus 6 is substantially stationary (in a static state) in real space, the acceleration applied to the terminal apparatus 6 is the gravitational acceleration. This makes it possible to calculate the direction of gravity applied to the terminal apparatus 6 (i.e., the attitude of the terminal apparatus 6 with respect to the vertical direction in real space), using the acceleration indicated by the acceleration data Db1. This enables the CPU 10 to calculate data indicating the direction and the attitude of the terminal apparatus 6 on the basis of the acceleration indicated by the acceleration data Db1 and the angular velocity indicated by the angular velocity data Db2.

It should be noted that in the exemplary embodiment, the direction and the attitude of the terminal apparatus 6 are calculated on the basis of the data indicating the acceleration and the angular velocity that are detected by the terminal apparatus 6. Alternatively, in another embodiment, the direction and the attitude of the terminal apparatus 6 may be calculated using any one piece of data or three or more pieces of data. For example, the magnetic sensor 602 included in the terminal apparatus 6 detects a geomagnetism applied to the terminal apparatus 6. This makes it possible to calculate a predetermined orientation with respect to the terminal apparatus 6 (i.e., the attitude of the terminal apparatus 6 with respect to the predetermined orientation) on the basis of the direction of the geomagnetism applied to the terminal apparatus 6. Even when a magnetic field is generated in addition to the geomagnetism in the real space where the terminal apparatus 6 is located, it is possible to calculate the amount of rotation of the terminal apparatus 6. This enables the CPU 10 to calculate the direction and the attitude of the terminal apparatus 6 using at least one of the data indicating the acceleration, the data indicating the angular velocity, and the data indicating the magnetism, which are detected by the terminal apparatus 6.

Any calculation method may be used to calculate the direction and the attitude of the terminal apparatus 6. For example, a calculation method is possibly used of correcting the direction and the attitude of the terminal apparatus 6, which are calculated on the basis of the angular velocity indicated by the angular velocity data Db2, using the acceleration indicated by the acceleration data Db1 and the direction of the magnetism detected by the magnetic sensor 602.

Specifically, the CPU 10 first calculates the attitude of the terminal apparatus 6 on the basis of the angular velocity indicated by the angular velocity data Db2. Any method may be used to calculate the attitude of the terminal apparatus 6 from the angular velocity. For example, the attitude of the terminal apparatus 6 may be calculated using the most recent attitude (the most recently calculated x-axis, y-axis, and z-axis directions) and the current angular velocity (the angular velocity currently acquired in step 42 in the processing loop). The CPU 10 causes the most recent x-axis, y-axis, and z-axis directions to rotate about the axes along the respective directions at the current angular velocity for a unit time, to thereby calculate new x-axis, y-axis, and z-axis directions. It should be noted that the most recent x-axis, y-axis, and z-axis directions are represented by the terminal apparatus direction/attitude data Dd, and the current angular velocity is represented by the angular velocity data Db2. Accordingly, the CPU 10 reads the terminal apparatus direction/attitude data Dd and the angular velocity data Db2, and calculates the attitude of the terminal apparatus 6 (new x-axis, y-axis, and z-axis directions). It should be noted that, as described above, the initial attitude of the terminal apparatus 6 is defined in step 41 described above. Thus, when the attitude of the terminal apparatus 6 is calculated from the angular velocity, the CPU 10 can calculate the current attitude of the terminal apparatus 6 with respect to the initial attitude of the terminal apparatus 6 that has been calculated first.

Next, the CPU 10 corrects the attitude of the terminal apparatus 6 (the x-axis, y-axis, and z-axis directions), calculated on the basis of the angular velocity, using the acceleration indicated by the acceleration data Db1. Specifically, the CPU 10 calculates the attitude of the terminal apparatus 6 (the x-axis, y-axis, and z-axis directions) on the basis of the acceleration indicated by the acceleration data Db1. Here, in the state where the terminal apparatus 6 is substantially stationary, the acceleration applied to the terminal apparatus 6 is the gravitational acceleration. Accordingly, in this state, it is possible to calculate the direction of the gravitational acceleration (the direction of gravity) using the direction of the acceleration indicated by the acceleration data Db1. This makes it possible to calculate the direction of the terminal apparatus 6 relative to the direction of gravity (the x-axis, y-axis, and z-axis directions with respect to the direction of gravity).

When the attitude of the terminal apparatus 6 based on the acceleration is calculated, the CPU 10 corrects the attitude based on the angular velocity, using the attitude based on the acceleration. Specifically, the CPU 10 makes a correction to approximate at a predetermined rate the attitude of the terminal apparatus 6 (the x-axis, y-axis, and z-axis directions) calculated on the basis of the angular velocity to the attitude of the terminal apparatus 6 (the x-axis, y-axis, and z-axis directions) calculated on the basis of the acceleration. The predetermined rate may be a fixed value set in advance, or may be set in accordance with, for example, the acceleration indicated by the acceleration data Db1. Further, the attitude of the terminal apparatus 6 calculated on the basis of the acceleration cannot be calculated in the direction of rotation about the direction of gravity, and therefore, the CPU 10 may not make a correction on the attitude in this rotation direction. When correcting, on the basis of the direction of magnetism detected by the magnetic sensor 602, the attitude of the terminal apparatus 6 calculated on the basis of the angular velocity, the CPU 10 may approximate at a predetermined rate the attitude of the terminal apparatus 6 calculated on the basis of the angular velocity to the attitude of the terminal apparatus 6 calculated on the basis of the direction of magnetism detected by the magnetic sensor 602. This enables the CPU 10 to accurately calculate the attitude of the terminal apparatus 6.

Then, the reference operation indication direction that serves as a reference for the operation indication direction is calculated on the basis of the direction and the attitude of the terminal apparatus 6 in real space. It should be noted that in the following descriptions, as an example, the operation indication direction is set on the basis of the direction in which the top surface of the terminal apparatus 6 is directed in real space (the y-axis positive direction shown in FIG. 3, i.e., the up direction of the terminal apparatus). In the process of calculating the operation indication direction, the operation indication direction is calculated by making various corrections on the attitude and the direction of the terminal apparatus 6. Then, the reference operation indication direction is set using the operation indication direction calculated in step 41 described above, to thereby update the reference operation indication direction data De1 using the set reference operation indication direction.

When the operation indication direction is calculated, the tilts of the terminal apparatus 6 about the x-axis and the y-axis are corrected. For example, the x-axis direction and the y-axis direction are forcibly corrected to the horizontal directions (e.g., the vertical direction components of the x-axis direction and the y-axis direction are set to 0, and the x-axis direction and the y-axis direction are corrected to the directions obtained by projecting the respective directions in a direction vertical to a horizontal surface in real space) using the x-axis, y-axis, and z-axis directions indicated by the terminal apparatus direction/attitude data Dd. Subsequently, the z-axis direction is newly calculated on the basis of the exterior product of the x-axis direction and the y-axis direction that have been corrected to the horizontal directions. Then, the y-axis direction is newly calculated on the basis of the exterior product of the newly calculated z-axis direction and the x-axis component corrected to the horizontal direction, to thereby update the reference operation indication direction data De1 using the newly calculated y-axis positive direction (operation indication direction).

It should be noted that when calculated, the reference operation indication direction may be corrected on the basis of the acceleration indicated by the acceleration data Db1, or may be corrected on the basis of the direction of magnetism detected by the magnetic sensor 602. Alternatively, the reference operation indication direction may be calculated on the assumption that as a result of the user performing a predetermined operation in the state where the terminal apparatus 6 is in a specific attitude (e.g., in the state where the terminal apparatus 6 is mounted in a stationary manner on the table), the x-axis direction and the y-axis direction when the predetermined operation has been performed are directed in the horizontal directions. Timing may be set such that the setting of the reference operation indication direction, that is, step 41 described above, is performed at the start of the game, or is performed in accordance with a predetermined operation performed by the user using the terminal apparatus 6 (e.g., the operation of pressing a predetermined operation button 64).

Subsequent to step 41 described above, the process in step 42 is performed. Thereafter, the processing loop of a series of processes 42 through 51 is performed every predetermined period (one frame period) and repeated.

In step 42, the CPU 10 acquires board operation data transmitted from the board-type controller 9, and proceeds to the subsequent step. Here, the board-type controller 9 repeatedly transmits the board operation data to the game apparatus body 5. Accordingly, in the game apparatus body 5, the controller communication module 19 sequentially receives the board operation data, and the I/O processor 31 sequentially stores the received board operation data in the main memory. The interval of transmission of the board operation data from the board-type controller 9 may be shorter than the game processing period (one frame period), and it is 1/200 seconds, for example. In step 42, the CPU 10 reads the latest board operation data from the main memory, to thereby update the board operation data Da. The board operation data includes data indicating identification information of the load sensors 94a through 94d, and data indicating the load values detected by the load sensors 94a through 94d. The load data Da1 is updated using the data identified by the identification information.

Next, the CPU 10 acquires various data transmitted from the terminal apparatus 6 (step 43), and proceeds to the subsequent step. The terminal apparatus 6 repeatedly transmits the data to the game apparatus body 5. Accordingly, in the game apparatus body 5, the terminal communication module 28 sequentially receives the data, and the codec LSI 27 sequentially performs a decompression process on the camera image data and the microphone sound data. Then, the I/O processor 31 sequentially stores the terminal operation data, the camera image data, and the microphone sound data in the main memory. In step 43 described above, the CPU 10 reads the latest terminal operation data from the main memory, to thereby update the acceleration data Db1, the angular velocity data Db2, and the touch position data Db3.

Next, the CPU 10 performs a game control process (step 44), and proceeds to the subsequent step. The game control process is the process of, for example, causing the player object Po, the terrain object, and the virtual camera in the virtual world to move in accordance with a game operation performed by the user, to thereby advance the game. In this exemplary game, the user is allowed to play various games using the terminal apparatus 6 and the board-type controller 9. With reference to FIG. 21, a description is given below of the game control process in step 44 described above.

In FIG. 21, the CPU 10 calculates a total load value (step 81), and proceeds to the subsequent step. For example, the CPU 10 calculates a total load value by summing up the loads indicated by the load data Da1 and detected by the load sensors 94a through 94d, to thereby update the latest data indicating the total load value in the chronological data array of the load value data Dc, using the data indicating the calculated total load value. Specifically, the load data Da1 indicates the latest load values detected by the load sensors 94a through 94d, and therefore, the total load value is calculated using the detected load values. The thus calculated total load value changes in accordance with the action taken by the user on the board-type controller 9. As an example, when the user has taken action so as to apply a load to the board-type controller 9, the total load value increases in accordance with the applied load.

Next, the CPU 10 calculates the direction and the attitude of the terminal apparatus 6 (step 82), and proceeds to the subsequent step. For example, the CPU 10 calculates data indicating the current direction and attitude of the terminal apparatus 6 (e.g., data indicating the x-axis, y-axis, and z-axis directions of the terminal apparatus 6), on the basis of the acceleration indicated by the acceleration data Db1 and the angular velocity indicated by the angular velocity data Db2, to thereby update the terminal apparatus direction/attitude data Dd using data indicating the calculated direction and attitude of the terminal apparatus 6. It should be noted that the method of calculating data indicating the current direction and attitude of the terminal apparatus 6 is similar to the method described in step 41, and therefore is not described in detail here.

Next, the CPU 10 performs an object setting process (step 83), and proceeds to the subsequent step. With reference to FIG. 22, a description is given below of the object setting process in step 83 described above.

Referring to FIG. 22, the CPU 10 calculates the operation indication direction (step 111), and proceeds to the subsequent step. For example, the CPU 10 forcibly corrects the x-axis direction and the y-axis direction to the horizontal directions using the x-axis, y-axis, and z-axis directions indicated by the terminal apparatus direction/attitude data Dd, and newly calculates the z-axis direction on the basis of the exterior product of the x-axis direction and the y-axis direction that have been corrected to the horizontal directions. Then, the CPU 10 newly calculates the y-axis direction on the basis of the exterior product of the newly calculated z-axis direction and the x-axis component corrected to the horizontal direction, to thereby update the operation indication direction data De2 using the newly calculated y-axis positive direction (operation indication direction).

Next, the CPU 10 sets the directions (attitudes) of the player object Po and the first virtual camera in the virtual world in accordance with the operation indication direction calculated in step 111 described above (step 112), and proceeds to the subsequent step. For example, the CPU 10 calculates the angle of change and the direction of change in the operation indication direction relative to the reference operation indication direction, using the reference operation indication direction indicated by the reference operation indication direction data De1 and the operation indication direction indicated by the operation indication direction data De2. Then, the CPU 10 sets the forward direction of the player object Po (e.g., the direction F shown in FIG. 14) using the direction in the virtual world that is obtained by causing the player object Po to rotate relative to the virtual world reference direction (e.g., the up direction of the virtual world displayed on the monitor 2, i.e., the north direction of the terrain object because the direction of the terrain object is fixed relative to the virtual world in the exemplary embodiment) by the angle of change and in the direction of change, to thereby update the player object data Df. Further, the CPU 10 sets the up direction of the first virtual camera (e.g., the Y-axis positive direction shown in FIG. 14) using the direction in the virtual world that is obtained by causing the first virtual camera to rotate relative to the virtual world reference direction by the angle of change and in the direction of change, to thereby update the virtual camera data Dm. For example, as shown in FIG. 14, when the angle of change in the operation indication direction relative to the reference operation indication direction is the angle of rotation C, and the direction of change is counterclockwise with respect to the z-axis positive direction, the forward direction of the player object Po (the direction F shown in the figures) is set to the direction obtained by causing the player object Po to rotate counterclockwise with respect to the vertical direction in the virtual world by the angle of rotation C from the virtual world reference direction. Further, similarly to the forward direction of the player object Po, the up direction of the first virtual camera (e.g., the Y-axis positive direction shown in the figures) is also set to the direction obtained by causing the first virtual camera to rotate counterclockwise with respect to the direction of the line of sight by the angle of rotation C from the virtual world reference direction.

Next, the CPU 10 determines whether or not the touch operation has been performed on the touch panel 62 (step 113). For example, the CPU 10 determines, with reference to the touch position data Db3, whether or not the user has performed the touch operation on the touch panel 62. Then, when the touch operation has been performed on the touch panel 62, the CPU 10 proceeds to the subsequent step 114. On the other hand, when the touch operation has not been performed on the touch panel 62, the CPU 10 proceeds to the subsequent step 117.

In step 114, the CPU 10 sets the moving velocity to 0, and proceeds to the subsequent step. For example, the CPU 10 updates the moving velocity data Dk using the moving velocity set to 0.

Next, on the basis of the moving distance and the moving direction from the most recent touch position to the current touch position, the CPU 10 moves the positions of the player object Po and the first virtual camera in the virtual world at the moving distance and in the direction opposite to the moving direction (step 115), and proceeds to the subsequent step. For example, the CPU 10 calculates the distance and the direction from the position in the virtual world that overlaps the current touch position to the position in the virtual world that overlaps the most recent touch position, using the current touch position indicated by the touch position data Db3 and the most recent touch position indicated by the most recent touch position data Di. Then, the CPU 10 moves the positions of the player object Po and the first virtual camera at the calculated distance (moving distance) in the virtual world and in the calculated direction (moving direction) in the virtual world, to thereby update the player object data Df and the virtual camera data Dm using the resulting positions. As shown in FIG. 17, this moves the position of the player object Po relative to the terrain object in the direction opposite to the direction in the virtual world (the direction D shown in the figures) that overlaps the direction of the drag operation performed on the touch panel 62 (the direction B shown in the figures) and at the distance based on the length at which the drag operation has been performed. Further, the position of the first virtual camera also moves relative to the terrain object in the same moving direction and at the same moving distance as those of the player object Po. As a result, the display position of the player object Po displayed on the LCD 61 does not move, and the terrain object displayed on the LCD 61 is displayed so as to move, following the movement of the touch position during the drag operation performed on the touch panel 62.

Next, the CPU 10 updates the most recent touch position using the current touch position (step 116), and proceeds to the subsequent step 119. For example, the CPU 10 newly sets the most recent touch position data using the current touch position indicated by the touch position data Db3, to thereby update the most recent touch position data Di using the newly set most recent touch position data.

On the other hand, in step 117, the CPU 10 initializes the most recent touch position, and proceeds to the subsequent step. For example, the CPU 10 initializes the most recent touch position to null, to thereby update the most recent touch position data Di using the initialized most recent touch position.

Next, the CPU 10 performs a movement process (step 118), and proceeds to the subsequent step 119. With reference to FIG. 23, a description is given below of the movement process performed in step 118 described above.

Referring to FIG. 23, the CPU 10 determines whether or not the step flag indicated by the step flag data Dj is set to on (step 121). Then, when the step flag is set to off, the CPU 10 proceeds to the subsequent step 122. On the other hand, when the step flag is set to on, the CPU 10 proceeds to the subsequent step 125.

In step 122, the CPU 10 determines whether or not the total load value indicated by the load value data Dc is equal to or greater than a predetermined threshold. Then, when the total load value is equal to or greater than the predetermined threshold, the CPU 10 proceeds to the subsequent step 123. On the other hand, when the total load value is less than the predetermined threshold, the CPU 10 proceeds to the subsequent step 127. Here, the threshold used in step 122 described above is a value for detecting that the user has stepped on the board-type controller 9. The threshold may be a value set in advance, or may be a value set by an operation of the user.

In step 123, the CPU 10 sets the moving velocity, and proceeds to the subsequent step. For example, the CPU 10 calculates a moving velocity V by $$V=(1/F)*Vs$$

to thereby update the moving velocity data Dk using the calculated moving velocity V. Here, F represents the number of frames from the setting of the step flag to on to the present time (the number of times the processing cycle of the game has been repeated; the processing time of the game=one frame period), and represents the number of frames from the detection that the user has most recently stepped on the board-type controller 9 to the present time (i.e., the current detection of a step). Further, Vs represents a maximum value of the moving velocity, the maximum value defined in advance.

Next, the CPU 10 sets the step flag to on, to thereby update the step flag data Dj (step 124), and proceeds to the subsequent step 127.

On the other hand, when it has been determined in step 121 described above that the step flag is set to on, the CPU 10 determines whether or not the total load value indicated by the load value data Dc is less than the predetermined threshold (step 125). Then, when the total load value is less than the predetermined threshold, the CPU 10 proceeds to the subsequent step 126. On the other hand, when the total load value is equal to or greater than the predetermined threshold, the CPU 10 proceeds to the subsequent step 127. Here, the threshold used in step 125 described above is a value for detecting a decrease in the load once having increased when the user has taken one step on the board-type controller 9, thereby counting the one step. The threshold may be a value set in advance, or may be a value set by an operation of the user.

In step 126, the CPU 10 sets the step flag to off, to thereby update the step flag data Dj, and proceeds to the subsequent step 127.

In step 127, the CPU 10 reduces the moving velocity, and proceeds to the subsequent step. For example, the CPU 10 reduces the moving velocity by multiplying the moving velocity, indicated by the moving velocity data Dk, by a predetermined positive value less than 1, or subtracting a predetermined value from the moving velocity until the moving velocity is 0. Then, the CPU 10 updates the moving velocity data Dk using the reduced moving velocity.

Next, the CPU 10 moves the positions of the player object Po and the first virtual camera in the virtual world in the forward direction of the player object Po in accordance with the moving velocity (step 128), and ends the process of this subroutine. For example, the CPU 10 moves the position of the player object Po in the virtual world in the forward direction of the player object Po and at the distance based on the moving velocity, using the forward direction of the player object Po indicated by the player object data Df and the moving velocity indicated by the moving velocity data Dk, to thereby update the player object data Df using the resulting position. Further, the CPU 10 moves the position of the first virtual camera in the same forward direction and at the same moving distance as those of the player object Po, to thereby update the virtual camera data Dm using the resulting position.

Referring back to FIG. 22, in step 119, the CPU 10 sets the terminal apparatus display range on the basis of the position and the direction of the first virtual camera (or the position and the direction of the player object Po) relative to the terrain object, to thereby update the terminal apparatus display range data Dh, and ends the process of this subroutine. For example, the CPU 10 sets the position of the terminal apparatus display range on the basis of the position of the first virtual camera indicated by the virtual camera data Dm (or the position and the direction of the player object Po indicated by the player object data Df) and the position of the terrain object indicated by the terrain object data Dg. Specifically, the CPU 10 sets the position of the terminal apparatus display range relative to the terrain object such that the fixation point of the first virtual camera (the position of the player object Po) is the central position of the terminal apparatus display range. Then, the CPU 10 sets the shape and the direction of the terminal apparatus display range, using the roll direction of the first virtual camera (the forward direction of the player object Po), so as to substantially coincide with the shape and the direction of the range of the virtual world displayed on the LCD 61.

Referring back to FIG. 21, after the object setting process in step 83 described above, the CPU 10 sets parameters concerning the second virtual camera, to thereby update the virtual camera data Dm (step 84), and ends the process of this subroutine. For example, a monitor game image is generated as, for example, a three-dimensional CG image obtained by calculating a game space viewed from a virtual camera placed in the virtual world. As an example, the second virtual camera for generating a monitor game image is set in the same virtual world where the first virtual camera is set, the second virtual camera placed in a fixed manner at a position directly above and far from the terrain object placed in the virtual world. Then, the attitude of the second virtual camera is set such that the vertical direction in the virtual world is the direction of the line of sight of the second virtual camera, and the virtual world reference direction (the north direction of the terrain object because the direction of the terrain object is fixed relative to the virtual world in the exemplary embodiment) is the up direction of the second virtual camera. A terminal game image and a monitor game image are game images of the virtual world that are thus viewed from different points of view. This causes the game images of the virtual world viewed from the different points of view to be displayed on the LCD 61 and the monitor 2.

Referring back to FIG. 20, after the game control process in step 44, the CPU 10 and the GPU 32 generate a monitor game image to be displayed on the monitor 2 (step 45), and proceed to the subsequent step. For example, the CPU 10 and the GPU 32 read from the main memory the data indicating the result of the game control process performed in step 44, and read from the VRAM 34 the data used to generate a monitor game image. Then, the CPU 10 and the GPU 32 generate a game image using the read data, and store the generated monitor game image in the VRAM 34. Any monitor game image may be generated by any method so long as the monitor game image represents the result of the game control process performed in step 44. For example, the monitor game image may be a three-dimensional CG image generated by the steps of: placing the second virtual camera in the virtual world on the basis of the parameters concerning the second virtual camera that are indicated by the virtual camera data Dm; placing in the virtual world the player object Po and the terrain object, on which the terminal apparatus display range is drawn, on the basis of the player object data Df, the terrain object data Dg, and the terminal apparatus display range data Dh; and calculating the virtual world viewed from the second virtual camera. Specifically, the CPU 10 draws the terminal apparatus display range on the terrain object (or may draw the terminal apparatus display range outside the terrain object) on the basis of the terminal apparatus display range data Dh. Then, the CPU 10 places the player object Po and the terrain object in the virtual world on the basis of the positions and the directions indicated by the player object data Df and the terrain object data Dg.

Next, the CPU 10 and the GPU 32 generate a terminal game image to be displayed on the terminal apparatus 6 (step 46), and proceed to the subsequent step. For example, the CPU 10 and the GPU 32 read from the main memory the data indicating the result of the game control process performed in step 44, and read from the VRAM 34 the data used to generate a terminal game image. Then, the CPU 10 and the GPU 32 generate a terminal game image using the read data, and store the generated terminal game image in the VRAM 34. Similarly to the monitor game image, any terminal game image may be generated by any method so long as the terminal game image represents the result of the game control process performed in step 44. Further, the terminal game image may be generated by the same method as, or a different method from, that for the monitor game image. For example, the terminal game image may be a three-dimensional CG image generated as a virtual world image by the steps of: placing the first virtual camera in the virtual world on the basis of the parameters concerning the first virtual camera that are indicated by the virtual camera data Dm; placing the player object Po and the terrain object in the virtual world as in step 45 described above; and calculating the virtual world viewed from the first virtual camera.

Next, the CPU 10 generates a monitor game sound to be output to the loudspeakers 2a of the monitor 2 (step 47), and proceeds to the subsequent step. For example, the CPU 10 causes the DSP 33 to generate a monitor game sound to be output from the loudspeakers 2a, in accordance with the result of the game control process performed in step 44. As an example, the CPU 10 causes the DSP 33 to generate a monitor game sound in which BGM or the like to be output from the monitor 2 is added to the action sounds of the objects, sound effects, and the like that are supposed to be heard on the basis of the position of the second virtual camera in the virtual world set in accordance with the result of the game control process in step 44.

Next, the CPU 10 generates a terminal game sound to be output to the loudspeakers 607 of the terminal apparatus 6 (step 48), and proceeds to the subsequent step. For example, the CPU 10 causes the DSP 33 to generate a terminal game sound to be output from the loudspeakers 607, in accordance with the result of the game control process performed in step 44. As an example, the CPU 10 causes the DSP 33 to generate a terminal game sound in which BGM or the like to be output from the terminal apparatus 6 is added to the action sounds of the objects, sound effects, and the like that are supposed to be heard on the basis of the position of the first virtual camera in the virtual world set in accordance with the result of the game control process in step 44. The terminal game sound may be the same as, or different from, the monitor game sound. Alternatively, the terminal game sound may be partially different from the monitor game sound (e.g., the terminal game sound and the monitor game sound include the same BGM and different sound effects). It should be noted that when the monitor game sound and the terminal game sound are the same, the terminal game sound generation step in step 48 may not need to be performed.

Next, the CPU 10 outputs the monitor game image and the monitor game sound to the monitor 2 (step 49), and proceeds to the subsequent step. For example, the CPU 10 transmits to the AV-IC 15 the data of the monitor game image stored in the VRAM 34 and the data of the monitor game sound generated by the DSP 33. In response to this, the AV-IC 15 transmits the data of the monitor game image and the data of the monitor game sound to the monitor 2 through the AV connector 16. This causes the monitor game image to be displayed on the monitor 2, and causes the monitor game sound to be output from the loudspeakers 2a.

Next, the CPU 10 transmits the terminal game image and the terminal game sound to the terminal apparatus 6 (step 50), and proceeds to the subsequent step. For example, the CPU 10 transmits to the codec LSI 27 the data of the terminal game image stored in the VRAM 34 and the data of the terminal game sound generated by the DSP 33. The codec LSI 27 performs a predetermined compression process on the transmitted data. The compressed data of the terminal game image and the compressed data of the terminal game sound are transmitted from the codec LSI 27 to the terminal communication module 28, and then transmitted from the terminal communication module 28 to the terminal apparatus 6 via the antenna 29. The data of the terminal game image and the data of the terminal game sound that have been transmitted from the game apparatus body 5 are received by the wireless module 610 of the terminal apparatus 6, and are subjected to a predetermined decompression process by the codec LSI 606. Then, the decompressed data of the terminal game image is output to the LCD 61, and the decompressed data of the terminal game sound is output to the sound IC 608. This causes the terminal game image to be displayed on the LCD 61, and causes the terminal game sound to be output from the loudspeakers 607.

Next, the CPU 10 determines whether or not the game is to be ended (step 51). Conditions for ending the game may be, for example: that particular conditions have been satisfied so that the game is over, or the game is completed; or that the user has performed an operation for ending the game. When the game is not to be ended, the CPU 10 returns to step 42 and repeats the same processing. On the other hand, when the game is to be ended, the CPU 10 ends the processing of the flow chart. Thereafter, the series of processes 42 through 51 is repeatedly performed until the CPU 10 determines in step 51 that the game is to be ended.

The processing described above makes it possible to control a virtual camera (the first virtual camera) in the virtual world by the operation based on the attitude and the motion of the terminal apparatus 6, and the touch operation performed on the touch panel 62 of the terminal apparatus 6. For example, it is possible to control the virtual camera so as to roll-rotate in the virtual world by the operation based on the attitude and the motion of the terminal apparatus 6, and it is also possible to control the virtual camera so as to move in the virtual world by the drag operation performed on the touch panel 62. As described above, the processing described above makes it possible that when the point of view toward an image displayed on the terminal apparatus 6 (the position and the attitude of the first virtual camera) changes on the basis of the motion and the attitude of the terminal apparatus 6, the point of view is changed by the touch operation. This further facilitates the operation of the user changing the point of view.

In addition, the processing described above makes it possible to control the action of the player object Po in the virtual world by the operation based on the attitude and the motion of the terminal apparatus 6, the touch operation performed on the touch panel 62 of the terminal apparatus 6, and the operation based on the load applied to the board-type controller 9. For example, it is possible to perform control such that the direction of the player object Po is changed in the virtual world by the operation based on the attitude and the motion of the terminal apparatus 6, and it is also possible to control the player object Po so as to move in the virtual world by the drag operation performed on the touch panel 62, or the operation based on the load applied to the board-type controller 9. As described above, the processing described above makes it possible to, when a plurality of objects appear in a virtual world, vary the operations of the user to be performed on the objects.

It should be noted that in the above descriptions, an exemplary game is used where the player object Po and the terrain object appear in the virtual world. Alternatively, the exemplary embodiment can be applied even when the virtual world where these objects are not placed is displayed on the LCD 61 of the terminal apparatus 6. For example, a virtual camera for generating a virtual world image to be displayed on the LCD 61 is placed in the virtual world. Then, the attitude and the position of the virtual camera in the virtual world are changed in accordance with the attitude and the motion of the terminal apparatus 6, while the attitude and the position of the virtual camera in the virtual world are changed in accordance with the touch operation performed on the touch panel 62. As an example, when the terminal apparatus 6 has roll-rotated, the virtual camera is caused to rotate relative to the virtual world about the direction of the line of sight in accordance with the roll rotation. Alternatively, when the drag operation has been performed on the touch panel 62, the virtual camera is caused to move relative to the virtual world at the distance based on the drag operation and in the direction based on the drag operation or in the direction opposite thereto. Even when the virtual camera is thus simply placed in the virtual world, it is possible to display the virtual world on the LCD 61 from the point of view desired by the user in accordance with the operation performed on the terminal apparatus 6. This facilitates the operation of the user changing the point of view.

In addition, in the exemplary game described above, the game image displayed on the LCD 61 of the terminal apparatus 6 and the game image displayed on the monitor 2 are images both representing the state of the same virtual world, but are images different from each other in the point of view toward the virtual world and in the range. This enables the user to view the virtual world displayed on the two display screens in different fields of view and different display ranges, and therefore enables the user to appropriately view a suitable game image depending on the state of the game. Further, the exemplary game described above enables the user to perform an operation by moving the terminal apparatus 6 on the table, to thereby change the direction of the player object Po relative to the terrain object in accordance with the attitude and the position of the terminal apparatus 6 in real space, and also change an image displayed on the LCD 61 in accordance with the change. This makes it possible to provide a sense of presence in the virtual world to the user viewing an image displayed on the LCD 61 while moving the terminal apparatus 6. On the other hand, viewing only an image displayed on the LCD 61 may make it difficult to understand the position relative to the entire virtual world and the circumstance of the player object Po. The display of the virtual world in a relatively wide range on the monitor 2 can solve such a problem.

In addition, in the above embodiment, on the LCD 61 and the monitor 2, three-dimensional CG images or the like are displayed that are obtained by calculating a game space viewed from the virtual camera. Alternatively, images of the virtual world generated by another type of image processing may be displayed on the LCD 61 and the monitor 2. For example, two-dimensional virtual world images in each of which the player object Po and the terrain object are represented as two-dimensional images may be displayed on the LCD 61 and the monitor 2.

In addition, in the above descriptions, an exemplary game is used where the player object Po moves on the terrain object. It is, however, needless to say that the exemplary embodiment is not limited to the exemplary game. For example, the exemplary embodiment may possibly be applied to a game where a plate material is cut with a saw. In this game, display is controlled in a similar manner such that the terrain object is replaced with a plate material, and the player object Po is replaced with a saw. Then, the state of the plate material being cut with the saw by the operation based on the load applied to the board-type controller 9 is displayed on the LCD 61 and the monitor 2. Such a game can also provide the effects of the exemplary embodiment described above in a similar manner.

In addition, the game system 1 allows the user to perform various games using the terminal apparatus 6 and the board-type controller 9 as operation means. The terminal apparatus 6 can be used as a controller that allows the user to provide an input by an operation based on the motion of the body of the terminal apparatus 6, a touch operation, a button operation, or the like, while it can be used as a portable display or a second display. Accordingly, the game system 1 achieves a wide range of games. That is, the terminal apparatus 6 functions as an operation device as well as a display apparatus, and therefore, there may be a game system in which the terminal apparatus 6 is used as display means while the monitor 2 and the controller 7 are not used, and the terminal apparatus 6 and the board-type controller 9 are used as operation means. Further, the terminal apparatus 6 functions as an operation device as well as a display apparatus, and therefore, there may be a game system in which the terminal apparatus 6 is used as display means while the monitor 2, the board-type controller 9, and the controller 7 are not used, and the terminal apparatus 6 is used as operation means.

In addition, in the exemplary embodiment, the terminal apparatus 6 functions as a so-called thin client terminal, which does not perform game processing. In the exemplary embodiment, however, at least a part of the series of steps in the game processing to be performed by the game apparatus body 5 may be performed by the terminal apparatus 6. As an example, the terminal game image generation process may be performed by the terminal apparatus 6. As another example, all the series of steps in the game processing to be performed by the game apparatus body 5 may be performed by the terminal apparatus 6. In this case, the terminal apparatus 6 functions as a processing device that performs the steps in the game processing, as well as a display apparatus, and therefore, there may be a game system in which: the terminal apparatus 6 is used as display means while the monitor 2, the game apparatus body 5, and the controller 7 are not used; the board-type controller 9 is used as operation means; and the terminal apparatus 6 is used as processing means. In this game system, only the terminal apparatus 6 and the board-type controller 9 are connected wirelessly or wired, and board operation data is transmitted from the board-type controller 9 to the terminal apparatus 6, thereby achieving various games. Further, it is needless to say that when the board-type controller 9 is not used either, the terminal apparatus 6 may be used as display means, operation means, and processing means.

In addition, in the above embodiment, attitude data (e.g., at least one piece of data output from the magnetic sensor 602, the acceleration sensor 603, and the gyro sensor 604) used to calculate the attitude and/or the motion of the terminal apparatus 6 (including the position and the attitude per se, or changes in the position and the attitude) is output from the terminal apparatus 6 to the game apparatus body 5, and the attitude and/or the motion of the terminal apparatus 6 are calculated by the information processing performed by the game apparatus body 5. The attitude and/or the motion of the terminal apparatus 6 to be calculated by the game apparatus body 5, however, may be calculated by the terminal apparatus 6. In this case, the data indicating the attitude and/or the motion of the terminal apparatus 6 that have been calculated by the terminal apparatus 6 (i.e., data indicating the position and the attitude per se of the terminal apparatus 6, or changes in the position and the attitude that have been calculated using the attitude data) is output from the terminal apparatus 6 to the game apparatus body 5, and the data is used in the information processing performed by the game apparatus body 5.

In addition, in the above descriptions, the terminal apparatus 6 and the game apparatus body 5 are connected by wireless communication, and the board-type controller 9 and the game apparatus body 5 are connected by wireless communication. Alternatively, wireless communication between devices may be performed in a manner other than the above. As a first example, the terminal apparatus 6 functions as a relay device for another wireless communication. In this case, board operation data of the board-type controller 9 is wirelessly transmitted to the terminal apparatus 6, and the terminal apparatus 6 wirelessly transmits, to the game apparatus body 5, terminal operation data of the terminal apparatus 6 together with the received board operation data. In this case, while the terminal apparatus 6 and the game apparatus body 5 are directly connected by wireless communication, the board-type controller 9 is connected to the game apparatus body 5 via the terminal apparatus 6 by wireless communication. As a second example, the board-type controller 9 functions as a relay device for another wireless communication. In this case, terminal operation data of the terminal apparatus 6 is wirelessly transmitted to the board-type controller 9, and the board-type controller 9 wirelessly transmits, to the game apparatus body 5, board operation data of the board-type controller 9 together with the received terminal operation data. In this case, the board-type controller 9 and the game apparatus body 5 are directly connected by wireless communication, while the terminal apparatus 6 is connected to the game apparatus body 5 via the board-type controller 9 by wireless communication.

In addition, the terminal apparatus 6 and/or the board-type controller 9 may be electrically connected to the game apparatus body 5 via cables. In this case, the cables connected to the terminal apparatus 6 and/or the board-type controller 9 are connected to a connection terminal of the game apparatus body 5. As a first example, the terminal apparatus 6 and the game apparatus body 5 are electrically connected via a first cable, and the board-type controller 9 and the game apparatus body 5 are electrically connected via a second cable. As a second example, the terminal apparatus 6 and the game apparatus body 5 are electrically connected via a cable. In this case, board operation data of the board-type controller 9 may be wirelessly transmitted to the terminal apparatus 6 and then transmitted to the game apparatus body 5 via the cable. As a third example, the board-type controller 9 and the game apparatus body 5 are electrically connected via a cable. In this case, terminal operation data of the terminal apparatus 6 may be wirelessly transmitted to the board-type controller 9 and then transmitted to the game apparatus body 5 via the cable. Alternatively, terminal operation data of the terminal apparatus 6 may be wirelessly transmitted to the game apparatus body 5 directly from the terminal apparatus 6.

In addition, in the exemplary embodiment, the game system 1 includes one terminal apparatus 6 and one board-type controller 9. Alternatively, the game system 1 may be configured to include a plurality of terminal apparatuses 6 and a plurality of board-type controllers 9. That is, the game apparatus body 5 may be capable of wirelessly communicating with each terminal apparatus 6 and each type controller 9, and may transmit game image data, game sound data, and control data to each terminal apparatus, and receive terminal operation data, camera image data, microphone sound data, and board operation data from each terminal apparatus 6 and each board-type controller 9. When the game apparatus body 5 wirelessly communicates with the plurality of terminal apparatuses 6 and the plurality of board-type controllers 9, the game apparatus body 5 may perform the wireless communication in a time division manner or in a frequency division manner.

As described above, when the game system 1 includes a plurality of terminal apparatuses 6 and a plurality of board-type controllers 9, a plurality of users are allowed to play more games. For example, when the game system 1 includes two pairs of terminal apparatuses 6 and board-type controllers 9, two users are allowed to play a game simultaneously. Further, when the game system 1 includes two pairs of terminal apparatuses 6 and board-type controllers 9, the game system 1 includes three display apparatuses, and therefore can generate game images for three users to be displayed on the respective display apparatuses.

In addition, in the above descriptions, a plurality of load sensors 94 are provided in the board-type controller 9. Information of the position of the center of gravity of a load applied to the board-type controller 9, however, is not used in the above processing. Thus, at least one load sensor 94 may be provided in the board-type controller 9.

In addition, the exemplary embodiment is described using the stationary game apparatus 3. The exemplary embodiment, however, may be achieved by executing the information processing program according to the exemplary embodiment with an information processing apparatus such as a hand-held game apparatus or a general personal computer. Further, in another embodiment, the exemplary embodiment may be applied not only to a game apparatus but also to a given hand-held electronic device (e.g., a PDA (Personal Digital Assistant) or a mobile telephone), a personal computer, a camera, and the like. Any device may be connected to the terminal apparatus 6 and the board-type controller 9 wirelessly or wired, whereby the exemplary embodiment can be achieved.

In addition, in the above descriptions, the game processing is performed by the game apparatus body 5. At least a part of the processing steps in the game processing, however, may be performed by another apparatus provided outside the game system 1. For example, when the game apparatus body 5 is configured to communicate with another apparatus (e.g., a server or another game apparatus), the processing steps in the game processing may be performed by the game apparatus body 5 in combination with said another apparatus. As an example, said another apparatus performs the process of setting an object, a virtual world, and the like, and data concerning the motion and the attitude of the object is transmitted from the game apparatus body 5 to said another apparatus, whereby the game processing is performed. Then, image data indicating the virtual world generated by said other apparatus is transmitted to the game apparatus body 5, and the virtual world is displayed on the monitor 2 and the LCD 61. At least a part of the processing steps in the game processing is thus performed by another apparatus, whereby the same processing as the game processing is achieved. It should be noted that at least a part of the processing steps in the information processing may be performed by the board-type controller 9 (the microcomputer 100). Further, the above game processing can be performed by one processor or by a cooperation of a plurality of processors, the one processor or the plurality of processors included in an information processing system including at least one information processing apparatus. Further, in the exemplary embodiment, the processes shown in the above flow charts are performed as a result of the CPU 10 of the game apparatus body 5 executing a predetermined program. Alternatively, a part or all of the processes may be performed by a dedicated circuit included in the game apparatus body 5.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

In addition, the shape of the game apparatus body 5 described above, the shapes of the terminal apparatus 6, the controller 7, and the board-type controller 9, and the shapes, the number, the placement, or the like of the various operation buttons and sensors are merely illustrative, and the exemplary embodiment can be achieved with other shapes, numbers, placements, and the like. Further, the processing orders, the setting values, the display forms, the criterion values, and the like that are used in the information processing described above are also merely illustrative, and it is needless to say that the exemplary embodiment can be achieved with other orders, display forms, and values.

In addition, the information processing program described above may be supplied to the game apparatus body 5 not only from an external storage medium such as the optical disk 4, but also via a wireless or wired communication link. Further, the information processing program may be stored in advance in a nonvolatile storage device of the game apparatus body 5. It should be noted that examples of an information storage medium for storing the information processing program may include a CD-ROM, a DVD, given another optical disk storage medium similar to these, a flexible disk, a hard disk, a magnetic optical disk, and a magnetic tape, as well as a nonvolatile memory. Furthermore, the information storage medium for storing the information processing program may be a nonvolatile semiconductor memory or a volatile memory. Such storage media can be defined as storage media readable by a computer or the like. For example, a computer or the like is caused to read and execute programs stored in each of the storage media, and thereby can be caused to provide the various functions described above.

While some exemplary systems, exemplary methods, exemplary devices, and exemplary apparatuses have been described in detail, the foregoing description is in all aspects illustrative and not restrictive. It is understood that numerous other modifications and variations can be devised without departing from the spirit and scope of the appended claims. It is understood that the scope of the exemplary embodiment should be interpreted only by the scope of the appended claims. It is also understood that one skilled in the art can implement the exemplary embodiment in the equivalent range on the basis of the description of the exemplary embodiment and common technical knowledge, from the description of the specific embodiments. It should be understood that when used in the present specification, components and the like described in singular form with the words "a" and "an" before them do not exclude the plurality of these components. Furthermore, it should be understood that terms used in the present specification have meanings generally used in the art unless otherwise specified. Therefore, unless otherwise defined, all the jargons and technical terms have the same meanings as those generally understood by one skilled in the art of the exemplary embodiment. In the event of any contradiction, the present specification (including meanings defined herein) has priority.

A storage medium having stored thereon an information processing program, an information processing apparatus, an information processing system, and an information processing method according to the exemplary embodiment, when the point of view toward an image displayed on an apparatus changes on the basis of the motion and the attitude of the apparatus body, further facilitate the operation of changing the point of view, and therefore are suitable for use as an information processing program, an information processing apparatus, an information processing system, and an information processing method that perform, for example, a process of controlling the point of view on the basis of an operation of a user.

What is claimed is:

1. A non-transitory computer-readable storage medium comprising an information processing program to be executed by a computer of an information processing apparatus capable of displaying an image on a portable display apparatus that outputs at least body state data based on an attitude and/or a motion of the portable display apparatus body and touch position data based on a touch position on a touch panel provided in the portable display apparatus, the information processing program causing the computer to:
   calculate the attitude and/or the motion of the portable display apparatus on the basis of the body state data;
   independently control an attitude of a first virtual camera for generating an image of a virtual world on the basis of the attitude and/or the motion of the portable display apparatus such that the first virtual camera rotates relative to the virtual world;
   independently control a position of the first virtual camera for generating the image of the virtual world to move in a direction relative to a direction of input on the touch panel, the position of the first virtual camera being controlled on the basis of the touch position indicated by the touch position data such that the first virtual camera moves relative to the virtual world; and
   display on the portable display apparatus a first image representing the virtual world viewed from the first virtual camera.

2. The non-transitory computer-readable storage medium having stored thereon the information processing program according to claim 1, wherein
   the attitude of the first virtual camera is controlled on the basis of the attitude and/or the motion of the portable display apparatus such that the first virtual camera rotates relative to an object placed in the virtual world, and the position of the first virtual camera is controlled, on the basis of the touch position indicated by the touch position data, such that the first virtual camera moves relative to the object.

3. The non-transitory computer-readable storage medium having stored thereon the information processing program according to claim 1, the information processing program further causing the computer to:
   control, on the basis of the calculated attitude and/or motion of the portable display apparatus and the touch position indicated by the touch position data, an action of a player object placed in the virtual world, wherein
   the first virtual camera is placed at a position of generating an image of the virtual world, the image including at least the player object.

4. The non-transitory computer-readable storage medium having stored thereon the information processing program according to claim 3, wherein the first virtual camera is placed at a position of looking down from directly above the player object in the virtual world.

5. The non-transitory computer-readable storage medium having stored thereon the information processing program according to claim 3, wherein
   an attitude of the player object is controlled on the basis of the attitude and/or the motion of the portable display apparatus such that the player object rotates relative to the virtual world about a vertical direction in the virtual world, in the same direction of rotation and by the same angle of rotation as a direction of rotation and an angle of rotation of the first virtual camera, and
   a position of the player object is controlled, on the basis of the touch position indicated by the touch position data, such that the player object moves relative to the virtual world in the same moving direction and at the same moving distance as a moving direction and a moving distance of the first virtual camera.

6. The non-transitory computer-readable storage medium having stored thereon the information processing program according to claim 3, the information processing program further causing the computer to:
  acquire data based on a load applied to a load detection device, wherein
    a position of the player object is controlled on the basis of the acquired data such that the player object moves relative to the virtual world.

7. The non-transitory computer-readable storage medium having stored thereon the information processing program according to claim 1, the information processing program further causing the computer to:
  calculate, on the basis of the touch position data, a displacement of the touch position input to the touch panel, wherein
    the first virtual camera is controlled on the basis of the displacement of the touch position so as to move relative to the virtual world.

8. The non-transitory computer-readable storage medium having stored thereon the information processing program according to claim 7, wherein
  a moving direction in which the first virtual camera is to be caused to move is calculated on the basis of a direction of the displacement of the touch position, and the first virtual camera is controlled so as to move relative to the virtual world in the moving direction.

9. The non-transitory computer-readable storage medium having stored thereon the information processing program according to claim 8, wherein
  a direction opposite to the direction of the displacement of the touch position is calculated as the moving direction.

10. The non-transitory computer-readable storage medium having stored thereon the information processing program according to claim 9, wherein
  a direction opposite to a direction that corresponds to the direction of the displacement and is included in the virtual world displayed so as to overlap the displacement of the touch position is calculated as the moving direction.

11. The non-transitory computer-readable storage medium having stored thereon the information processing program according to claim 7, wherein
  a moving distance at which the first virtual camera is to be caused to move is calculated on the basis of an amount of the displacement of the touch position, and the first virtual camera is controlled so as to move relative to the virtual world at the moving distance.

12. The non-transitory computer-readable storage medium having stored thereon the information processing program according to claim 11, wherein
  a distance corresponding to the amount of the displacement and included in the virtual world displayed so as to overlap the displacement of the touch position is calculated as the moving distance.

13. The non-transitory computer-readable storage medium having stored thereon the information processing program according to claim 1, wherein
  at least an attitude and/or a motion of the portable display apparatus that are obtained by rotating the portable display apparatus about a perspective direction of, and perpendicular to, a display screen of the portable display apparatus are calculated, and
  the attitude of the first virtual camera is controlled in accordance with the attitude and/or the motion of the portable display apparatus that are obtained by rotating the portable display apparatus about the perspective direction.

14. The non-transitory computer-readable storage medium having stored thereon the information processing program according to claim 13, wherein
  the attitude of the first virtual camera is controlled such that in accordance with a direction of rotation in which the portable display apparatus rotates about the perspective direction, the first virtual camera rotates relative to the virtual world about a direction of a line of sight of the first virtual camera and in the direction of rotation.

15. The non-transitory computer-readable storage medium having stored thereon the information processing program according to claim 13, wherein
  the attitude of the first virtual camera is controlled such that the first virtual camera rotates relative to the virtual world, in accordance with an angle by which a facing direction of the portable display apparatus body changes about the perspective direction.

16. The non-transitory computer-readable storage medium having stored thereon the information processing program according to claim 15, wherein
  the attitude of the first virtual camera is controlled such that the first virtual camera rotates relative to the virtual world by the same angle as the angle by which the facing direction of the portable display apparatus body changes.

17. The non-transitory computer-readable storage medium having stored thereon the information processing program according to claim 13, wherein
  the attitude of the first virtual camera is controlled such that in accordance with a direction of rotation and an angle of rotation in and by which the portable display apparatus rotates about the perspective direction, the first virtual camera rotates relative to the virtual world about a direction of a line of sight of the first virtual camera in the direction of rotation and by the angle of rotation; and
  when the touch position data indicates an operation of dragging the touch panel, the position of the first virtual camera is controlled such that in accordance with a moving direction and a moving distance of the touch position in the virtual world displayed on the display screen so as to overlap the touch position indicated by the touch position data, the first virtual camera moves relative to the virtual world along a plane perpendicular to the direction of the line of sight in a direction opposite to the moving direction and at the moving distance.

18. The non-transitory computer-readable storage medium having stored thereon the information processing program according to claim 1, wherein
  the portable display apparatus includes at least one of a gyro sensor and an acceleration sensor, and
  the attitude and/or the motion of the portable display apparatus are calculated on the basis of data output from the at least one of the gyro sensor and the acceleration sensor.

19. The non-transitory computer-readable storage medium having stored thereon the information processing program according to claim 1, wherein
  image data indicating the first image is output to the portable display apparatus, and
  the portable display apparatus configured to: acquire the image data output from the information processing apparatus, and
  display the first image, on a display screen of the portable display apparatus, indicated by the acquired image data.

20. The non-transitory computer-readable storage medium having stored thereon the information processing program according to claim 19, the information processing program further causing the computer to:

generate compression image data by compressing the image data indicating the first image, wherein the generated compression image data is output to the portable display apparatus, the compression image data output from the information processing apparatus is acquired by the portable display apparatus, the portable display apparatus is further configured to decompress the compression image data to obtain the image data indicating the first image, and the display screen of the portable display apparatus displays the first image indicated by the acquired and decompressed image data.

21. The non-transitory computer-readable storage medium having stored thereon the information processing program according to claim 1, wherein besides the first image, a second image representing the virtual world viewed from a second virtual camera is further displayed on another display apparatus connected to the information processing apparatus.

22. The non-transitory computer-readable storage medium having stored thereon the information processing program according to claim 21, the information processing program further causing the computer to:

generate compression image data by compressing the image data indicating the first image, wherein the generated compression image data is output to the portable display apparatus, and, besides the compression image data, image data indicating the second image is output to said another display apparatus without being compressed, and the portable display apparatus configured to:
acquire the compression image data output from the information processing apparatus; and
decompress the compression image data to obtain the image data indicating the first image, wherein
a display screen of the portable display apparatus displays the first image indicated by the acquired and decompressed image data.

23. The non-transitory computer-readable storage medium having stored thereon the information processing program according to claim 21, the information processing program further causing the computer to:

set the second virtual camera at a position different from the position of the first virtual camera, and control an attitude and/or a position of the second virtual camera.

24. The non-transitory computer-readable storage medium having stored thereon the information processing program according to claim 23, wherein a direction of a line of sight of the second virtual camera is set to be parallel to a direction of a line of sight of the first virtual camera, and the second virtual camera is set behind the first virtual camera, and a range wider than a range of the virtual world represented by the first image is displayed as the second image on said another display apparatus.

25. The non-transitory computer-readable storage medium having stored thereon the information processing program according to claim 23, wherein a direction of a line of sight of the first virtual camera is set to a vertical direction in the virtual world, and a direction of a line of sight of the second virtual camera is set to the vertical direction in the virtual world.

26. The non-transitory computer-readable storage medium having stored thereon the information processing program according to claim 1, wherein the first virtual camera is configured to move in a horizontal direction along a first axis relative to a horizontal direction of input on the touch panel, and the first virtual camera is configured to move in a vertical direction along a second axis relative to a vertical direction of input on the touch panel.

27. The non-transitory computer-readable storage medium having stored thereon the information processing program according to claim 1, wherein the information processing apparatus is separately housed from the portable display apparatus.

28. An information processing apparatus comprising at least one processor and capable of displaying an image on a portable display apparatus that outputs at least body state data based on an attitude and/or a motion of the portable display apparatus body and touch position data based on a touch position on a touch panel provided in the portable display apparatus, the information processing apparatus configured to:

calculate the attitude and/or the motion of the portable display apparatus on the basis of the body state data;

independently control an attitude of a first virtual camera for generating an image of a virtual world on the basis of the attitude and/or the motion of the portable display apparatus such that the first virtual camera rotates relative to the virtual world;

independently control a position of the first virtual camera for generating the image of the virtual world to move in a direction relative to a direction of input on the touch panel, the position of the first virtual camera being controlled on the basis of the touch position indicated by the touch position data such that the first virtual camera moves relative to the virtual world; and display on the portable display apparatus a first image representing the virtual world viewed from the first virtual camera.

29. An information processing system comprising a plurality of apparatuses configured to communicate with each other, the information processing system capable of displaying an image on a portable display apparatus that outputs at least body state data based on an attitude and/or a motion of the portable display apparatus body and touch position data based on a touch position on a touch panel provided in the portable display apparatus, the information processing system configured to:

calculate the attitude and/or the motion of the portable display apparatus on the basis of the body state data;

independently control an attitude of a first virtual camera for generating an image of a virtual world on the basis of the attitude and/or the motion of the portable display apparatus such that the first virtual camera rotates relative to the virtual world;

independently control a position of the first virtual camera for generating the image of the virtual world to move in a direction relative to a direction of input on the touch panel, the position of the first virtual camera being controlled on the basis of the touch position indicated by the touch position data such that the first virtual camera moves relative to the virtual world; and display on the portable display apparatus a first image representing the virtual world viewed from the first virtual camera.

30. An image processing method performed by a processor or a cooperation of a plurality of processors included in an image processing system including at least one information processing apparatus capable of displaying an image on a portable display apparatus that outputs at least body state data based on an attitude and/or a motion of the portable display apparatus body and touch position data based on a touch position on a touch panel provided in the portable display apparatus, the information processing method comprising:

calculating the attitude and/or the motion of the portable display apparatus on the basis of the body state data;

independently controlling an attitude of a first virtual camera for generating an image of a virtual world on the basis of the attitude and/or the motion of the portable display apparatus such that the first virtual camera rotates relative to the virtual world;

independently controlling a position of the first virtual camera for generating the image of the virtual world to move in a direction relative to a direction of input on the touch panel, the position of the first virtual camera being controlled on the basis of the touch position indicated by the touch position data such that the first virtual camera moves relative to the virtual world; and displaying on the portable display apparatus a first image representing the virtual world viewed from the first virtual camera.

\* \* \* \* \*